US011759391B2

(12) United States Patent
Laflamme

(10) Patent No.: US 11,759,391 B2
(45) Date of Patent: Sep. 19, 2023

(54) METHOD, SYSTEM, COMPUTER PROGRAM PRODUCT AND DEVICE FOR FACILITATING CENTRALIZED CONTROL AND MONITORING OVER A NETWORK OF A SET OF REMOTE BATHING UNIT SYSTEMS

(71) Applicant: GECKO ALLIANCE GROUP INC., Quebec (CA)

(72) Inventor: Benoit Laflamme, Quebec (CA)

(73) Assignee: GECKO ALLIANCE GROUP INC., Quebec (CA)

( * ) Notice: Subject to any disclaimer, the term of this patent is extended or adjusted under 35 U.S.C. 154(b) by 0 days.

(21) Appl. No.: 17/399,230

(22) Filed: Aug. 11, 2021

(65) Prior Publication Data

US 2021/0369561 A1 Dec. 2, 2021

Related U.S. Application Data

(63) Continuation of application No. 16/002,956, filed on Jun. 7, 2018, now Pat. No. 11,116,692.

(51) Int. Cl.
*G05B 21/00* (2006.01)
*G01M 1/38* (2006.01)
(Continued)

(52) U.S. Cl.
CPC ....... *A61H 33/005* (2013.01); *A61H 33/0095* (2013.01); *A61H 2033/0079* (2013.01);
(Continued)

(58) Field of Classification Search
CPC .............. A61H 1/00; A61H 2033/0079; A61H 2033/0083; A61H 2201/0207;
(Continued)

(56) References Cited

U.S. PATENT DOCUMENTS

| | | | |
|---|---|---|---|
| 4,568,821 | A | 2/1986 | Boe |
| 5,361,215 | A | 11/1994 | Tompkins et al. |

(Continued)

FOREIGN PATENT DOCUMENTS

| | | |
|---|---|---|
| CA | 2430862 | 11/2007 |
| CA | 2324598 | 5/2008 |

(Continued)

OTHER PUBLICATIONS

Non-Final Office Action dated Jul. 28, 2021 in connection with U.S. Appl. No. 16/803,340—7 pages.

(Continued)

*Primary Examiner* — Zhipeng Wang
(74) *Attorney, Agent, or Firm* — Sheridan Ross P.C.

(57) ABSTRACT

A method, apparatus and system to facilitate maintenance of a network enabled bathing unit system. A Graphical User Interface (GUI) is presented providing a user operable control for receiving from a customer a service request requesting that a technician contact the customer. The user operable control may in some cases be enabled in response to detection of an operational error in the bathing unit system and disabled otherwise. In response to receipt of the service request through the user operable control, a notification message indicating that the customer has requested to be contacted by a technician is sent over a communication network. In some embodiments, a message responsive to the service request is received to cause the GUI to present user-selectable options to enable the customer to selectively permit the remote control and monitoring of the bathing unit system by a specific remote service technician.

31 Claims, 31 Drawing Sheets

(51) Int. Cl.
*G05B 13/00* (2006.01)
*G05B 15/00* (2006.01)
*G05D 23/00* (2006.01)
*A61H 33/00* (2006.01)

(52) U.S. Cl.
CPC ................ *A61H 2201/5012* (2013.01); *A61H 2201/5025* (2013.01); *A61H 2201/5043* (2013.01); *A61H 2201/5097* (2013.01)

(58) Field of Classification Search
CPC .... A61H 2201/5012; A61H 2201/5025; A61H 2201/5035; A61H 2201/5043; A61H 2201/5046; A61H 2201/5058; A61H 2201/5097; A61H 33/00; A61H 33/005; A61H 33/0095
See application file for complete search history.

(56) References Cited

U.S. PATENT DOCUMENTS 5,710,409 A 1/1998 Schwarzbacker et al.
5,930,852 A 8/1999 Gravatt et al.
6,166,729 A 12/2000 Acosta et al.
6,200,108 B1 3/2001 Caudill et al.
6,355,913 B1 3/2002 Authier et al.
6,476,363 B1 11/2002 Authier et al.
6,488,408 B1 12/2002 Laflamme et al.
6,676,831 B2 1/2004 Wolfe
6,714,977 B1 3/2004 Fowler
6,717,050 B2 4/2004 Laflamme et al.
6,734,879 B2 5/2004 Hasha et al.
6,744,223 B2 6/2004 Laflamme et al.
6,754,321 B1 6/2004 Innes et al.
6,775,374 B2 8/2004 Nishikawa
6,782,309 B2 8/2004 Laflamme et al.
6,813,575 B2 11/2004 Laflamme
6,874,175 B2 4/2005 Laflamme et al.
6,900,736 B2 5/2005 Crumb
6,929,516 B2 8/2005 Brochu et al.
6,942,354 B2 9/2005 Metayer et al.
7,010,363 B2 3/2006 Donnelly et al.
7,046,163 B2 5/2006 Macey
7,112,768 B2 9/2006 Brochu et al.
7,292,898 B2 11/2007 Clark et al.
7,327,275 B2 2/2008 Brochu et al.
7,398,138 B2 7/2008 Emery et al.
7,419,406 B2 9/2008 Brochu et al.
7,420,293 B2 9/2008 Donnelly et al.
7,440,820 B2 10/2008 Gougerot et al.
7,489,986 B1 2/2009 Laflamme et al.
7,514,884 B2 4/2009 Potucek et al.
7,593,789 B2 9/2009 Gougerot et al.
7,619,181 B2 11/2009 Authier
7,701,679 B2 4/2010 Brochu et al.
7,843,357 B2 11/2010 Brochu et al.
7,982,625 B2 7/2011 Brochu et al.
8,104,110 B2 1/2012 Caudill et al.
8,150,552 B2 4/2012 Brochu et al.
8,164,470 B2 4/2012 Brochu et al.
8,612,061 B2 12/2013 Laflamme et al.
8,644,960 B2 2/2014 Laflamme et al.
8,892,261 B2 11/2014 Hoonhout et al.
9,043,472 B1 5/2015 Chau
9,405,441 B2 8/2016 Trafton et al.
9,442,639 B2 9/2016 Laflamme et al.
10,037,675 B2 7/2018 Uy
10,159,624 B2 12/2018 Laflamme et al.
10,235,033 B2 3/2019 Laflamme et al.
10,447,492 B1* 10/2019 Jacobson ............... G05B 15/02
10,624,812 B2 4/2020 Laflamme et al.
10,789,335 B2 9/2020 Kang et al.
10,809,905 B2 10/2020 Laflamme et al.
11,116,692 B2 9/2021 Laflamme et al.
11,213,455 B2 1/2022 Laflamme et al.
11,455,092 B2 9/2022 Laflamme et al.
2001/0029407 A1 10/2001 Tompkins et al.
2002/0025050 A1 2/2002 Macey
2002/0070875 A1 6/2002 Crumb
2002/0175828 A1 11/2002 Macey
2003/0011634 A1 1/2003 Hasha et al.
2003/0020742 A1 1/2003 Hasha et al.
2003/0022635 A1 1/2003 Benning et al.
2003/0121094 A1 7/2003 Laflamme et al.
2004/0054789 A1 3/2004 Breh et al.
2004/0117330 A1 6/2004 Ehlers et al.
2004/0119814 A1 6/2004 Clisham et al.
2004/0244103 A1 12/2004 Laflamme et al.
2005/0015458 A1 1/2005 La
2005/0045621 A1 3/2005 Chenier et al.
2005/0088119 A1 4/2005 Potucek et al.
2005/0167345 A1 8/2005 De Wet et al.
2005/0222786 A1 10/2005 Tarpo et al.
2005/0222933 A1 10/2005 Wesby
2005/0288821 A1* 12/2005 Laflamme ............ A61H 33/005
700/275
2006/0031476 A1 2/2006 Mathes et al.
2006/0092008 A1 5/2006 Corrington et al.
2006/0221841 A1 10/2006 Lee
2007/0106403 A1 5/2007 Emery et al.
2008/0021685 A1 1/2008 Emery
2008/0039977 A1 2/2008 Clark et al.
2008/0129578 A1 6/2008 Petersen et al.
2008/0154394 A1 6/2008 Lin
2008/0163416 A1 7/2008 Go
2008/0168599 A1 7/2008 Caudill et al.
2008/0205865 A1 8/2008 Lesage et al.
2008/0259056 A1 10/2008 Freier et al.
2008/0311898 A1 12/2008 Benco
2009/0013210 A1 1/2009 McIntosh et al.
2009/0106890 A1 4/2009 Rosenau
2009/0164049 A1 6/2009 Nibler et al.
2009/0187499 A1 7/2009 Mulder et al.
2009/0200245 A1 8/2009 Steinbrueck et al.
2009/0204263 A1 8/2009 Love
2009/0218296 A1 9/2009 King et al.
2009/0240766 A1 9/2009 Kikkawa et al.
2009/0255049 A1 10/2009 Rosenau
2010/0049743 A1* 2/2010 Schmidt .............. G06F 11/2294
715/810
2010/0132106 A1 6/2010 Cline
2010/0138786 A1 6/2010 McQueen
2010/0150170 A1 6/2010 Lee
2010/0168878 A1 7/2010 Hoonhout et al.
2010/0206869 A1 8/2010 Nelson et al.
2010/0219962 A1 9/2010 Brochu et al.
2011/0006904 A1 1/2011 Duchamp et al.
2011/0023225 A1 2/2011 Kaykov et al.
2011/0030016 A1 2/2011 Pino et al.
2011/0046805 A1 2/2011 Bedros et al.
2011/0046806 A1 2/2011 Nagel et al.
2011/0093099 A1 4/2011 Tran et al.
2011/0098869 A1 4/2011 Seo et al.
2011/0202150 A1 8/2011 Tran et al.
2012/0055419 A1 3/2012 Beyerle et al.
2012/0078426 A1* 3/2012 Macey ................ H04L 12/2825
700/286
2012/0096637 A1 4/2012 Laflamme et al.
2012/0158336 A1* 6/2012 Duchamp ............... C02F 1/008
702/81
2012/0173382 A1 7/2012 Loveland
2013/0094444 A1 4/2013 Lai et al.
2013/0166965 A1* 6/2013 Brochu ................. H04L 12/283
709/224
2014/0108986 A1 4/2014 Laflamme et al.
2014/0123180 A1* 5/2014 Xiao ................ H04N 21/64753
725/37
2015/0067018 A1* 3/2015 Connolly ............. G06Q 30/016
709/202
2015/0095402 A1 4/2015 Fraccaroli
2015/0335523 A1 11/2015 Kang et al.
2015/0381795 A1* 12/2015 Brochu ................. H04W 76/14
455/420

(56) References Cited

U.S. PATENT DOCUMENTS

| | | | | |
|---|---|---|---|---|
| 2016/0342323 | A1 | 11/2016 | Laflamme et al. | |
| 2017/0100656 | A1 | 4/2017 | Laflamme et al. | |
| 2017/0203634 | A1 | 7/2017 | Dickow | |
| 2017/0209339 | A1 | 7/2017 | Potucek et al. | |
| 2017/0267547 | A1 | 9/2017 | Miller et al. | |
| 2018/0240322 | A1* | 8/2018 | Potucek | E04H 4/14 |
| 2019/0155494 | A1 | 5/2019 | Laflamme et al. | |
| 2019/0242813 | A1 | 8/2019 | Stahlman | |
| 2019/0374431 | A1 | 12/2019 | Laflamme et al. | |
| 2020/0188227 | A1 | 6/2020 | Laflamme et al. | |
| 2021/0132782 | A1 | 5/2021 | Laflamme et al. | |

FOREIGN PATENT DOCUMENTS

| | | |
|---|---|---|
| CA | 2483876 | 4/2009 |
| CA | 2349106 | 10/2009 |
| CA | 2442861 | 12/2009 |
| CA | 2521572 | 12/2009 |
| CA | 2361096 | 3/2011 |
| CA | 2467015 | 7/2011 |
| CA | 2730873 | 8/2011 |
| CA | 2492350 | 11/2011 |
| CA | 2357641 | 1/2012 |
| CA | 2412221 | 1/2012 |
| CA | 2499551 | 5/2012 |
| CA | 2762788 | 6/2013 |
| CA | 2755672 | 4/2016 |
| CA | 2755673 | 6/2017 |
| CA | 2934395 | 11/2017 |
| CA | 2904274 | 12/2017 |
| CA | 3007688 | 4/2022 |
| CA | 3063474 | 10/2022 |
| WO | 2017127802 A1 | 7/2017 |

OTHER PUBLICATIONS

Examiner's Report dated Sep. 20, 2021 in connection with Canadian Patent Application No. 3,063,474—6 pages.

Notice of Allowance dated Oct. 6, 2021 in connection with U.S. Appl. No. 16/803,340—8 pages.

Non-Final Office Action dated Oct. 15, 2021 in connection with U.S. Appl. No. 17/073,537—10 pages.

Jacuzzi, "Explore the Jacuzzi ProLink App", https://www.youtube.com/watch?v=fiW-DfNAJzM, Sep. 8, 2015 (Sep. 8, 2015).

Notice of Allowance dated Jun. 24, 2022 in connection with U.S. Appl. No. 17/073,537—17 pages.

Notice of Allowance dated Jun. 30, 2022 in connection with Canadian Patent Application No. 3,063,474—1 page.

Final Office Action dated Oct. 26, 2012 in connection with U.S. Appl. No. 12/910,615, 13 pages.

Final Office Action dated Mar. 22, 2013 in connection with U.S. Appl. No. 12/916,160, 16 pages.

Notice of Allowance dated Aug. 16, 2013 in connection with U.S. Appl. No. 12/916,160, 7 pages.

Restriction Requirement dated Sep. 30, 2013 in connection with U.S. Appl. No. 13/336,513, 4 pages.

Notice of Allowance dated Sep. 25, 2013 in connection with U.S. Appl. No. 12/910,615, 13 pages.

Non-final Office Action dated Nov. 7, 2013 in connection with U.S. Appl. No. 13/336,513, 8 pages.

Non-final Office Action dated Mar. 11, 2014 in connection with U.S. Appl. No. 14/0106,554, 11 pages.

Final Office Action dated Jun. 26, 2014 in connection with U.S. Appl. No. 13/336,513, 7 pages.

Restriction Requirement dated Nov. 4, 2014 in connection with U.S. Appl. No. 14/106,554, 5 pages.

Non-final Office Action dated Jan. 23, 2015 in connection with U.S. Appl. No. 13/336,513, 6 pages.

Examiner's Report dated Feb. 10, 2015 in connection with Canadian Patent Application 2, 755,672, 8 pages.

Ex parte Quayle Action dated Apr. 22, 2015 in connection with U.S. Appl. No. 14/106,554, 4 pages.

Final Office Action dated Jul. 14, 2015 in connection with U.S. Appl. No. 13/336,513, 5 pages.

Newport Controls, LLC, "Azure Control Panel—User's Manual", Newport Controls User Manual downloaded from website on Sep. 27, 2010, 37 pages.

Notice of Allowance dated Sep. 17, 2015 in connection with Canadian Patent Application 2,755,672, 1 page.

Non-Finai Office Action dated Nov. 4, 2015 in connection with U.S. Appl. No. 14/106,554, 11 pages.

Non-Final Office Action dated Dec. 14, 2015 in connection with U.S. Appl. No. 14/852,792, 8 pages.

Examiner's Report dated May 10, 2016 in connection with Canadian Patent Application 2, 755,673, 2 pages.

Final Office Action dated May 5, 2016 in connection with U.S. Appl. No. 14/852,792, 6 pages.

Notice of Allowance dated May 6, 2016 in connection with U.S. Appl. No. 14/106,554, 5 pages.

Non-Final Office Action dated Dec. 2, 2016 in connection with related U.S. Appl. No. 14/852,792, 7 pages.

Examiner's Report dated Jan. 24, 2017 in connection with Canadian application No. 2,904,274—3 pages.

Examiner's Report dated Jan. 24, 2017 in connection with Canadian application No. 2,762,788—3 pages.

Final Office Action dated Mar. 27, 2017 in connection with related U.S. Appl. No. 14/852,792, 15 pages.

Notice of Allowance dated Apr. 12, 2017 in connection with Canadian application No. 2,934,395—1 page.

Notice of Allowance dated Jun. 29, 2017 in connection with Canadian application No. 2,904,274—1 page.

Non Final Office Action dated Aug. 30, 2017 in connection with U.S. Appl. No. 14/852,792—13 pages.

Examiner's Report dated Oct. 12, 2017 in connection with Canadian Patent Application No. 2,762,788—5 pages.

Restriction Requirement dated Nov. 7, 2017 in connection with U.S. Appl. No. 15/227,404—6 pages.

Non-final Office Action dated Jan. 10, 2018 in connection with U.S. Appl. No. 15/227,404—6 pages.

Restriction Requirement dated Jan. 12, 2018 in connection with U.S. Appl. No. 14/851,986—8 pages.

Notice of Allowance dated Aug. 14, 2018 in connection with U.S. Appl. No. 14/851,986—12 pages.

Corrected Notice of Allowance dated Sep. 12, 2018 in connection with U.S. Appl. No. 14/851,986—2 pages.

Examiner's Report dated Sep. 28, 2018 in connection with Canadian Patent Application No. 2,762,788—5 pages.

Examiner's Report dated Nov. 13, 2018 in connection with Canadian Patent Application No. 2,982,143—3 pages Notice of Allowance dated Nov. 15, 2018 in connection with U.S. Appl. No. 15/227,404—9 pages.

Non-Finai Office Action dated Jul. 17, 2019 in connection with U.S. Appl. No. 15/916,041—8 pages.

Examiner's Report dated Aug. 28, 2019 in connection with CA Patent Application No. 2,982,143—3 pages.

Examiner's Report dated Sep. 5, 2019 in connection with Canadian Patent Application No. 3,007,688—7 pages.

Examiner's Report dated Oct. 4, 2019 in connection with Canadian patent Application No. 2,762,788—6 pages.

Notice of Allowance dated Dec. 2, 2019 in connection with U.S. Appl. No. 15/916,041—4 pages.

Non-Finai Office Action dated Feb. 6, 2020 in connection with U.S. Appl. No. 16/260,555—8 pages.

Notice of Allowance dated Jun. 24, 2020 in connection with U.S. Appl. No. 16/260,555—8 pages.

Non-Finai office Action dated Jun. 24, 2020 in connexion with U.S. Appl. No. 16/002,956—16 pages.

Notice of Allowance dated Jul. 27, 2020 in connection with Canadian application No. 3,007,688—1 page.

Notice of Allowance dated Sep. 16, 2020 in connection with U.S. Appl. No. 16/260,555—6 pages.

Examiner's Report dated Sep. 16, 2020 in connexion with Canadian Patent Application No. 3,007,688—5 pages.

(56) References Cited

OTHER PUBLICATIONS

Final Office Action dated Jan. 1, 2021 in connection with U.S. Appl. No. 16/002,956—19 pages.
Examiner's Report dated Jan. 18, 2021 in connection with Canadian Patent Application No. 3,063,474—5 pages.
Examiner's Report dated May 3, 2021 in connection with Canadian Patent Application No. 3,007,688—10 pages.
Notice of Allowance dated May 27, 2021 in connection with U.S. Appl. No. 16/002,956—30 pages.
Corrected Notice of Allowance dated Nov. 17, 2021 in connection with U.S. Appl. No. 16/803,340—13 pages.
Notice of Allowance dated Jan. 26, 2022 in connection with Canadian Patent Application No. 3,007,688—1 page.

* cited by examiner

Memory-Address Translation table (602)

| Link Active? | Spa Controller ID (752) | Public IP Address (754) | Public Port (756) | Permission Setting (758) | Current Connection (760) | Public IP Address (762) |
|---|---|---|---|---|---|---|
| Yes | Roberts SPA | 213.18.123.112 | 28 | (1) Roberts-Mobile Device (MAC Address) (2) Technician #1 Mobile Device | (2) Technician #1 Mobile Device | 213.17.123.210 |
| Yes | Sarah SPA | 215.17.123.30 | | ALL | None | None |
| ⋮ | | | | | | |
| Yes | Gecko SPA #32 | 213.20.122.11 | 32 | (1) Bill's desktop (2) Bill's Mobile Device | (2) Bill's Mobile Device | 213.14.107.31 |
| Yes | MAC Address | 213.20.142.11 | 38 | (1) Anna's Tablet (2) Technician #1 Mobile Device | (2) Technician #1 Mobile Device | 213.17.123.210 |
| ⋮ | | | | | | |

750

FIG. 7

FIG. 29
1300'
1710
12:32 PM
My Spa
Spa State
Heating to 101 °F
Filtering is active
1712

METHOD, SYSTEM, COMPUTER PROGRAM PRODUCT AND DEVICE FOR FACILITATING CENTRALIZED CONTROL AND MONITORING OVER A NETWORK OF A SET OF REMOTE BATHING UNIT SYSTEMS

CROSS-REFERENCE TO RELATED APPLICATIONS

The present application is a continuation under 35 USC § 120 of U.S. patent application Ser. No. 16/002,965 filed Jun. 7, 2018. The contents of the aforementioned document are incorporated herein by reference.

FIELD OF THE INVENTION

The present invention relates generally to the field of remote control and monitoring systems for bathing unit systems (such as swimming pools, spas, hot tubs, baths and the like), and more specifically to systems, methods, computer program products and device for facilitating centralized control and monitoring of remote network-enabled bathing unit systems that may be owned and operated by different entities or customers.

BACKGROUND

Bathing units, such as spas, typically include various bathing unit components that are used in operating the bathing system. The bathing unit components generally include pumps that circulate water through a piping system, pumps for activating water jets, at least one heating module to heat the water, a filter system, an air blower, an ozone generator, a lighting system, and a control system that activate and manage the various operational settings of the bathing unit components. Other types of bathing units that have similar components include, for instance, whirlpools, hot tubs, bathtubs, therapeutic baths, spas and swimming pools. Most modern bathing systems include a user control panel implementing a user control interface that is in communication with the bathing unit control system. The user control panel is typically positioned on or in proximity to the bathing system so that a user of the bathing system may interact with it in order to adjust and control the activation and settings of the various bathing unit components.

Increasingly, it is becoming desirable to provide mechanisms to enable users to remotely monitor and control the operations of bathing units. For example, it is desirable to allow an owner of a spa system, when leaving his or her office after a long day at work, to be able to control his spa system so that when he/she arrives at home, the spa water is at a desired temperature level. In another example, an owner of a spa system may leave his/her residence and inadvertently forget to perform some task in connection with his spa, for example turn off the jets, turn off the lights and/or initiate a filtering function amongst others. The owner may also not remember whether the water temperature, jets, lights or other components were set to a desired level or desired mode of operation before leaving his residence. Without the ability to remotely monitor and control the operations of the spa, the user must wait until he/she returns to his residence in order to verify the status of operation of the spa system and/or perform the required task. This is clearly inconvenient for the owner. It is also desirable to allow an owner of a spa to receive notifications in the event of a malfunctioning of the spa so that the owner may take some steps to prevent situations in which the malfunction may cause some damage if not attended to in a timely manner. For example, in the event of a generalized power failure or when the breaker for the spa trips, a situation may arise when power ceases to be provided to the spa. An interruption in the power supply for a prolonged period of time can have undesirable consequences ranging from minor inconvenience such as less than optimal water cleanliness due to an absence of filtration, to more serious damage, such as some components becoming permanently damaged. For example, in cold climates where temperatures fall below the freezing point of water, the absence of heat and circulating water in the circulation pipes may freeze and cause cracks in the pipes.

Some existing systems provide functionality for allowing for the remote control and monitoring of bathing systems to take place over a local computer network. In this regard, some bathing systems can now be equipped with network interfaces for allowing the bathing system to register with a local network (for example a home network) through a router in order to exchange signals with other devices in the same local network. In such a local network, each device is associated with its own internal or private IP address, which allows the devices in the local network to communicate with one another through the router. Such a configuration therefore enables a computing device connected to the local network and equipped with suitable software to issue commands to and receive status information from the over the private network through the router. Some of these systems also provide for the remote control and monitoring of bathing systems over a public network (such as the Internet). For additional information, the reader may refer for example to U.S. patent application publication no. US2013-0166965-A1 published on Jun. 28, 2013 and to U.S. Pat. No. 7,292,898 issued on Nov. 6, 2007. The contents of the aforementioned documents are incorporated herein by reference.

In addition to bathing unit owners, it is also desirable for service technicians, technician teams as well as equipment distributors to be able to remotely control and monitoring of bathing systems over a public network. However, while some conventional systems provide tools for the remote control and monitoring of bathing systems over a public network, these tools are often ill-suited when it is desirable to centrally monitor large numbers of bathing units systems, which may in some cases be owned by different entities. If effect, while conventional solutions allow a user to remotely access different bathing unit system, these typically require the user to independently access the different bathing systems but fail to provide suitable mechanisms for allowing the user to manage and use information pertaining to the different bathing systems. Against the background described above, there remains a need in the industry to provide a system, method and computer program product for facilitating centralized control and monitoring over a network of a set of remote bathing unit systems that alleviates at least in part the problems associated with existing systems and methods.

SUMMARY

In accordance with a first aspect, a method to facilitate centralized control and monitoring of remote network-enabled bathing unit systems owned and operated by different customers is provided. The method comprises:

directing a computing device to implement a Graphical User Interface (GUI), said GUI being configured for presenting a listing of bathing unit systems including a plurality of entries associated with respective bathing unit systems owned and operated by different customers;

the GUI being configured for displaying operational status indicators associated with at least some of the bathing unit systems presented in the listing of bathing unit systems, wherein the operational status indicators convey operational status information;

receiving at the computing device, over a communication network, data conveying updated operational status information pertaining to one or more of the bathing unit systems in the listing of bathing unit systems;

in response to receipt of the data conveying operational status information, dynamically adapting the GUI to display updated operational status indicators associated with the bathing unit systems presented in the listing of bathing unit systems.

In some implementations, a method according to the first aspect may further comprise the GUI providing a user-operable input object configured to accept a user input identifying a specific customer to generate an invitation message to request permission to remotely control and monitor a bathing unit system associated with the specific customer, wherein the specific customer is distinct from the different customers that own and operate the bathing unit systems in the listing of bathing unit systems. The invitation message may be transmitted from the computing device over a communication network. A confirmation message may be received at the computing device over the communication network, the confirmation message indicating that the specific customer has granted permission to remotely control and monitor the bathing unit system associated with the specific customer. The GUI may be dynamically adapted to modify the listing of bathing unit systems to include an additional entry in the plurality of entries, the additional entry corresponding to the bathing unit system associated with the specific customer. In specific practical implementations, the invitation message to may be transmitted to the specific customer over the communication network via a web-server or gateway with which a user of the computing device and the specific customer are registered. In such implementations, the data conveying operational status information may be received over the communication network via the web-server or gateway.

In some implementations, the entries in the plurality of entries of the listing of bathing unit systems convey: identification information associated with a respective specific bathing unit system; and at least one operational status indicator conveying operational status information of the respective specific bathing unit system.

In specific practical implementations, the GUI may be configured to provide a user operable control for receiving user sort commands for sorting the plurality of entries in the listing of bathing unit systems according to user-selectable sorting criteria. For example, the user operable control for receiving the user sort commands may be configured for presenting the user with a set of selectable sorting criteria for sorting the plurality of entries in the listing of bathing unit systems. In some implementations, a method according to the first aspect may further comprise dynamically adapting the GUI, in response to receipt of a specific user sort command conveying a specific sorting criterion, to present a sorted version of the listing of bathing unit systems, wherein the plurality of entries in the sorted version of the listing of bathing unit systems are arranged according to the specific sorting criterion conveyed by the specific user sort command. The user-selectable sorting criteria may include criterion selected from the group consisting of: a bathing unit system identifier; operational status indicators; a type of bathing unit system component identified as being in need of servicing or replacement; distance to a current location of the computing device; maintenance service subscription classification; and a type, classification or model number associated with bathing unit systems.

In specific practical implementations, the GUI may be configured to provide a user operable control for receiving user filter commands for filtering the pluralities entries in the listing of bathing unit systems according to user-selectable filtering criteria. For example, the user operable control for receiving the user filter commands may be configured for presenting the user with a set of selectable filtering criteria for filtering the plurality of entries in the listing of bathing unit systems. In some implementations, a method according to the first aspect may further comprise dynamically adapting the GUI, in response to receipt of a specific user filter command conveying a specific filtering criterion, to present a filtered version of the listing of bathing unit systems, wherein the plurality of entries in the filtered version of listing of bathing unit systems omit one or more entries from the listing of bathing unit systems according to the specific filtering criterion conveyed by the specific user filter command. The user-selectable filtering criteria may include criterion selected from the group consisting of: bathing unit system identifiers; operational status indicators; a type of bathing unit system component identified as being in need of servicing or replacement; distance to a current location of the computing device; maintenance service subscription classification; and a type, classification or model number associated with bathing unit systems.

In some implementations, the entries in the listing of bathing unit systems may be independently selectable by a user of the computing device. In such implementations, the GUI may be dynamically adapted, responsive to receiving the user selection specifying the entry amongst the entries presented in the listing of bathing unit systems, to present a bathing unit system-specific interface for remotely controlling and monitoring the bathing unit system corresponding to the selected entry.

In some implementations, the bathing unit system-specific interface is configured to present one or more user-operable input objects configured to accept user inputs to modify one or more operational parameters of the bathing unit system corresponding to the selected entry, and, in response to receipt of a specific user input to modify one or more operational parameters of the bathing unit system corresponding to the selected entry, transmit a command signal to the bathing unit system corresponding to the selected entry over a computer network to cause a change in one or more operational parameters. For example, in some implementations, the bathing unit system-specific interface is configured to present one or more user-operable input objects configured to accept user inputs to change an actuation setting of bathing unit components associated with the bathing unit system corresponding to the selected entry. The bathing unit components may include one or more of the following: lighting modules; a jet; a pump; a heater module. In a specific practical implementation, the bathing unit system-specific interface may be configured to present one or more user-operable input objects configured to accept user inputs to modify a water temperature setting associated with the bathing unit system corresponding to the selected entry.

In some implementations, the bathing unit system-specific interface is configured to present one or more error messages associated to specific bathing unit components of the bathing unit system corresponding to the selected entry.

In some implementations, the bathing unit system-specific interface is configured to present operational status information associated with one or more bathing unit components of the bathing unit system corresponding to the selected entry.

In some implementations, the operational status indicators may include one or more color-coded operational status indicators.

In some implementations, the operational status indicators may convey network connection status information associated with the bathing unit systems presented in the listing of bathing unit systems.

In some implementations, the operational status indicators include general error indicators indicating that errors have been detected for one or more components of the bathing unit system.

In a specific practical implementation, the general error indicators may be independently selectable at the computing device through the GUI, wherein in response to receiving a user selection for a specific one of the general error indicators associated with a specific bathing unit system, the GUI being dynamically adapted to present a diagnostic interface providing additional information of an error condition for the specific bathing unit system associated to the selected specific one of the general error indicators.

In some implementations, a method according to the first aspect further comprises deriving one or more of the operational status indicators associated with the bathing unit systems presented in the listing of bathing unit systems at least in part by processing the data conveying operational status information received at the computing device. In a specific practical implementation, at least some of the operational status indicators are component-specific error indicators conveying specific bathing unit components on which errors have been detected. In such implementations, the component-specific error indicators may be independently selectable by a user of the computing device, and the GUI may be dynamically adapted, responsive to receiving the user selection specifying the specific component-specific error indicator, to present a diagnostic interface for diagnostic analysis of the error condition. For example, the GUI may be dynamically adapted to present information identifying one or more replacement parts available to address the error condition for purchase in an electronic marketplace. In some implementations, the information conveying one or more replacement parts available for purchase in the electronic marketplace may include a user-operable actuator to initiate a purchasing process for the one or more parts from the electronic marketplace.

In some implementations, a method according to the first aspect further comprises receiving, at the computing device over the communication network, a service request notification message indicating that a specific customer associated with a specific bathing unit system in the listing of bathing unit systems presented on the GUI has requested to be contacted, and, in response to receipt of the service request notification message, dynamically adapting the GUI to display a service request GUI element in association with a specific entry in the listing of bathing unit systems associated with the specific bathing unit system. In a specific practical implementation, the service request GUI element may be displayed in conjunction with at least one operational status indicator in association with the specific entry in the listing of bathing unit systems associated with the specific bathing unit system. In some implementations, the service request GUI element may be selectable by a user of the computing device, and the GUI may be dynamically adapted to present one or more communication options for contacting the customer and/or provide a user-operable actuator to initiate a communication process for contacting the customer, responsive to the user selection of the service request GUI element. For example, the one or more communication options may include at least one of: e-mail; SMS message; video conference; text message; and telephone call.

In some implementations, a method according to the first aspect further comprises processing operational status information associated with at least a subset of the plurality of bathing unit systems to identify at least a subset of the bathing unit systems in need of replacing a specific bathing unit system component. In such implementations, the GUI may be adapted to present an offer for purchasing one or more units of the specific bathing unit system component for the identified subset of the bathing unit systems. For example, the GUI may be adapted to provide a user-operable actuator configured to be responsive to a user input to initiate a purchasing process for the one or more units of the specific bathing unit system component. In a specific practical implementation, the GUI may be configured to display, in association with each entry in the identified subset of the bathing unit systems in need of replacing the specific bathing unit system component, a component-specific error indicator conveying the specific bathing unit system component that has been identified as being in need of replacement. Non-limiting examples of the specific bathing unit system components include: a bathing unit system filter; a bathing unit system heater component or part thereof, a bathing unit system sanitizing component or part thereof, a bathing unit system pump or part thereof, an ozonator system; and a UV lamp.

In some implementations, the computing device is associated with a bathing unit system service technician or a service technician team.

In accordance with a second aspect, a method to facilitate maintenance of a network-enabled bathing unit system owned and operated by a customer is provided. A method according to the second aspect comprises:

- directing a computing device to implement a Graphical User Interface (GUI), the GUI being configured to present one or more user-operable input objects configured to accept user inputs to modify one or more operational parameters of a bathing unit system;
- the GUI being configured to display a user operable control for receiving service request commands for requesting that a bathing unit system service technician or a service technician team contact a customer associated with the bathing unit system;
- in response to receipt of a service request command via the user operable control, transmitting, over a communication network, a service request notification message indicating that the customer associated with the bathing unit system has requested to be contacted.

In some implementations, the GUI is configured for displaying an error indicator indicating that an operational error has been detected in the bathing unit system, wherein the user operable control for receiving the service request commands is displayed on the GUI in conjunction with the error indicator. For example, the error indicator may be a component-specific error indicator conveying that an error condition has been detected in connection with a specific bathing unit component.

In some implementations, the error indicator may be user-selectable through the GUI, wherein in response to receiving a user selection for the error indicator, the GUI may be dynamically adapted to present a diagnostic interface providing additional information of an error condition associated with the error indicator. For example, dynamically adapting the GUI to present the diagnostic interface may include presenting information identifying one or more replacement parts available for purchase to address the error condition. In a specific practical implementation, the presenting the information conveying one or more replacement parts available for purchase includes providing a user-operable actuator to initiate a purchasing process for the one or more parts from an electronic marketplace.

In some implementations, a method according to the second aspect further comprises dynamically adapting the GUI to display a service request GUI element following receipt of the service request command via the user operable control, the service request GUI element indicating that a service request notification message in respect of the bathing unit system has been transmitted.

In some implementations, a method according to the second aspect further comprises receiving, at the computing device, an invitation message that includes a request to permit remote control and monitoring of the bathing unit system associated with the customer by a remote bathing unit system technician or a service technician team. Following receipt of the invitation message, the GUI may be dynamically adapted to present user-selectable options to enable the customer to selectively accept or reject the request to permit remote control and monitoring of the bathing unit system by the bathing unit system technician or the service technician team. In a specific practical implementation, the invitation message may be received over the communication network via a web-server or gateway with which a user of the computing device and the bathing unit system technician or the service technician team are registered.

In some implementations, the computing device may be a portable device associated with the customer. For example, the computing device may be a smartphone. In other implementations, the computing device may be installed as part of the bathing unit system and includes a top-side control panel, wherein the GUI is displayed on a screen of the top-side control panel.

In accordance with a third aspect, an apparatus to facilitate centralized control and monitoring of remote network-enabled bathing unit systems owned and operated by different customers is provided. An apparatus according to the third aspect comprises:

- a network interface;
- a display screen;
- a non-transitory computer readable storage medium storing computer readable instructions; and
- a processor in communication with the display screen, the network interface and the non-transitory computer readable storage medium, the computer readable instructions when executed by the processor configure the apparatus to:
  - a) direct the display screen to implement a Graphical User Interface (GUI), the GUI being configured to: present a listing of bathing unit systems including a plurality of entries associated with respective bathing unit systems owned and operated by different customers; and display operational status indicators associated with at least some of the bathing unit systems presented in the listing of bathing unit systems, wherein the operational status indicators convey operational status information;
  - b) receive data over a communication network via the network interface, the data conveying updated operational status information pertaining to one or more of the bathing unit systems in the listing of bathing unit systems;
  - c) in response to receipt of the data conveying operational status information, dynamically adapt the GUI to display updated operational status indicators associated with the bathing unit systems presented in the listing of bathing unit systems.

In some implementations, the computer readable instructions when executed by the processor further configure the apparatus to:

- d) configure the GUI to provide a user-operable input object configured to accept a user input identifying a specific customer to generate an invitation message to request permission to remotely control and monitor a bathing unit system associated with the specific customer, wherein the specific customer is distinct from the different customers that own and operate the bathing unit systems in the listing of bathing unit systems;
- e) transmit the invitation message over the communication network via the network interface;
- f) in response to receiving a confirmation message over the communication network via the network interface, the confirmation message indicating that the specific customer has granted permission to remotely control and monitor the bathing unit system associated with the specific customer, dynamically adapt the GUI to modify the listing of bathing unit systems to include an additional entry in the plurality of entries, the additional entry corresponding to the bathing unit system associated with the specific customer.

In some implementations, the computer readable instructions when executed by the processor configure the apparatus to transmit the invitation message to the specific customer over the communication network via a web-server or gateway with which a user of the apparatus and the specific customer are registered. In a specific practical implementation, the data conveying operational status information may be received over the communication network via the web-server or gateway.

In some implementations, the entries in the plurality of entries of the listing of bathing unit systems convey: identification information associated with a respective specific bathing unit system; at least one operational status indicator conveying operational status information of the respective specific bathing unit system.

In some implementations, the computer readable instructions when executed by the processor further configure the apparatus to configure the GUI to provide a user operable control for receiving user sort commands for sorting the plurality of entries in the listing of bathing unit systems according to user-selectable sorting criteria.

In some implementations, the computer readable instructions when executed by the processor further configure the apparatus to dynamically adapt the GUI, in response to receipt of a specific user sort command conveying a specific sorting criterion, to present a sorted version of the listing of bathing unit systems, wherein the plurality of entries in the sorted version of the listing of bathing unit systems are arranged according to the specific sorting criterion conveyed by the specific user sort command.

In some implementations, the computer readable instructions when executed by the processor further configure the apparatus to configure the GUI to provide a user operable control for receiving user filter commands for filtering the pluralities entries in the listing of bathing unit systems according to user-selectable filtering criteria.

In some implementations, the computer readable instructions when executed by the processor further configure the apparatus to dynamically adapt the GUI, in response to receipt of a specific user filter command conveying a specific filtering criterion, to present a filtered version of the listing of bathing unit systems, wherein the plurality of entries in the filtered version of listing of bathing unit systems omit one or more entries from the listing of bathing unit systems according to the specific filtering criterion conveyed by the specific user filter command.

In some implementations, the entries in the listing of bathing unit systems are independently selectable by a user of the apparatus, wherein the computer readable instructions when executed by the processor further configure the apparatus to dynamically adapt the GUI, in response to receiving a user selection specifying an entry amongst the entries presented in the listing of bathing unit systems, to present a bathing unit system-specific interface for remotely controlling and monitoring the bathing unit system corresponding to the selected entry. For example, in some implementations, the computer readable instructions that when executed by the processor further configure the apparatus to dynamically adapt the GUI to present a bathing unit system-specific interface include computer readable instructions that when executed by the processor further configure the apparatus to: configure the GUI to present one or more user-operable input objects configured to accept user inputs to modify one or more operational parameters of the bathing unit system corresponding to the selected entry; and in response to receipt of a specific user input to modify one or more operational parameters of the bathing unit system corresponding to the selected entry, transmit a command signal to the bathing unit system corresponding to the selected entry over the communication network, via the network interface, to cause a change in one or more operational parameters.

In some implementations, the bathing unit system-specific interface is configured to present one or more error messages associated to specific bathing unit components of the bathing unit system corresponding to the selected entry.

In some implementations, the bathing unit system-specific interface is configured to present operational status information associated with one or more bathing unit components of the bathing unit system corresponding to the selected entry.

In some implementations, the operational status indicators include general error indicators indicating that errors have been detected for one or more components of the bathing unit system. For example, the general error indicators may be independently selectable GUI elements, and the GUI may be dynamically adapted, in response to receiving a user selection for a specific one of the general error indicators associated with a specific bathing unit system associated with an entry amongst the plurality of entries presented in the listing of bathing unit systems, to present a diagnostic interface providing additional information of an error condition for the specific bathing unit system associated to the selected specific one of the general error indicators.

In some implementations, the computer readable instructions when executed by the processor further configure the apparatus to derive one or more of the operational status indicators associated with the bathing unit systems presented in the listing of bathing unit systems at least in part by processing the data conveying operational status information received at the apparatus.

In some implementations, at least some of the operational status indicators are component-specific error indicators conveying specific bathing unit components on which errors have been detected.

In some implementations, the computer readable instructions when executed by the processor configure the apparatus to configure the GUI to display the component-specific error indicators as independently selectable GUI elements, and dynamically adapt the GUI, responsive to receiving a user selection specifying a specific component-specific error indicator associated with an entry amongst the plurality of entries presented in the listing of bathing unit systems, to present a diagnostic interface for diagnostic analysis of the error condition. For example, the GUI may be dynamically adapted to present information identifying one or more replacement parts available to address the error condition for purchase in an electronic marketplace. In some implementations, the information conveying one or more replacement parts available for purchase in the electronic marketplace may include a user-operable actuator to initiate a purchasing process for the one or more parts from the electronic marketplace.

In some implementations, the computer readable instructions when executed by the processor further configure the apparatus to dynamically adapt the GUI, in response to receiving a service request over the communication network via the network interface, the service request notification message indicating that a specific customer associated with a specific bathing unit system in the listing of bathing unit systems presented on the GUI has requested to be contacted, to display a service request GUI element in association with a specific entry in the listing of bathing unit systems associated with the specific bathing unit system. For example, the service request GUI element may be displayed in conjunction with at least one operational status indicator in association with the specific entry in the listing of bathing unit systems associated with the specific bathing unit system.

In some implementations, the computer readable instructions when executed by the processor configure the apparatus to: configure the GUI to display the service request GUI element as a user-selectable service request GUI element; and dynamically adapt the GUI, responsive to receiving a user selection of the service request GUI element, to present one or more communication options for contacting the customer.

In some implementations, the computer readable instructions when executed by the processor configure the apparatus to: configure the GUI to display the service request GUI element as a user-selectable service request GUI element; and dynamically adapt the GUI, responsive to receiving a user selection the service request GUI element, to provide a user-operable actuator to initiate a communication process for contacting the customer.

In some implementations, the computer readable instructions when executed by the processor further configure the apparatus to: process operational status information associated with at least a subset of the plurality of bathing unit systems to identify at least a subset of the bathing unit systems in need of replacing a specific bathing unit system component; and adapt the GUI to present an offer for purchasing one or more units of the specific bathing unit system component for the identified subset of the bathing unit systems. For example, the GUI may be adapted to present the offer for purchasing one or more of the specific bathing unit system component comprise computer readable instructions that when executed by the processor configure the apparatus to adapt the GUI to provide a user-operable actuator configured to be responsive to a user input to initiate a purchasing process for the one or more units of the specific bathing unit system component.

In some implementations, the computer readable instructions when executed by the processor configure the apparatus to configure the GUI to display, in association with each entry in the identified subset of the bathing unit systems in need of replacing the specific bathing unit system component, a component-specific error indicator conveying the specific bathing unit system component that has been identified as being in need of replacement.

In some implementations, the apparatus is implemented by a personal computing device, such as a smartphone or a tablet computer. In some implementations, the personal computing device may be associated with a bathing unit system service technician or a service technician team.

In accordance with a fourth aspect, an apparatus to facilitate maintenance of a network-enabled bathing unit system owned and operated by a customer is provided. An apparatus according to the fourth aspect comprises:

- a network interface;
- a display screen;
- a non-transitory computer readable storage medium storing computer readable instructions; and
- a processor in communication with the display screen, the network interface and the non-transitory computer readable storage medium, the computer readable instructions when executed by the processor configure the apparatus to:
  - a) direct the display screen to implement a Graphical User Interface (GUI), the GUI being configured to: present one or more user-operable input objects configured to accept user inputs to modify one or more operational parameters of a bathing unit system; and display a user operable control for receiving service request commands for requesting that a bathing unit system service technician or a service technician team contact a customer associated with the bathing unit system;
  - b) transmit a service request notification message over a communication network via the network interface, the service request notification message indicating that the customer associated with the bathing unit system has requested to be contacted.

In some implementations, the computer readable instructions when executed by the processor further configure the apparatus to configure the GUI to display an error indicator indicating that an operational error has been detected in the bathing unit system, wherein the user operable control for receiving the service request commands is displayed on the GUI in conjunction with the error indicator.

In some implementations, the error indicator is a component-specific error indicator conveying that an error condition has been detected in connection with a specific bathing unit component.

In some implementations, the computer readable instructions when executed by the processor configure the apparatus to:

- configure the GUI to display the error indicator as a user-selectable error indicator; and
- dynamically adapt the GUI, in response to receiving a user selection for the error indicator, to present a diagnostic interface providing additional information of an error condition associated with the error indicator.

In some implementations, the computer readable instructions that when executed by the processor configure the apparatus to dynamically adapt the GUI to present the diagnostic interface providing additional information of an error condition associated with the error indicator comprise computer readable instructions that when executed by the processor configure the apparatus to dynamically adapt the GUI to present information identifying one or more replacement parts available for purchase to address the error condition.

In some implementations, the computer readable instructions that when executed by the processor configure the apparatus to present the information conveying one or more replacement parts available for purchase comprise computer readable instructions that when executed by the processor configure the apparatus to configure the GUI to provide a user-operable actuator to initiate a purchasing process for the one or more parts from an electronic marketplace.

In some implementations, the computer readable instructions when executed by the processor further configure the apparatus to:

- dynamically adapt the GUI to display a service request GUI element following receipt of the service request command via the user operable control, the service request GUI element indicating that a service request notification message in respect of the bathing unit system has been transmitted.

In some implementations, the computer readable instructions when executed by the processor further configure the apparatus to:

- in response to receiving an invitation message over the communication network via the network interface, the invitation message including a request to permit remote control and monitoring of the bathing unit system associated with the customer by a remote bathing unit system technician or a service technician team, dynamically adapt the GUI to present user-selectable options to enable the customer to selectively accept or reject the request to permit remote control and monitoring of the bathing unit system by the bathing unit system technician or the service technician team.

In some implementations, the computer readable instructions when executed by the processor configure the apparatus for receiving the invitation message over the communication network via a web-server or gateway with which a user of the apparatus and the bathing unit system technician or the service technician team are registered.

In some implementations, the apparatus is implemented by a portable computing device, such as a smartphone or a tablet computer, associated with the customer. In other implementations, the apparatus is installed as part of the bathing unit system and includes a top-side control panel that includes the display screen.

In accordance with a fifth aspect, a method to facilitate centralized control and monitoring of remote network-enabled bathing unit systems owned and operated by different customers is provided. A method according to the fifth aspect comprises:

- at a first computing device implementing a (Graphical User Interface) associated with a bathing unit system service technician or a service technician team, configuring the GUI to provide a user-operable input object configured to accept a user input identifying a specific customer to generate an invitation message to request permission to remotely control and monitor a bathing unit system associated with the specific customer;

transmitting the invitation message from the first computing device to a second computing device implementing a GUI associated with the specific customer;

in response to receiving the invitation message at the second computing device, dynamically adapting the GUI at the second computing device to present user-selectable options to enable the customer to selectively accept or reject the request to permit remote control and monitoring of the bathing unit system by the bathing unit system technician or the service technician team;

in response to receiving user-selection of one of the user-selectable options at the second computing device indicating that the customer has accepted the permission request, transmitting a confirmation message from the second computing device to the first computing device, the confirmation message indicating that the specific customer has granted permission to remotely control and monitor the bathing unit system associated with the specific customer;

in response to receiving the confirmation message at the first computing device, dynamically adapting the GUI at the first computing device to include an additional entry in a listing of bathing unit systems that includes a plurality of entries associated with respective bathing unit systems owned and operated by different customers, the additional entry corresponding to the bathing unit system associated with the specific customer, wherein the specific customer is distinct from the different customers that own and operate the bathing unit systems in the listing of bathing unit systems.

In accordance with a sixth aspect, a system to facilitate centralized control and monitoring of remote network-enabled bathing unit systems owned and operated by different customers is provided. A system according to the sixth aspect comprises:

a plurality of network-enabled bathing unit systems;

a first computing device implementing a (Graphical User Interface) associated with a bathing unit system service technician or a service technician team;

a plurality of second computing devices implementing GUIs associated with different customers associated with at least one of the plurality of network-enabled bathing unit systems, the first computing device configured to:

a) configure the GUI at the first computing device to provide a user-operable input object configured to accept a user input identifying a specific customer to generate an invitation message to request permission to remotely control and monitor a bathing unit system associated with the specific customer;

b) transmit the invitation message from the first computing device to a second computing device implementing a GUI associated with the specific customer;

the second computing device configured to:

c) in response to receiving the invitation message, dynamically adapt the GUI at the second computing device to present user-selectable options to enable the customer to selectively accept or reject the request to permit remote control and monitoring of the bathing unit system by the bathing unit system technician or the service technician team;

d) in response to receiving user-selection of one of the user-selectable options at the second computing device indicating that the customer has accepted the permission request, transmit a confirmation message from the second computing device to the first computing device, the confirmation message indicating that the specific customer has granted permission to remotely control and monitor the bathing unit system associated with the specific customer, the first computing device being further configured to:

e) in response to receiving the confirmation message, dynamically adapt the GUI at the first computing device to include an additional entry in a listing of bathing unit systems that includes a plurality of entries associated with respective bathing unit systems among the plurality of network-enabled bathing unit systems owned and operated by different customers, the additional entry corresponding to the bathing unit system associated with the specific customer, wherein the specific customer is distinct from the different customers that own and operate the bathing unit systems in the listing of bathing unit systems.

All features of embodiments which are described in this disclosure and are not mutually exclusive can be combined with one another. Elements of one embodiment can be utilized in the other embodiments without further mention.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

A detailed description of the embodiments of the present invention is provided herein below, by way of example only, with reference to the accompanying drawings, in which:

FIG. 7 is a conceptual illustration of an address-translation table stored in a memory of the server of the system shown in FIG. 6 in accordance with a non-limiting example of the present invention;

Figure 1:
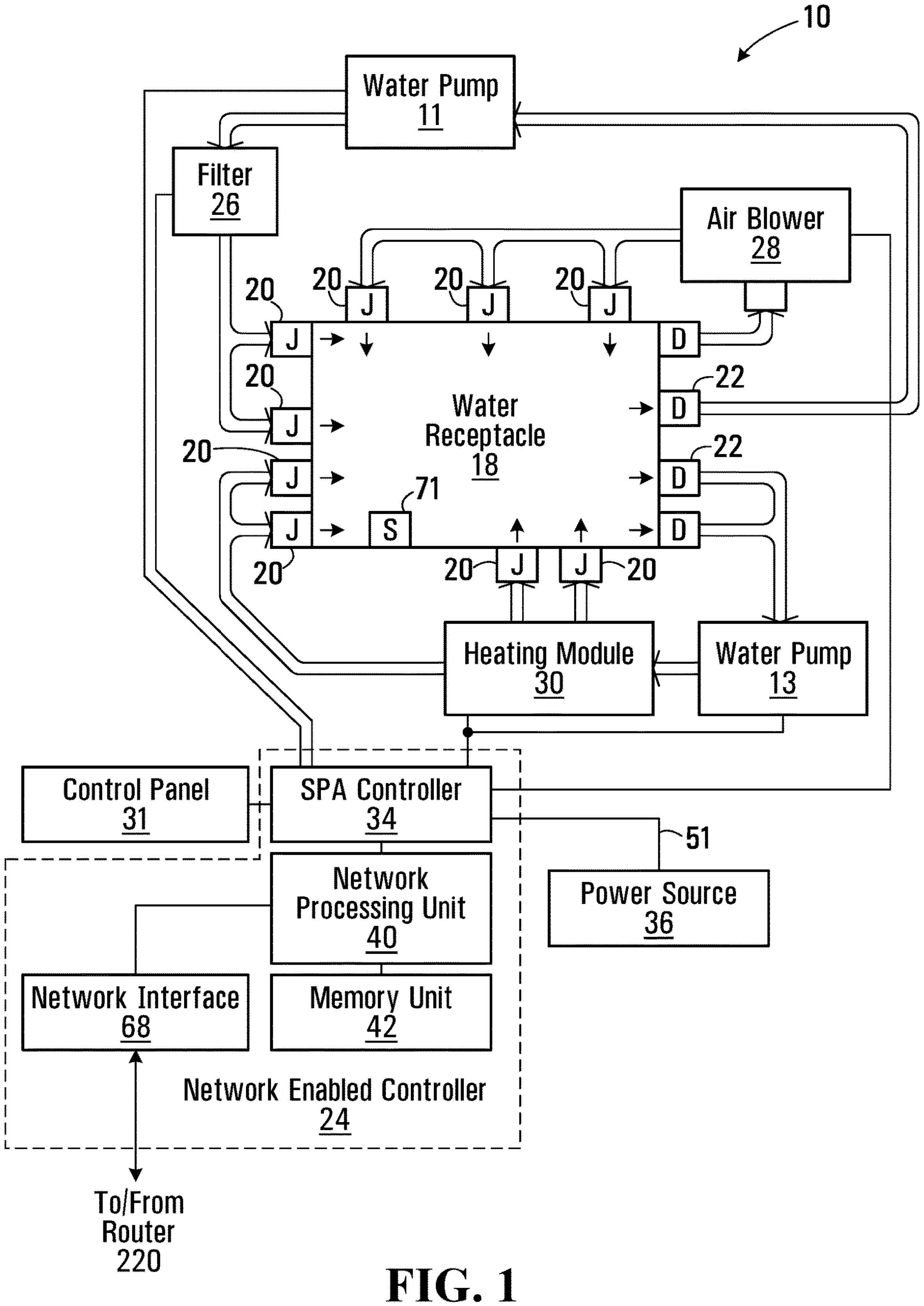
FIG. 1 shows a block diagram of a network-enabled bathing unit system in accordance with a non-limiting example of the present invention.

In the drawings, the embodiments of the invention are illustrated by way of examples. It is to be expressly understood that the description and drawings are only for the purpose of illustration and are an aid for understanding. They are not intended to be a definition of the limits of the invention.

DETAILED DESCRIPTION

Specific examples of implementation of the invention will now be described with reference to the Figures.

The description below is directed to a specific implementation of the invention in the context of the control and monitoring of bathing unit systems. It is to be understood that the terms "bathing system" or "bathing unit system", as used for the purposes of the present description, are used interchangeably and refer to spas, whirlpools, hot tubs, bathtubs, therapeutic baths, swimming pools and any other type of bathing unit that can be equipped with a control system for controlling various operational settings of the bathing unit components.

FIG. 1 illustrates a block diagram of a bathing system 10 in accordance with a non-limiting example of implementation of the present invention. The bathing system 10 includes a water receptacle 18 for holding water, a plurality of jets 20, a set of drains 22 and a network-enabled controller 24. In the specific embodiment shown in FIG. 1, the bathing system 10 further includes a set of bathing unit components comprising a heating module 30, two water pumps 11 and 13, a filter 26 and an air blower 28. It should be understood that the bathing system 10 could include more or less bathing unit components without departing from the spirit of the invention. For example, although not shown in FIG. 1, the bathing system 10 could include an ozonator, a lighting system for lighting up the water in the receptacle 18, multimedia devices such as an MP3 player, a CD/DVD player as well as any other suitable device.

In the non-limiting embodiment shown, the network-enabled controller 24 includes a spa functionality controller 34 for controlling the set of bathing unit components 11, 13, 26, 28, 30 and a network processing unit 40 for coordinating interactions between the spa controller and external devices. It is to be appreciated that although in the embodiment illustrated in FIG. 1, the spa functionality controller 34 and the network processing unit 40 are shown as two distinct components of the network-enabled controller 24, they may in alternate examples of implementation be implemented by a same physical processor and be part of the same physical device. The spa functionality controller 34 communicates with a user control panel 31, which enables a user to enter user commands for the spa functionality controller 34. In a specific embodiment, the user control panel 31 comprises a display screen and a user input device (which can also be referred to as a user operable input). The user input device could include a trackball, mouse, gyroscope remote (which senses movement of the device in the air so as to move a cursor), a keypad, a touch sensitive screen, turn-dials, turn-and-push dials (such as idrive from BMW), a stylus pen or a microphone, among other possibilities. The user input device can include one or a combination of any or all of the above input devices.

The user control panel 31 provides an interface that allows a user to enter commands for causing the controller 34 to control the various operational settings of the bathing unit components 11, 13, 26, 28, 30. Some non-limiting examples of operational settings include temperature control settings, jet control settings, and lighting settings, among other possibilities. In a non-limiting embodiment where the bathing unit is connected to entertainment and/or multimedia modules, the operational settings of the bathing unit may also include audio settings and video settings, amongst others. Consequently, the expression “operational settings”, for the purpose of the present invention, is intended to cover operational settings for any suitable bathing unit component or components that can be operated by a user of the bathing system.

In normal operation, water flows from the bathing unit receptacle 18, through the drains 22 and is pumped by water pump 13 through the heating module 30 where the water is heated. The heated water then leaves the heating module 30 and re-enters the bathing unit receptacle 18 through jets 20. In addition, water flows from the bathing unit receptacle 18, through different drains 22 and is pumped by water pump 11 through filter 26. The filtered water then re-enters the bathing unit receptacle 18 through different jets 20. Water can flow through these two cycles continuously while the bathing system 10 is in operation. Optionally, water can also flow from the bathing unit receptacle 18 through one or more drains 22 to an air blower 28 that is operative for delivering air bubbles to water that re-enters the bathing unit receptacle 18 through jets 20.

The network-enabled controller 24 receives electrical power from an electric power source 36 that is connected thereto via service wiring 51. The power source 36 supplies the network-enabled controller 24 with any conventional power service suitable for residential or commercial use. In a non-limiting implementation, the power source 36 can supply 240 volts (V) AC to the network-enabled controller 24 via service wiring 51. In an alternative non-limiting implementation, the power source 36 can supply 120 volts (V) AC to the network-enabled controller 24 via service wiring 51. In yet a further alternative non-limiting implementation, the power source 36 can supply 120 Volts and 240 Volts AC to the network-enabled controller 24 via service wiring 51. It is to be appreciated that other voltage supply values or voltage supply combinations, for example depending on geographical location, are possible without detracting from the spirit and scope of the invention. In a non-limiting implementation, the service wiring 51 is passed through a ground fault circuit interrupter (GFCI) that is adapted for tripping in the presence of a current leakage to the ground. The ground fault circuit interrupter (GFCI) provides an added safety measure to the bathing system.

The spa functionality controller 34 is configured for controlling the distribution of power supplied to the various bathing unit components 11, 13, 26, 28, 30 in order to cause desired operational settings to be implemented on the basis of program instructions and signals received from the user control panel 31 or from a device external to the system 10 through the network processing unit 40. The spa functionality controller 34 may also receive control signals from various sensors 71 in order to cause the desired operational settings to be implemented. Manners in which the spa functionality controller 34 can be used to control the individual bathing unit components of the bathing system, such as for example the jets 20, the drains 22, the heating module 30, the water pumps 11 and 13, the filter 26, the air blower 24, a valve jet sequencer for massage, a variable speed pump with a pre-programmed massage setting, a water fall, an aroma therapy device and an atomizer, as well as any lighting and multimedia components, are well known in the art and are not critical to the invention and as such will not be described in further detail here.

A mentioned above, and as depicted in FIG. 1, the network-enabled controller 24 includes a network processing unit 40 for coordinating interactions between the spa functionality controller 34 and external devices. The network processing unit 40 is in communication with a memory unit 42 and a network interface 68. The network interface 68 may be of any suitable type known in the art including a wireless interface and wired interface. In a non-limiting implementation, the network interface 68 includes a wireless antennae suitable transmitting signal in a WiFi network. It is however to be understood that any suitable network interface, including for example but without being limited to a cellular interface, power line transmission and low power long range transmission (ex: LoRa, Sigfox), may be used in alternate embodiments. The memory unit 42 stores program instructions for execution by the network processing unit 40 for coordinating interactions between spa functionality controller 34 and external devices (not show in FIG. 1).

The memory unit 42 stores program instructions and data for use by the network processing unit 40. The data stored in the memory 42 includes, amongst others, information conveying operational settings associated with components in the bathing unit. For example, the operational settings may include temperature control settings, jet control settings, and lighting settings, among other possibilities. The memory 42 may also store water temperature information conveying water temperature measurements for water in the bathing system. The program instructions stored in the memory unit 42 when executed by the network processing unit 40 provide network related functionality which will be described in greater detail in the present application.

In specific practical implementations, different suitable types of network connections may be used in in the context of providing remote control and monitoring capability for the bathing system depicted in FIG. 1. In this regard, various practical mechanisms have been proposed. For additional information, the reader may refer for example to U.S. patent application publication no. US2013-0166965-A1 published on Jun. 28, 2013 and to U.S. Pat. No. 7,292,898 issued on Nov. 6, 2007. The contents of the aforementioned documents are incorporated herein by reference.

In the present document, one specific type of network architecture will be described for the purpose of illustrating a specific embodiment. It is however to be expressly understood that, while an example is described, any suitable practical mechanism for providing a network connection in the context of providing features of the invention may be used in alternate embodiments.

Figure 2:
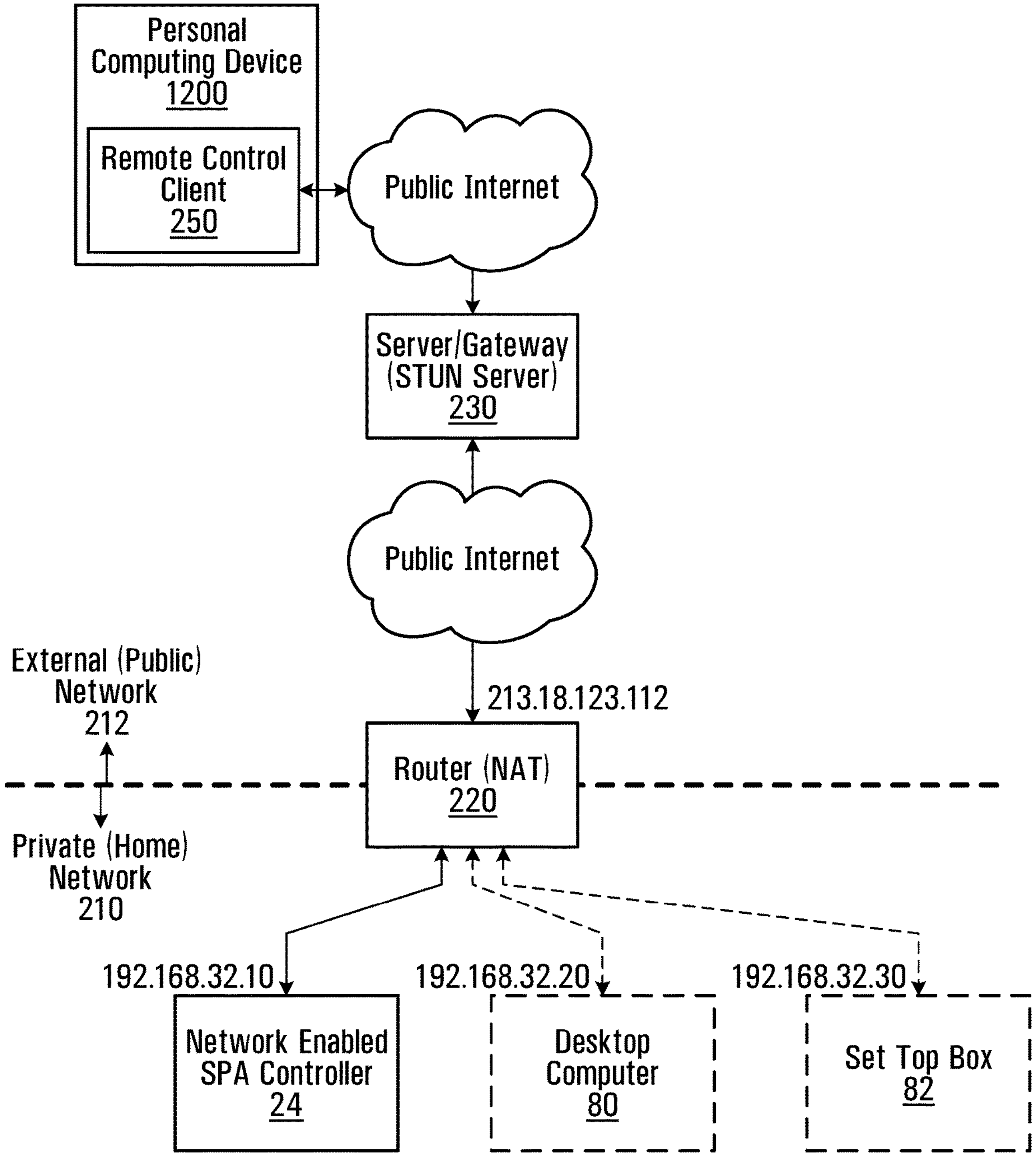
FIG. 2 shows a simplified block diagram of a system for facilitating remote control and monitoring of the bathing unit system shown in FIG. 1 including a server implementing a gateway, a customer personal computing device, and a technician personal computing device, in accordance with a non-limiting example of the present invention.

As such, in a specific practical example of implementation, the network-enabled controller 24 is used to facilitate the remote control and monitoring of the bathing system depicted in FIG. 1 in the context of a system of the type shown in FIG. 2. A depicted, the system includes the network-enabled controller 24, a router 220, an Internet accessible server 230 implementing a gateway, and a customer personal computing device 1200 implementing a customer remote control client 250. In a non-limiting example the system establishes a TCP or UDP socket type connection between the network-enabled controller 24 and the customer personal computing device 1200 implementing a customer remote control client 250 through the Internet accessible server 230. In this manner, the network-enabled controller 24 and the customer personal computing device 1200 implementing a customer remote control client 250 can communicate with one another through the Internet accessible server 230 while one or both are in respective private networks. A "Keepalive" type communication can be used in case of an asymmetric network in order to maintain an active communication link between the network-enabled controller 24 and the Internet accessible server 230 and, optionally, between the customer remote control client 250 and the Internet accessible server 230.

More specifically, in use, the network-enabled controller 24 is in communication with the router 220.

The router 220 includes the necessary functionality for establishing a private (home) network 210 to which different network-enabled devices can connect. Amongst others, the router 220 is configured for assigning to each connected device on the private (home) network 210 a respective private network address that is used for communicating with the router and other devices within the network 210. In the example depicted in FIG. 2, the private (home) network 210 established by router 220 is shown as having three networked devices connected thereto including the network-enabled controller 24, a desktop computer 80 and a set top box 82. It is to be appreciated that the devices other than the network-enabled controller 24 have been shown in FIG. 2 for the purpose of illustration only and that additional or fewer devices may be connected to the private (home) network 210 along with the network-enabled controller 24.

As mentioned, the router 220 is configured to assign to each device a respective private network address that is used within the network 210. The router 220 also acts as an interface for communications between devices within the private (home) network 210 and devices residing on networks outside the private (home) network 210. In connection with such communications, the router 220 implements a network address translator (NAT) mechanism whereby the private network addresses of the devices in the private (home) network 210 are mapped to one public IP/Internet address. The public IP/Internet address will typically be assigned by an Internet service provider. There are different types of NATs that can be implemented by the router such asymmetric Cone, Symmetric Cone, or completely asymmetric. Routers suitable for establishing private (home) networks which provide Network Address Translation (NAT) capabilities are known in the art and will therefore not be described in further detail here.

In use, the network-enabled controller 24 is also in communication with the Internet accessible server 230, which implements a gateway. The server 230 is associated with a public IP/Internet address and is accessible by the network-enabled controller 24 over the public Internet.

When the network enabled controller 24 establishes a communication with the server 230 through the router 220, the server is programmed for processing that communication to obtain a public network address associated with the network-enabled controller 24. This public network address can then be sent back to the network-enabled controller 24 so that the network-enabled controller 24 is made aware of the public network address that it is using. In a specific example, the public network address associated with the network-enabled controller 24 includes an IP address component associated with the home router 220 and a port identifier component associated with the network-enabled controller 24, wherein the port identifier component was assigned by router 220. Different methods for obtaining the public network address may be used. In a specific practical implementation, the server 230 implements a STUN protocol to obtain the public network address associated with the network-enabled controller 24, wherein the network-enabled controller 24 implements a client portion of the STUN protocol. STUN is an acronym for referring to a Simple traversal of User Datagram Protocol (UDP) through Network address translators (NATs). A STUN protocol allows applications operating through a Network address translator (NAT) to discover the presence of a network address translator and to obtain the mapped (public) IP address (NAT address) and port number that the NAT has allocated for the application's User Datagram Protocol (UDP) connections to remote hosts. STUN techniques have been used in connection with IP telephony (VoIP) for establishing communication links between two secured devices behind respective NATs. The specific manner in which a STUN protocol is implemented may vary from one implementation to the next and is not critical to the present application and therefore will not be described in further detail here. Other techniques for obtaining the public network address associated with the network-enabled controller 24 may also be used in alternative examples of implementation for example Traversal Using Relay NAT (TURN) and Interactive Connectivity Establishment (ICE) could be used. For the purpose of simplicity, the examples presented in the present application will consider the case where a STUN protocol is used by the server 230.

Figure 3:
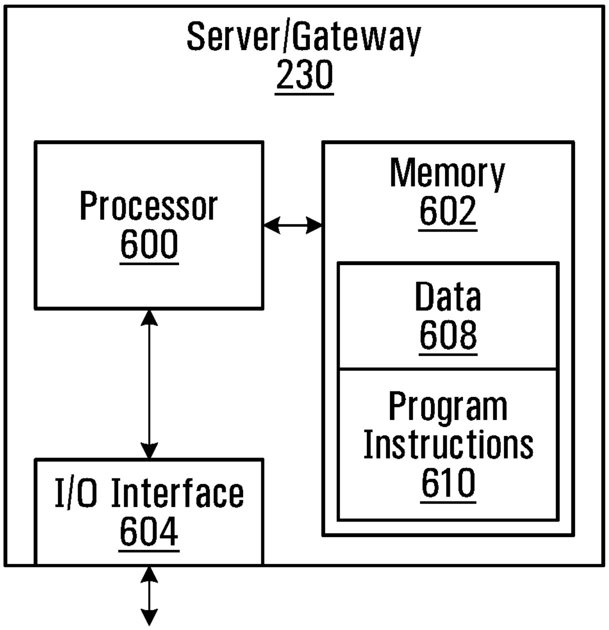
FIG. 3 shows a more detailed block diagram of the server depicted in FIG. 2 in accordance with a non-limiting example of the present invention.

FIG. 3 shows a functional block diagram of the server 230 in accordance with a non-limiting example of the present invention. As shown, the server 230 includes a processor 600 and memory unit 602 connected by a communication bus. The memory unit 602 includes data 608 and program instructions 610. The processor 600 is operative for processing program instructions 610 and data 608 stored in the memory unit 602 for implementing the functionality of the server 230. The server 230 also includes one or more I/O interfaces 604 for communicating with external devices including one or more network-enabled spa controllers, such as network-enabled spa controller 24, and one or more devices implementing remote control clients, such as customer personal computing device 1200 implementing customer remote control client 250 and technician personal computing device 1300 implementing technician remote control client 350. It is to be appreciated that although the server 230 has been depicted as a single physical device with a single processor in FIG. 3, in practical implementations server 230 may be implemented by a single physical device with one or more processors or by multiple physical devices each having one or more processors. In the case were the server is implemented by multiple devices, the latter may reside in a same location or in different locations.

In use through the server 230, in the system depicted in FIG. 2, the network-enabled controller 24 also enters in communication with the customer personal computing device 1200 implementing the customer remote control client 250 and the technician personal computing device 1300 implementing technician remote control client 350.

The customer remote control client 250 that is implemented on the customer personal computing device 1200 and the technician remote control client 350 that is implemented on technician personal computing device 1300 provide users with remote access to the network-enabled controller 24 of the bathing system 10. More specifically, the customer personal computing device 1200 and the technician personal computing device 1300 communicate with the network-enabled controller 24 through the server 230 to transmit data based on information entered by the users via the customer remote control client 250 or the technician remote control client 350. In this manner, for example, a customer or a technician may provide commands to the network-enabled controller 24 in order to activate and/or modify the operational settings of the bathing unit components without actually having to be in proximity to the bathing unit system 10. For example, a customer or technician may be able to initiate activation of one or more bathing unit components (e.g. activate a pump, jet, heater, lights or other), and/or adjust the operational settings of the one or more bathing unit components (e.g. such as set a water temperature or an ambience setting), while the customer is travelling home from work, such that the bathing system 10 is ready for the customer by the time the customer gets home. Similarly, a technician may be able to provide a command to remotely initiate or activate one or more bathing unit component(s) for diagnostic/troubleshooting purposes.

Figure 4:
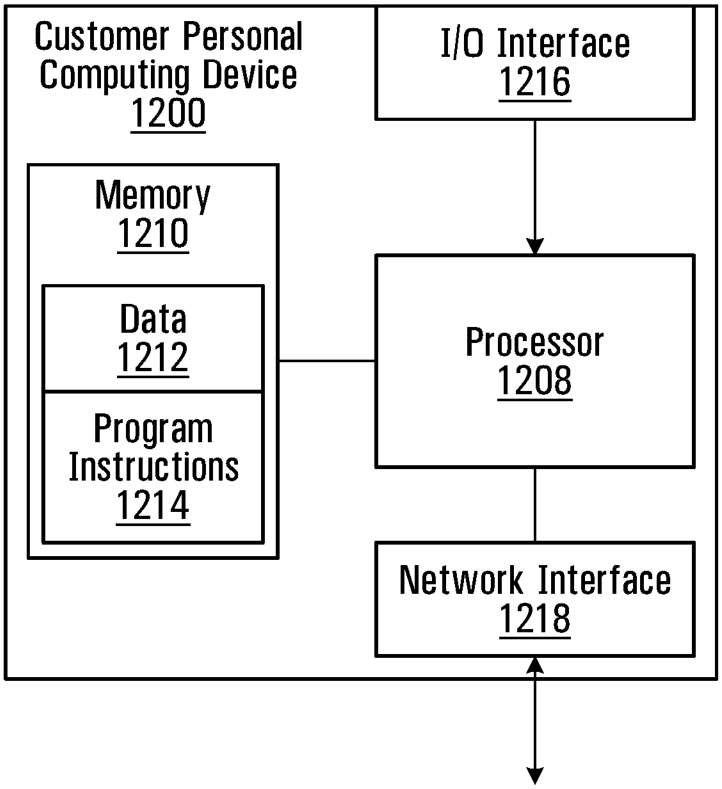
FIG. 4 is a block diagram of a customer personal computing device for remotely controlling and monitoring the bathing system depicted in FIG. 1 in accordance with a non-limiting example of the present invention.

FIG. 4 shows a functional block diagram of the customer personal computing device 1200 in accordance with a non-limiting example of the present invention. As shown, the customer personal computing device 1200 includes a processor 1208 and memory unit 1210 connected by a communication bus. The memory unit 1210 includes data 1212 and program instructions 1214. The processor 1208 is operative for processing program instructions 1214 and data 1212 stored in the memory unit 1210 for implementing the functionality of the customer remote control client 250. The customer personal computing device 1200 also includes one or more I/O interfaces 1216 for communicating with external devices including but not limited to a display screen and one or more user operable inputs. The customer personal computing device 1200 also includes a network interface module 1218 for exchanging signals with external devices including the Internet-based server 230.

Figure 5:
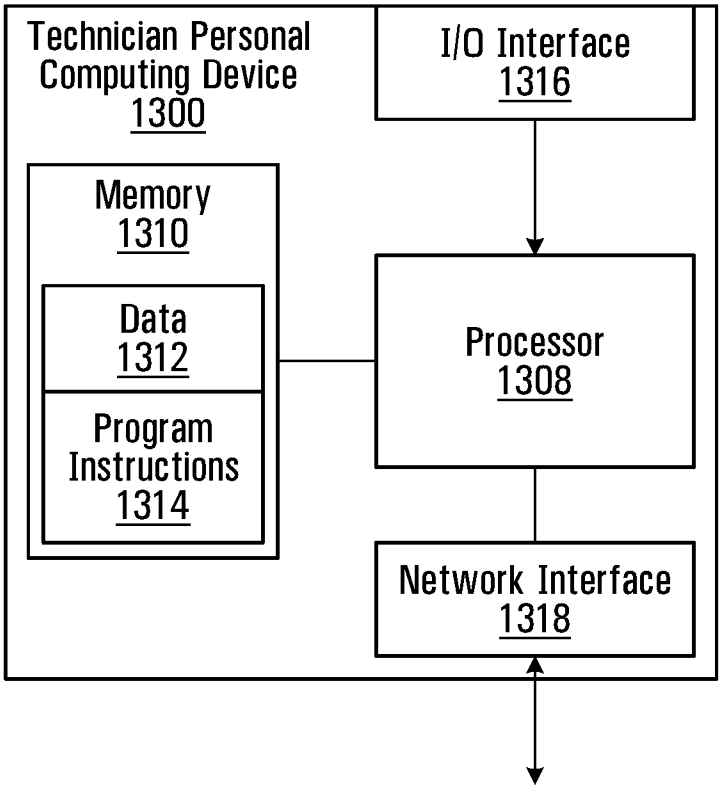
FIG. 5 is a block diagram of a technician personal computing device for remotely controlling and monitoring one or more bathing unit systems, including for example the bathing system depicted in FIG. 1 in accordance with a non-limiting example of the present invention.

FIG. 5 shows a functional block diagram of the technician personal computing device 1300 in accordance with a non-limiting example of the present invention. As shown, the technician personal computing device 1300 includes a processor 1308 and memory unit 1310 connected by a communication bus. The memory unit 1310 includes data 1312 and program instructions 1314. The processor 1308 is operative for processing program instructions 1314 and data 1312 stored in the memory unit 1310 for implementing the functionality of the technician remote control client 350. The technician personal computing device 1300 also includes one or more I/O interfaces 1316 for communicating with external devices including but not limited to a display screen and one or more user operable inputs. The technician personal computing device 1300 also includes a network interface module 1318 for exchanging signals with external devices including the Internet-based server 230.

In practical implementations, the customer personal computing device 1200 and the technician personal computing device 1300 may be embodied as any suitable type of computing device known in the art. For example, the customer and technician personal computing devices 1200 and 1300 may be a personal computer such as a desktop or laptop computer, or they may be a portable hand-held computing device, such as a PDA, a cell phone, a smart phone (such as a Blackberry™ or an iPhone™), or a web-enabled computing device (such as an iTouch™, iPad™ or computer Tablet), among other possibilities.

The customer remote control client 250 implemented by the customer personal computing device 1200 and the technician remote control client 350 implemented by the technician personal computing device 1300 provide, amongst others, spa control and monitoring functionality. The spa control and monitoring functionality enables a user to provide commands or other information in connection with the control of a bathing unit system, such as the bathing unit system 10 shown in FIG. 1, as well as to request status information in connection with the bathing unit system. Amongst others, the customer remote control client 250 and the technician remote control client 350 implement respective user interfaces that can be displayed on display screens of the customer personal computing device 1200 or the technician personal computing device 1300, respectively. In a specific implementation, the customer personal computing device 1200 and the technician personal computing device 1300, each include a user input device (which can also be referred to as user operable controls) and a display screen. The display screen is operative for displaying a graphical user interface (GUI) to a user that provides the user with information regarding the bathing system and enables the user to input commands for controlling various bathing unit components of the bathing system. Amongst others, the user can input commands affecting the spa water temperature, the operation of the jets, the operation of the lights and any other spa components in the bathing unit system. In accordance with a non-limiting example, the GUI may be configured such as to allow a user to navigate there through and adapt the via the user input device in order to access desired information, enter commands and/or provide desired inputs for adjusting and activating the operational settings of the bathing unit components. In a specific implementation, the customer remote control client 250 and the technician remote control client 350 implement functionality for exchanging messages with the network-enabled controller 24 (shown in FIGS. 1 and 2). As part of this functionality, the GUIs implemented by the customer personal computing device 1200 and the technician personal computing device 1300 may be configured for visually conveying operational settings information associated with the bathing system associated with the network-enabled spa controller 24 at least in part based on the messages exchanged with the network-enabled controller 24, the operational settings information associated with the bathing system including water temperature settings associated with the bathing system.

The particular spa control and monitoring functionality provided by the customer remote control client 250 may vary from one implementation to the other and is not critical to the present application and as such will not be described in greater detail here. For greater information on the type of spa control and monitoring functionality that can be provided through customer remote control client 250 executed by the customer personal computing device 1200 and the technician remote control client 350 executed by the technician personal computing device 1300, the reader is invited to refer to the following co-pending U.S. patent applications:

- U.S. patent applicant Ser. No. 12/916,160, filed on Oct. 29, 2010, entitled "A METHOD AND SYSTEM FOR CONTROLLING A BATHING SYSTEM IN ACCORDANCE WITH AN ENERGY SAVINGS MODE", by Benoit Laflamme et al.; and
- U.S. patent applicant Ser. No. 12/910,615, filed on Oct. 22, 2010, entitled "A METHOD AND SYSTEM FOR PROVIDING AMBIANCE SETTINGS IN A BATHING SYSTEM", by Benoit Laflamme et al.; and
- U.S. patent applicant Ser. No. 13/336,513, filed on Dec. 23, 2011, entitled "A METHOD AND SYSTEM FOR PROVIDING REMOTE MONITORING AND CONTROL OF A BATHING SYSTEM", by Christian Brochu et al.

The contents of the aforementioned documents are incorporated herein by reference.

The customer remote control client 250 implemented by the customer personal computing device 1200 and the technician remote control client 350 implemented by the technician personal computing device 1300 may also implement remote connectivity functionality for establishing a communication link with the network-enabled controller 24 through the router 220.

In the example depicted in FIG. 2, customer personal computing device 1200 and technician personal computing device 1300 have been shown as being part of a public (Internet) network. It is noted that in cases where the remote control client is on a public (Internet) network, no NAT traversal protocol is required since the public address is already known. Although customer personal computing device 1200 and technician personal computing device 1300 have been shown in FIG. 2 as being part of a public (Internet) network, in alternative embodiments the customer personal computing device 1200 and/or the technician personal computing device 1300 may be located in a private network distinct from private network 210 and may be connected to the public Internet via a router implementing a network address translator (NAT) protocol.

In implementations in which the communication relationship to be established between the customer remote control client 250 and the network-enabled spa controller 24, and between the technician remote control client 350 and the network-enabled spa controller 24, through the server 230 are client-server relationships in which the customer remote control client 250 and the technician remote control client 350 behave as "clients" and issue requests to the network-enabled spa controller 24 and in which the network-enabled spa controller 24 behaves as the "server" and replies to these requests, no NAT traversal protocol on the side of the customer remote control client 250 or the technician remote control client 350 is required since each exchange between the remote control clients 250 and 350 and the network-enabled spa controller 24 is initiated by the customer remote control client 250 or the technician remote control client 350. In alternate implementations in which it is desirable for the remote control client 250 and 350 and the network-enabled spa controller 24 to establish a peer-to-peer communication relationship, in which any one of the network-enabled spa controller 24, the customer remote control client 250, and the technician remote control client 350 can initiate a communication, a NAT traversal protocol such as STUN may also be applied by the server to the remote control clients 250 and 350 in order to determine the public network addresses of the remote control clients.

For the purpose of simplicity, the present description will consider a situation in which a NAT traversal protocol on the side of the remote control clients 250 and 350 is not required. In light of the present description, it will become readily apparent to the person skilled in the art how a NAT traversal protocol could be applied in connection with the remote control clients 250 and 350 and as such no further details will be provided here.

In practical implementations of the remote control and monitoring system depicted in FIG. 2, the server 230 will be configured for interconnecting a plurality of network enabled controllers, such as network enabled controller 24, with a plurality of personal computing devices executing remote control clients, such as personal computing device 1200 and remote control client 250.

Figure 6:
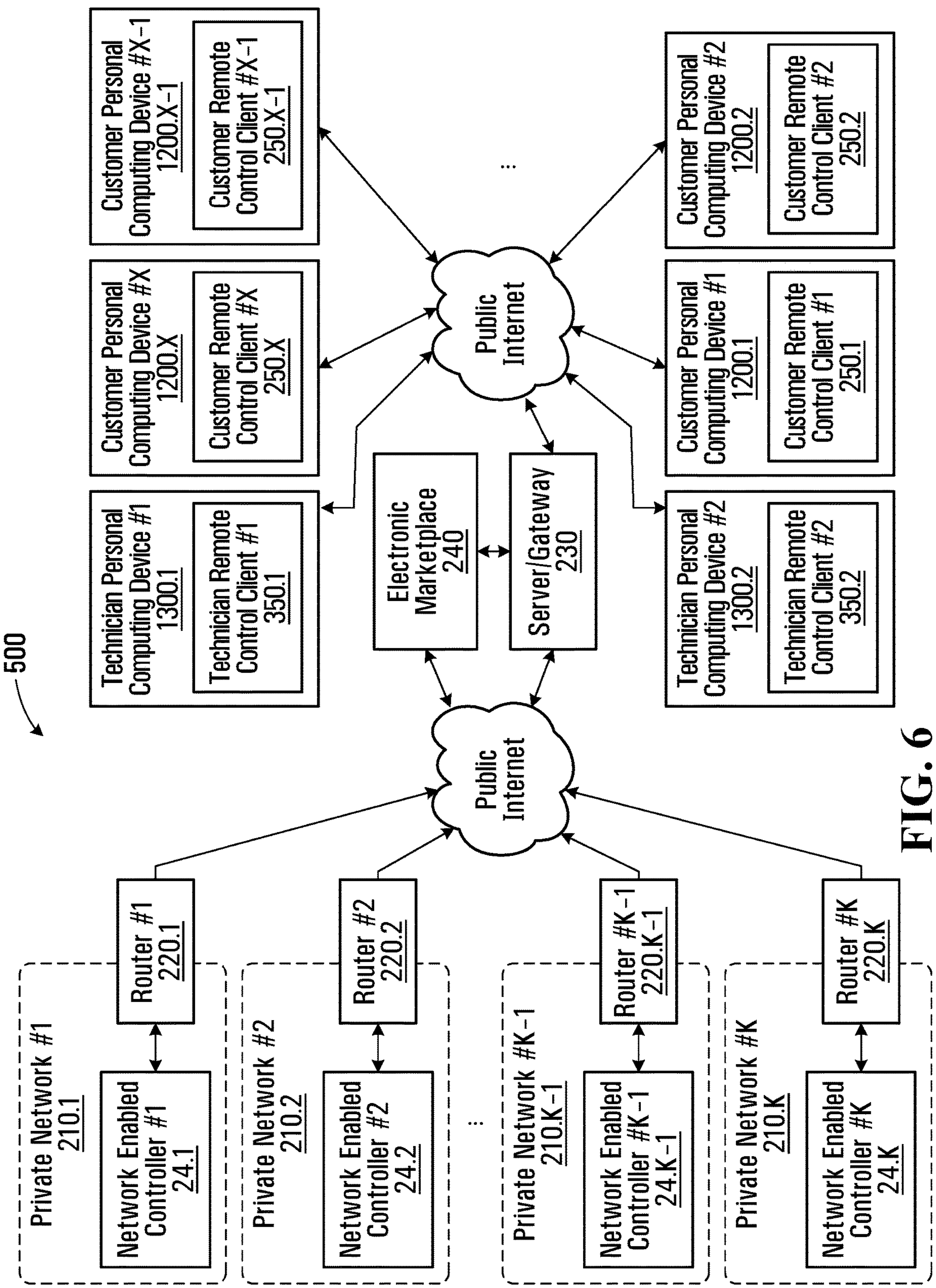
FIG. 6 shows a block diagram of a system for facilitating remote control and monitoring of network-enabled bathing unit systems by customers and/or technicians, wherein the system includes a server in accordance with a non-limiting example of the present invention.

FIG. 6 of the drawings is a block diagram of a system 500 including the server 230 for enabling control and monitoring of network-enabled controllers for bathing units by remote control clients that include both customer remote control clients and technician remote control clients. As shown, the system 500 includes a plurality of network enabled spa controllers 24.1 to 24.*k* (#1 to #K), a plurality of customer personal computing devices 1200.1 to 1200.X running customer remote control clients 250.1 to 250.X (#1 to #X), and a plurality of technician personal computing devices 1300.1 and 1300.2 (in the example two are shown) running technician remote control clients 350.1 and 350.2, which can communicate with one another over the public Internet using communication links established through server 230.

In some implementations, the system 500 may also include an electronic marketplace 240 through which technicians and/or customers may purchase accessories, replacement components or part thereof, for a bathing unit system. As will be discussed in further detail later on, such purchases may be made by a technician via the technician remote control client 350 executing on the technician's personal computing device 1300, or by a customer via the customer remote control client 250 executing on the customer's personal computing device 1200 or via a similar customer control client 250 executing on a network-enabled controller 24 that is part of a customer's bathing unit system.

Each one of network enabled spa controllers 24.1 to 24.k (#1 to #K) may be analogous to network enabled spa controller 24, described above with reference to FIG. 2, and is part of a respective private network established by a corresponding router. Each one of private network 210.1 to 210.k (#1 to #K) may be analogous to private (home) network 210 described previously with reference to FIG. 2 and each one of router 220.1 to 220.k (#1 to #K) is analogous to router (NAT) 220 also described previously with reference to FIG. 2. Similarly each one of customer personal computing devices 1200.1 to 1200.X running customer remote control clients 250.1 to 250.X (#1 to #X) may be analogous to personal computing device 1200 running customer remote control client 250 described previously with reference to FIG. 4. Similarly each one of technician personal computing devices 1300.1 and 1300.2 running remote control clients 350.1 and 350.2 may be analogous to technician personal computing device 1300 running technician remote control client 350 described previously with reference to FIG. 5. It is noted that a specific remote control client (say customer remote control client 250.1 or technician remote control client 350.1) may exchange messages with one or more network-enabled controllers, for example network-enabled controllers 24.1 and 24.2. Similarly, a specific network-enabled controller, say network-enabled controller 24.1, may exchange messages with one or more remote control clients, say for example customer remote control client 250.1 and technician remote control client 350.1.

In a specific non-limiting example of implementation, the server 230 maintains active communications links with the network enabled spa controllers 24.1 to 24.k (#1 to #K). In a first implementation, active communication links may also be maintained between the server 230 and each of the customer personal computing devices 1200.1 to 1200.X and the technician personal computing devices 1300.1 and 1300.2. Alternatively, the communication links between the server 230 and a given one of the personal computing devices 1200.1 to 1200.X, 1300.1 and 1300.2 may be established when the personal computing device wishes to send a message to a designated one of the network enabled spa controllers 24.1 to 24.k (#1 to #K) and destroyed once a reply is received and/or the communication link remains unused for a period of time exceeding a certain delay. It is to be appreciated that the specific practical manner in which communication links are established may vary between implementations as will become apparent to person skilled in the art.

The server 230 in the system of FIG. 6 may implement various processes in connection with enabling control and monitoring of network-enabled controllers for bathing units by remote control clients. As mentioned with reference to FIG. 3 showing a functional block diagram of the server 230, the server 230 includes a processor 600 and memory unit 602 connected by a communication bus. In a system of the type depicted in FIG. 6, the memory unit 602 may store an address-translation table allowing mapping information associated with different registered network enabled spa controllers 24.1 to 24.k (#1 to #K) in the system 500 to information associated with respective personal computing devices 1200.1 to 1200.X, 1300.1 and 1300.2.

FIG. 7 shows a conceptual illustration of an address-translation table that may be stored in memory 602 of server 230 in accordance with a non-limiting implementation. In the example illustrated, the table includes a plurality of entries 750 each of which is associated with a respective registered network-enabled controller with which a communication link is being maintained. Each registered network-enabled controller may be associated with identification information (e.g. a MAC address) 752, a public IP address 754, a public port 756 and information associated with one or more personal computing devices. The information associated with one or more personal computing devices may include permissions settings associated with certain personal computing devices 758, the personal computing device(s) currently linked with a specific network-enabled controller 760 as well as the public IP address 762 and public port (not shown in the Figures) of the personal computing device linked with the network-enabled controller.

For example, as shown in FIG. 7, the customer who owns and operate the bathing unity system corresponding to Spa Controller IDs "Roberts SPA", has registered a customer personal computing device identified as "Roberts—Mobile Device" implementing a customer remote control client to remotely control and monitor his respective bathing unit system. This customer has also authorized a technician associated with a technician personal computing device identified as "Technician #1 Mobile Device" implementing a technician remote control client to remotely control and monitor his bathing unit system. Also shown in FIG. 7, the customer owns and operates the bathing unity system corresponding to Spa Controller IDs "MAC Address", has registered customer personal computing device identified as "Anna's Tablet" to remotely control and monitor her bathing unit system. This customer has also authorized the technician associated with the technician personal computing device identified as "Technician #1 Mobile Device" to remotely control and monitor his bathing unit system.

Technician Personal Computing Device 1300'

Figure 8:
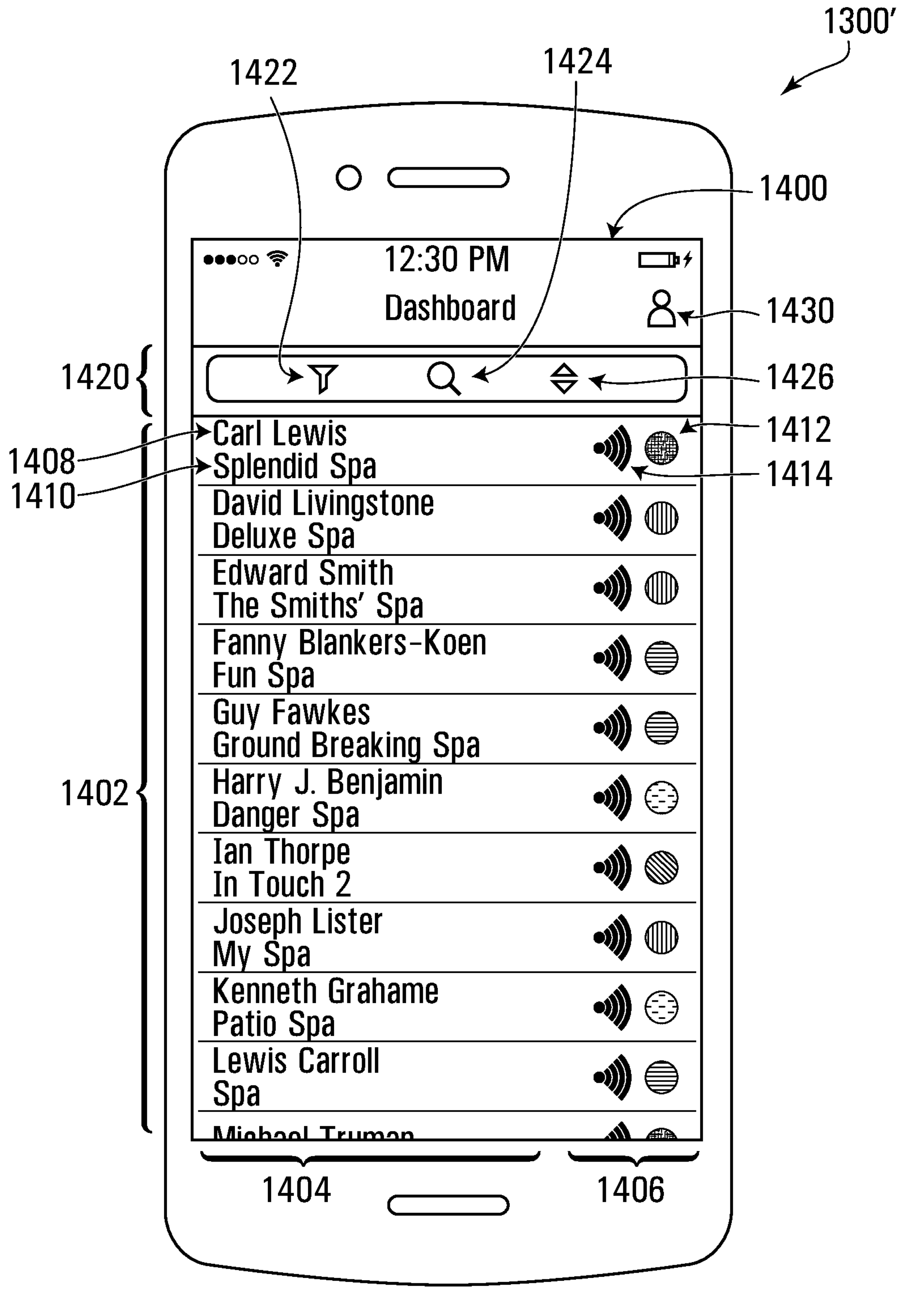
FIG. 8 shows a non-limiting example of a graphical user interface for a technician remote control client showing a dashboard interface for controlling and monitoring multiple remote network-enabled bathing unit systems owned and operated by different customers in accordance with the present invention.

FIG. 8 is a specific example of a technician personal computing device 1300' implementing a technician remote control client suitable for use in connection with the system shown in FIG. 8 in accordance with a non-limiting example of the present invention. The technician personal computing device 1300' is in the form of a smart phone having a display screen 1400. The personal computing device 1300' executes program instructions implementing a technician remote control client including a graphical user interface (GUI) which is displayed on the display screen 1400 presenting dashboard interface to enable a bathing unit system service technician or a service technician team to centrally control and monitor multiple remote network-enabled bathing unit systems that may be owned and operated by different customers. In this non-limiting example, the program instructions implementing the technician remote control client are part of a software application that can be downloaded to the personal computing device 1300' from an Internet accessible server according to suitable known methods.

The GUI depicted in FIG. 8 is configured to present a listing 1402 of bathing unit systems including a plurality of entries associated with respective bathing unit systems that may be owned and operated by different customers. In this specific example, each entry in the listing 1402 corresponds to a respective bathing unit and includes identification information 1404 and operational status indicators 1406. In this specific example, the identification information 1404 includes customer identification information 1408 and bathing unit system identification information 1410. The operational status indicators 1406 for a given entry in the listing convey operational status information related to the corresponding bathing unit system. Different types of operational status information, and different manners of conveying it, may be contemplated in different implementations. In addition, different types of information may also be conveyed. In the specific example depicted in FIG. 8, the operational status indicators 1406 include a color-coded operational status indicator 1412 and a network connection status indicator 1414.

Figure 9:
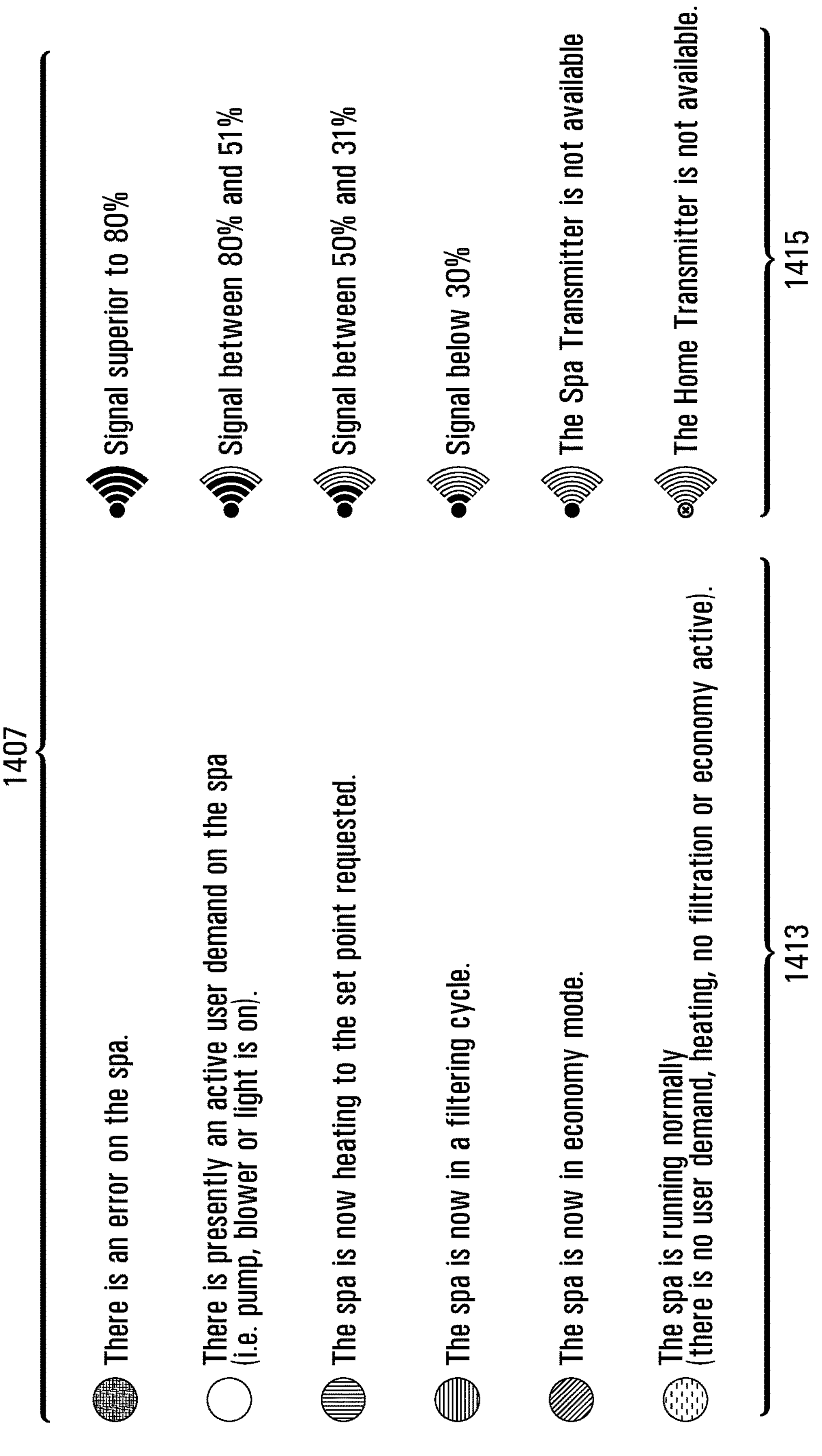
FIG. 9 shows non-limiting examples of operational status indicators for bathing unit systems that may be used to convey information in connection with the dashboard interface shown in FIG. 8 in accordance with the present invention.

FIG. 9 shows non-limiting examples of the codes that may be used for operational status indicators 1407 that include a set of color-coded operational status indicators 1413 and a set of network connection status indicators 1415 for bathing unit systems in accordance with the present invention. For a specific bathing unit corresponding to an entry in the listing 1402 of bathing unit systems, the selection of a specific color-coded operational status indicator from the set of color-coded operational status indicators 1413 may be performed at least in part by processing data conveying operational status information received at the computing device 1300' from the server 230 shown in FIG. 6. In the specific example depicted, the network connection status indicators 1415 convey an indication of the signal strength on a wireless link between a bathing unit system controller and a router, such as the signal strength on a wireless link between the network enabled spa controller 24 and the Router 220 shown in FIG. 2.

Figure 10:
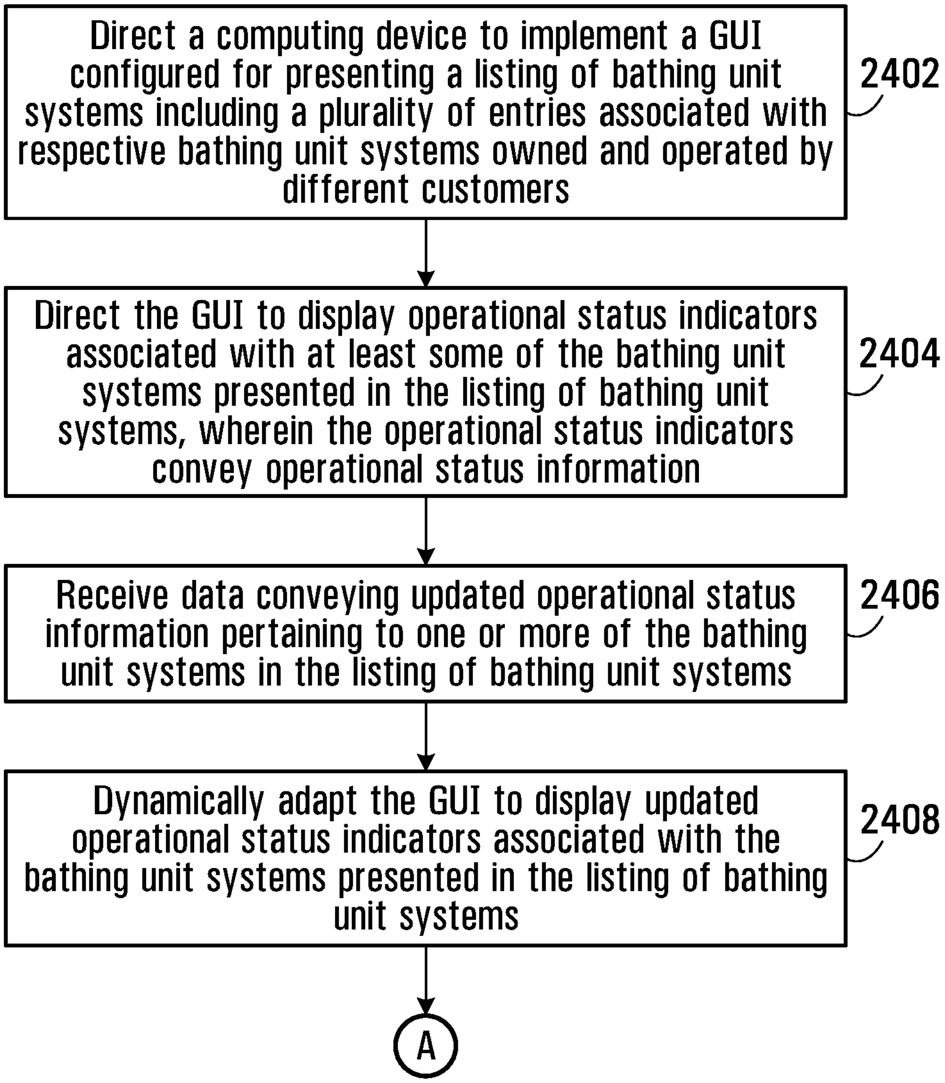
FIG. 10 shows a flow diagram of a method of facilitating centralized control and monitoring of remote network-enabled bathing unit systems owned and operated by different customers, according to a non-limiting example of the present invention.

FIG. 10 shows a flow diagram of a method for facilitating centralized control and monitoring of remote network-enabled bathing unit systems owned and operated by different customers, according to an example of implementation. In this specific example, the method is implemented on a computing device. For example, the computing device may be executing program instructions implementing a technician remote control client including a GUI which is displayed on a display screen of the computing device. As shown at step 2402, the computing device is directed to implement a GUI configured for presenting a listing of bathing unit systems including a plurality of entries associated with respective bathing unit systems owned and operated by different customers. At 2404, the computing device directs the GUI to display operational status indicators associated with at least some of the bathing unit systems presented in the listing of bathing unit systems, wherein the operational status indicators convey operational status information. At 2406, the computing device receives data conveying updated operational status information pertaining to one or more of the bathing unit systems in the listing of bathing unit systems. At 2408, the computing device dynamically adapts the GUI to display updated operational status indicators associated with the bathing unit systems presented in the listing of bathing unit systems.

The example operations of the method depicted in FIG. 10 are illustrative of a specific example embodiment. Various ways to perform the illustrated operations, as well as examples of other operations that may be performed, are described herein. Further variations may be or become apparent in view of the present description. For example, operations that may be included in some embodiments are described later in the present document with reference to the flow diagrams shown in FIGS. 14, 22, and 25.

Referring again to FIG. 8, the GUI may also include one or more user operable controls 1420 for receiving user commands to change the appearance and/or content of the listing 1402 of bathing unit systems. In the specific example depicted, the user operable controls 1420 include a user operable filter control 1422, a user operable search control 1424 and a user operable sort control 1426.

In this specific example, the user operable filter control 1422 is operable for receiving user filter commands for filtering the plurality of entries in the listing 1402 of bathing unit systems according to user-selectable filtering criteria. For example, responsive to user selection of the user operable filter control 1422 the GUI may be adaptively modified to present the user with a set of selectable filtering criteria for filtering the plurality of entries in the listing 1402 of bathing unit systems, for example by listing selectable filtering criteria in the set in a drop down menu (not shown in the figures). In some implementations, in response to receiving a specific user filter command conveying selection of a specific filtering criterion, the displayed GUI is dynamically adapted to present a filtered version of the listing 1402 of bathing unit systems that omits one or more entries from the listing of bathing unit systems according to the specific filtering criterion.

Some non-limiting examples of user-selectable filtering criteria that may be presented for user selection may include, within being limited to:

- bathing unit system identifiers, such as customer identification information 1408 and bathing unit system identification information 1410;
- operational status indicators, such as color-coded operational status indicators 1412 and network connection status indicators 1414;
- a type of bathing unit system component identified as being in need of servicing or replacement;
- a distance to a current location of the personal computing device 1300' (for example, the filtering criterion may allow omitting from the listing bathing units located more than "X" km from the personal computing device 1300', where "X" may optionally be specified by the user or may be a pre-programmed value);
- maintenance service subscription classification; and
- a type, classification or model number associated with bathing unit systems.

Figure 11:
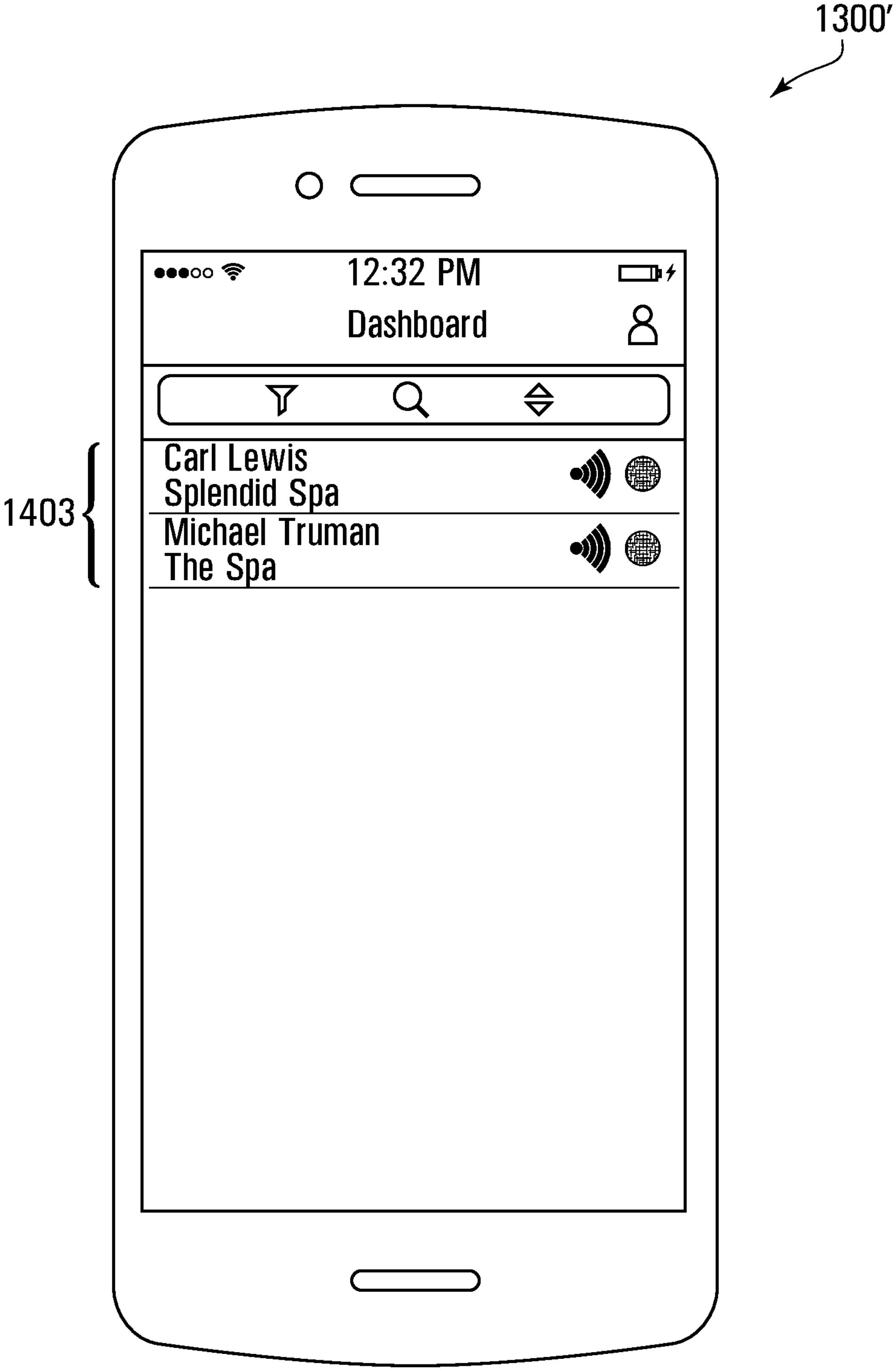
FIG. 11 shows the dashboard interface depicted in FIG. 8 updated in response to a user initiated filtering operation to filter the list of customer bathing unit systems in accordance with a non-limiting example of the present invention.

FIG. 11 shows the dashboard interface depicted in FIG. 8 adapted in response to receipt of a user filter command conveying a selection of a specific filtering criterion to present a filtered version 1403 of the listing 1402 of bathing unit systems. In particular, shown in FIG. 11 is a non-limiting example of the result of filtering of the list 1402 of bathing unit systems shown in FIG. 8 based on an operational status indicator corresponding to the yellow or "general error" color-coded operational status indicator to generate a filtered version 1403 of the listing. As can be seen in FIG. 10, the plurality of entries in the filtered version of listing 1403 of bathing unit systems omit one or more entries from the listing 1402 of bathing unit systems according to the specific filtering criterion conveyed by the specific user filter command.

Returning now to FIG. 8, in accordance with some embodiments, the displayed GUI may be configured so that some of the displayed operational status indicators 1406, such as for example those conveying an error condition, may be user-selectable to view additional information or to initiate further diagnostic processes. For example, in some embodiments general error indicators may be independently selectable through the technician's GUI, for example through a touch sensitive screen or other suitable user input device, wherein in response to receiving a user selection for a specific one of the general error indicators associated with a specific bathing unit system, the GUI may be dynamically adapted to present a diagnostic interface providing additional information on the error condition for the specific bathing unit system associated to the selected specific one of the general error indicators.

It is to be appreciated that, while FIG. 8 presented some specific types of operational status indicators 1406 in connection with entries in the listing 1402 of bathing unit systems on the technician's GUI, it is to be appreciated that other types of operational status indicators 1406 may also be contemplated to be included in the displayed either in addition to those presented in FIG. 8 or instead of those presented in FIG. 8.

Figure 12:
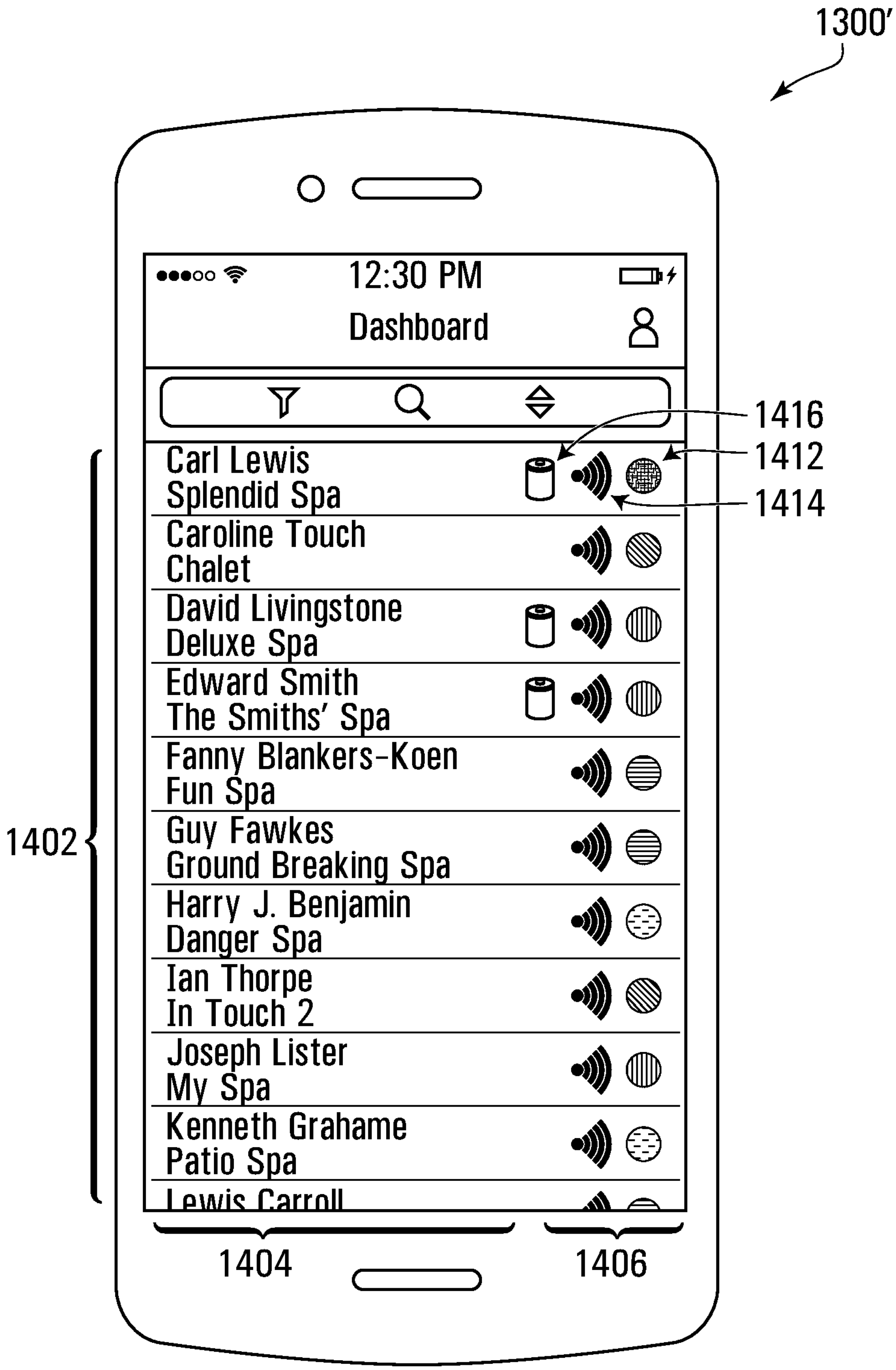
FIG. 12 shows the graphical user interface of FIG. 8 in which the dashboard interface includes component-specific error indicators for customers' bathing unit systems in accordance with a non-limiting example of implementation of the invention.

For example, FIG. 12 shows the GUI of FIG. 8 in which the dashboard interface includes component-specific error indicators 1416 for customers' bathing unit systems. In this specific example, the component-specific error indicator 1416 for the "Carl Lewis" bathing unit indicates that a water filter component requires, or will soon require, replacement or servicing. Other non-limiting examples of potential component-specific error indicators may include, without being limited to, component-specific error indicators related to:

(1) a bathing unit system heater component or part thereof, (2) a bathing unit system sanitizing component or part thereof, (3) a filter; or (4) a bathing unit system pump or part thereof, or (5) an ozonator system; or (6) a UV lamp.

In some embodiments, component-specific error indicators, such as the component-specific error indicators 1416 shown in FIG. 12, may be independently selectable by a user of the computing device 1300', wherein the GUI is configured to receive a user selection provided through a touch sensitive screen or other suitable user input device, the user selection specifying a specific component-specific error indicator associated with an entry amongst the plurality of entries presented in the listing of bathing unit systems. In response to receipt of the user selection specifying the component-specific error indicator, the GUI may be dynamically adapted to present a diagnostic interface providing additional information for error condition. For example, the diagnostic interface may include information identifying one or more specific components that may be causing the error. Optionally, the diagnostic interface may also displayed information on one or more replacement parts that may be purchased to address the error condition, either from a store or from an electronic marketplace, such as the electronic marketplace 240 shown in FIG. 6. The one or more replacement parts may be identified by processing the information identifying the one or more specific components that may be causing the error to derive replacement parts related the one or more specific components. The processing may be made with reference to a database of parts that may form part of the electronic market place 240 (shown in FIG. 6).

For example, in order to illustrate the above, if the error message indicates that there is a flow problem in the circulation system and identifies the filter as being a potential cause of the error, the diagnostic interface may display one or more replacement filter options that may be purchased.

In some embodiments, information identifying one or more replacement parts available to address the error condition for purchase in an electronic marketplace may be presented on the GUI proactively by the technician remote control client executing on the technician personal computing device 1300'. For example, the technician remote control client may process the operational status information associated with the plurality of customer bathing unit systems in the listing to identify a subset of the bathing unit systems that may be in need of replacing a specific bathing unit system component. The GUI displayed on the display screen 1400 of the personal computing device 1300' may in response be adapted to present an offer for purchasing one or more units of the specific bathing unit system component for the identified subset of the bathing unit systems.

Advantageously, by identifying multiple customers that may be in need of replacing a same component and informing the technician, the technician may be enabled to be (i) proactively contacting these customers to perform respective service appointments; (ii) order multiple components at the same thereby potentially benefiting from volume discounts; and (iii) order the components before the customer service appointments to arrive ready at the customer locations and to avoid having to schedule follow-up appointments to replace the component. As such, such functionality may assist the service technician in providing an improved and more proactive service to his customers and to do so in a more efficient manner than what was typically done in the past.

Figure 13:
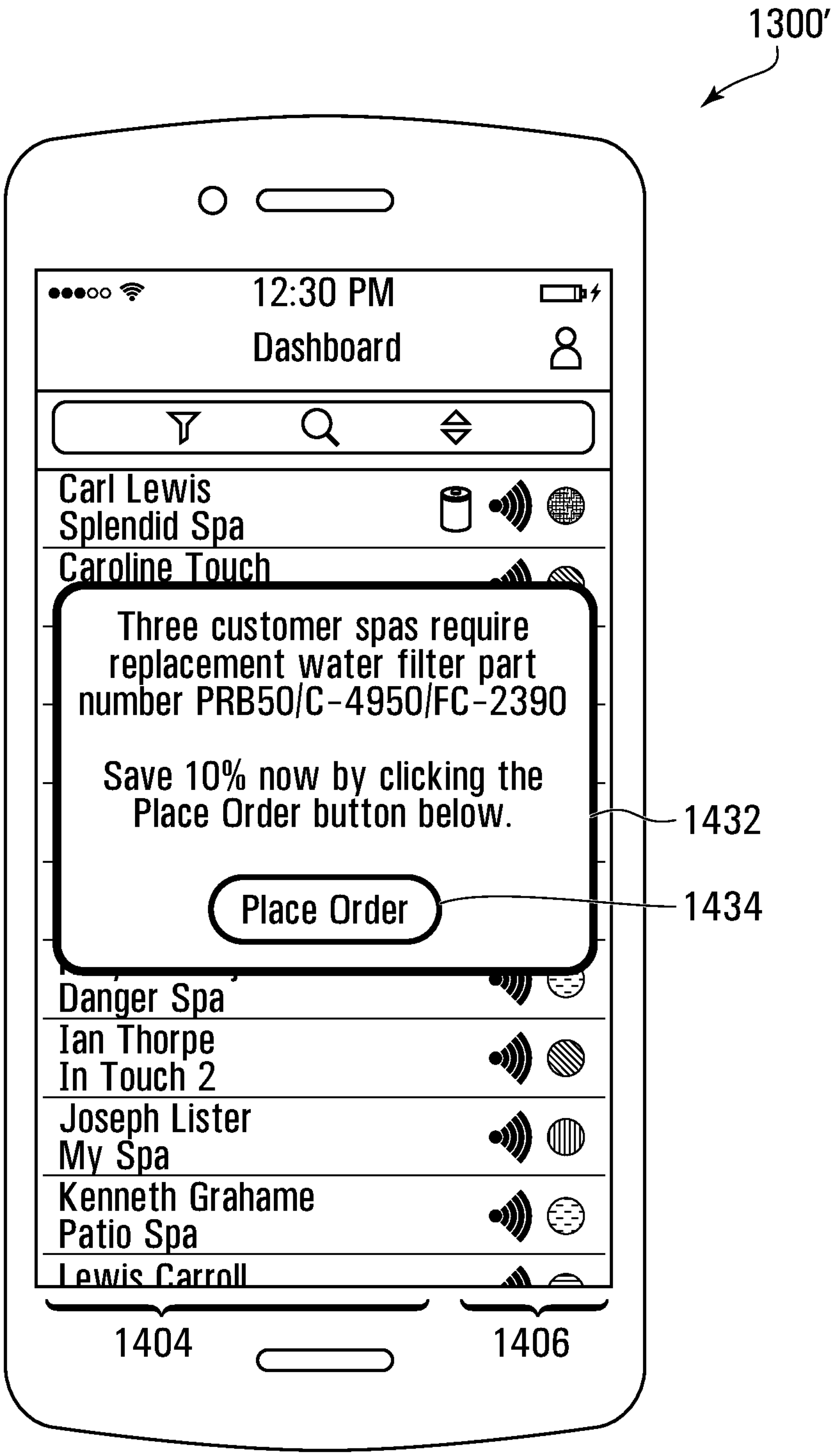
FIG. 13 shows the graphical user interface of FIG. 8 in which information conveying one or more replacement parts available for purchase in an electronic marketplace is displayed and in which a user-operable actuator is provided to initiate a purchasing process in accordance with the a non-limiting example of implementation of the invention.

FIG. 13 shows a non-limiting example of a technician's dashboard interface for a technician remote control client showing an information notification 1432 conveying one or more replacement parts available for purchase in an electronic marketplace and providing a user-operable actuator 1434 to initiate a purchasing process for the one or more parts from the electronic marketplace in accordance with the present invention.

Figure 14:
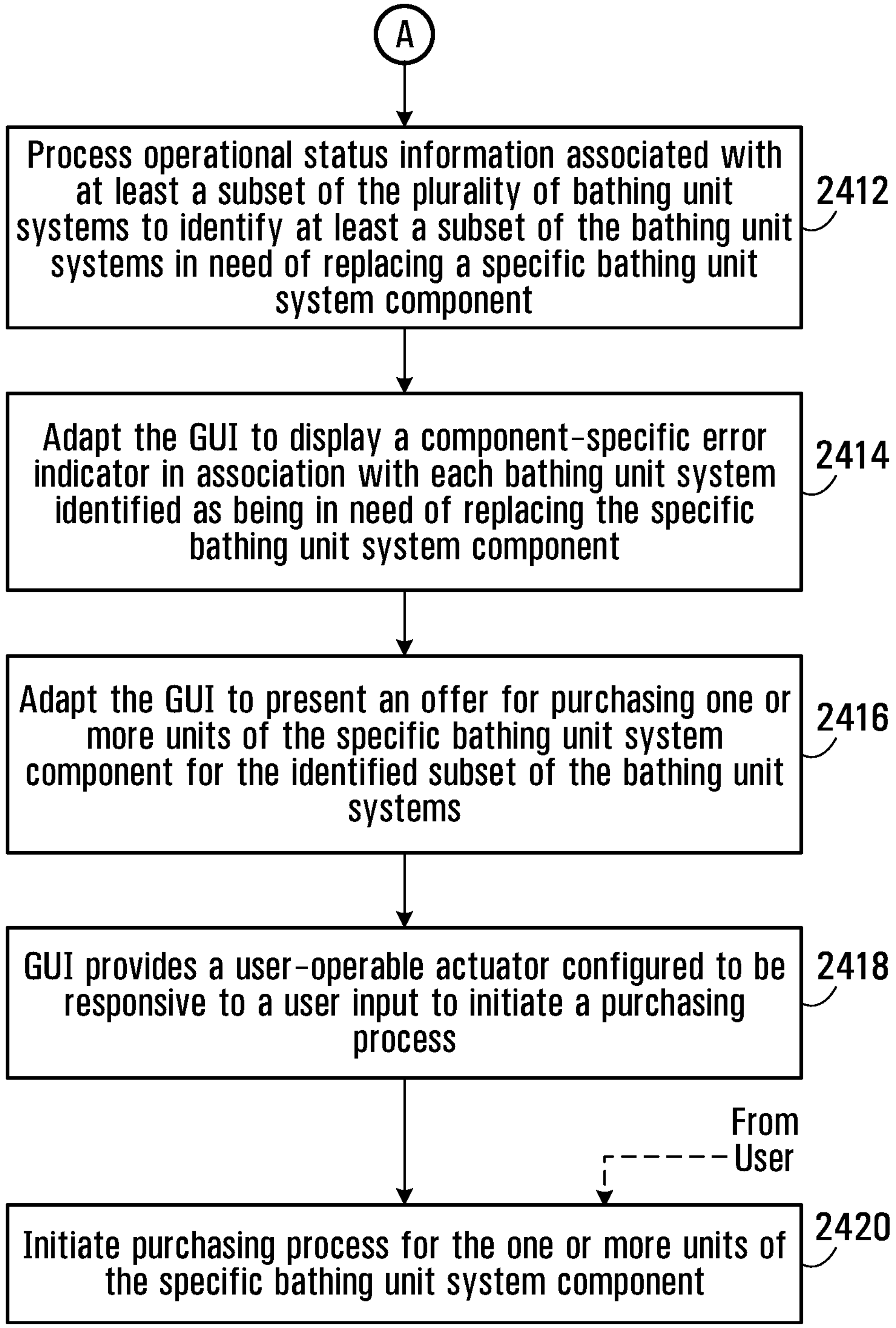
FIG. 14 shows a flow diagram of a method, implemented by a technician personal computing device, for presenting options for purchasing parts or components for centrally controlled and monitored network-enabled bathing unit systems, according to a non-limiting example of the present invention.

FIG. 14 shows a flow diagram of a method for presenting options for purchasing parts or components for centrally controlled and monitored network-enabled bathing unit systems, according to a non-limiting example of the present invention. In this specific example, the method is implemented on a computing device. For example, the computing device may be executing program instructions implementing a technician remote control client 350 including a GUI which is displayed on a display screen of the computing device. In some embodiments, the operations depicted in FIG. 14 may follow the process steps depicted in the non-limiting example shown in FIG. 10, as indicated by "A" in the process depicted in FIG. 10 and in FIG. 14.

As shown at step 2412 in FIG. 14, the computing device processes operational status information associated with at least some systems in the plurality of bathing unit systems in the listing to identify at least a subset of the bathing unit systems in need of replacing a specific bathing unit system component. At 2414, the computing device adapts the GUI to display a component-specific error indicator in association with each bathing unit system identified as being in need of replacing the specific bathing unit system component. The GUI displaying the component-specific error indicators 1416 in FIG. 12 is a non-limiting example of the manner in which such information may be conveyed to a user through the GUI.

At step 2416, the computing device adapts the GUI to present information conveying one or more options for purchasing one or more units of the specific bathing unit system component for the identified subset of the bathing unit systems. At 2418, which may be performed concurrently with or subsequent to step 2416, the GUI provides a user-operable actuator configured to be responsive to a user input to initiate a purchasing process. The display of the information notification 1432 and the user-operable actuator 1434 in the GUI shown in FIG. 13 is a non-limiting example of the operations that may be performed at steps 2416 and 2418.

At 2420, responsive to receiving user input via the user-operable actuator (for example actuator 1434), the computing device is configured to initiates a purchasing process for the one or more units of the specific bathing unit system component. Any suitable known manner of initiating a purchasing process may be used to complete this step. The example operations of the method depicted in FIG. 14 are illustrative of a specific example embodiment. Various ways to perform the illustrated operations, as well as examples of other operations that may be performed, are described herein. Further variations may be or become apparent to the person skilled in the art in view of the present description.

In some embodiments, customer remote control clients 250 (see FIG. 6) may be configured to allow customers to generate service requests messages indicating that the customer has requested to be contacted by a technician. For example, such service request messages may be communicated from a given customer personal communication device 1200 to one or more technician personal communication devices 1300 via server 230 shown in FIG. 6.

In a specific example, in response to receipt of such a service request notification message at the technician's personal computing device indicating that a specific customer associated with a specific bathing unit system in the listing 1402 of bathing unit systems presented on the GUI (shown in FIG. 8) has requested to be contacted, the technician's GUI may be dynamically adapted to display a service request GUI element in association with a specific entry in the listing 1402 of bathing unit systems associated with the specific bathing unit system (not shown in FIG. 8). In a non-limiting example, the service request GUI element may be displayed in conjunction with an operational status indicator in association with the specific entry in the listing 1402 of bathing unit systems associated with the specific bathing unit system on the technician's dashboard interface.

Optionally, the service request GUI element may be configured to be user-selectable. In such an implementation, in response to the user selection of the service request GUI element, the GUI displayed on the technician's personal computing device may be dynamically adapted to present the user one or more individually selectable communication options for contacting the customer and/or to present the user with a user-operable actuator to initiate a communication process for contacting the customer. Non-limiting examples of communication options that may be presented to the user in such embodiments include e-mail, SMS message; chat message, push notification, video conference, text message, and telephone call.

In the specific examples of the technician personal computing device 1300' depicted in FIGS. 8, 11, 12 and 13, the user operable search control 1424 may be configured for receiving user search commands for searching the plurality of entries in the listing 1402 of bathing unit systems according to one or more user-selectable searching criteria. For example, responsive to a user selection of the user operable search control 1424 through the personal computing device 1300', the GUI may be adaptively modified to present the user with a set of independently selectable searching criteria and/or for presenting a user editable interface for allowing the user to enter search term(s) for searching the plurality of entries in the listing 1402 of bathing unit systems.

In the specific example depicted in the Figures, the user operable sort control 1426 may configured for receiving user sort commands for sorting the plurality of entries in the listing 1402 of bathing unit systems according to one or more user-selectable sorting criteria. For example, responsive to a user selection of the user operable sort control 1426 through the personal computing device 1300', the GUI may be adaptively modified to present the user with a set of independently selectable sorting criteria for sorting the plurality of entries in the listing 1402 of bathing unit systems.

In some implementations, in response to receiving a specific user sort command conveying a specific sorting criterion, the GUI may be dynamically adapted to present a sorted version of the listing 1402 of bathing unit systems in which the plurality of entries are arranged according to the specific sorting criterion conveyed by the specific user sort command. Some non-limiting examples of user-selectable sorting criteria that may be presented for user selection may include, without being limited to:

(i) bathing unit system identifiers, such as customer identification information 1408 and bathing unit system identification information 1410. For example, the entries may be sorting alpha-numerically (ascending or descending) based on these identifiers or identification information;

(ii) operational status indicators, such as color-coded operational status indicators 1412 and network connection status indicators 1414. For example, selecting this criteria may allow present the listing in a ordered manner presenting entries associated with decreasing (or increasing) levels of criticality on the GUI;

(iii) a type of bathing unit system component identified as being in need of servicing or replacement;

(iv) distance to a current location of the personal computing device 1300'. For example, the sorting criterion may allow ordering the entries in the listing bathing units based on increasing (or decreasing) distance from the personal computing device 1300';

(v) maintenance service subscription classification; and (vi) a type, classification or model number associated with bathing unit systems.

As shown in the specific example depicted in FIG. 8, the GUI may also include a user operable settings control 1430 operable for causing the GUI to be adaptively modified to display a settings interface for the GUI or "dashboard" implemented by the technician remote control client executing on the personal computing device 1300'.

Figure 15:
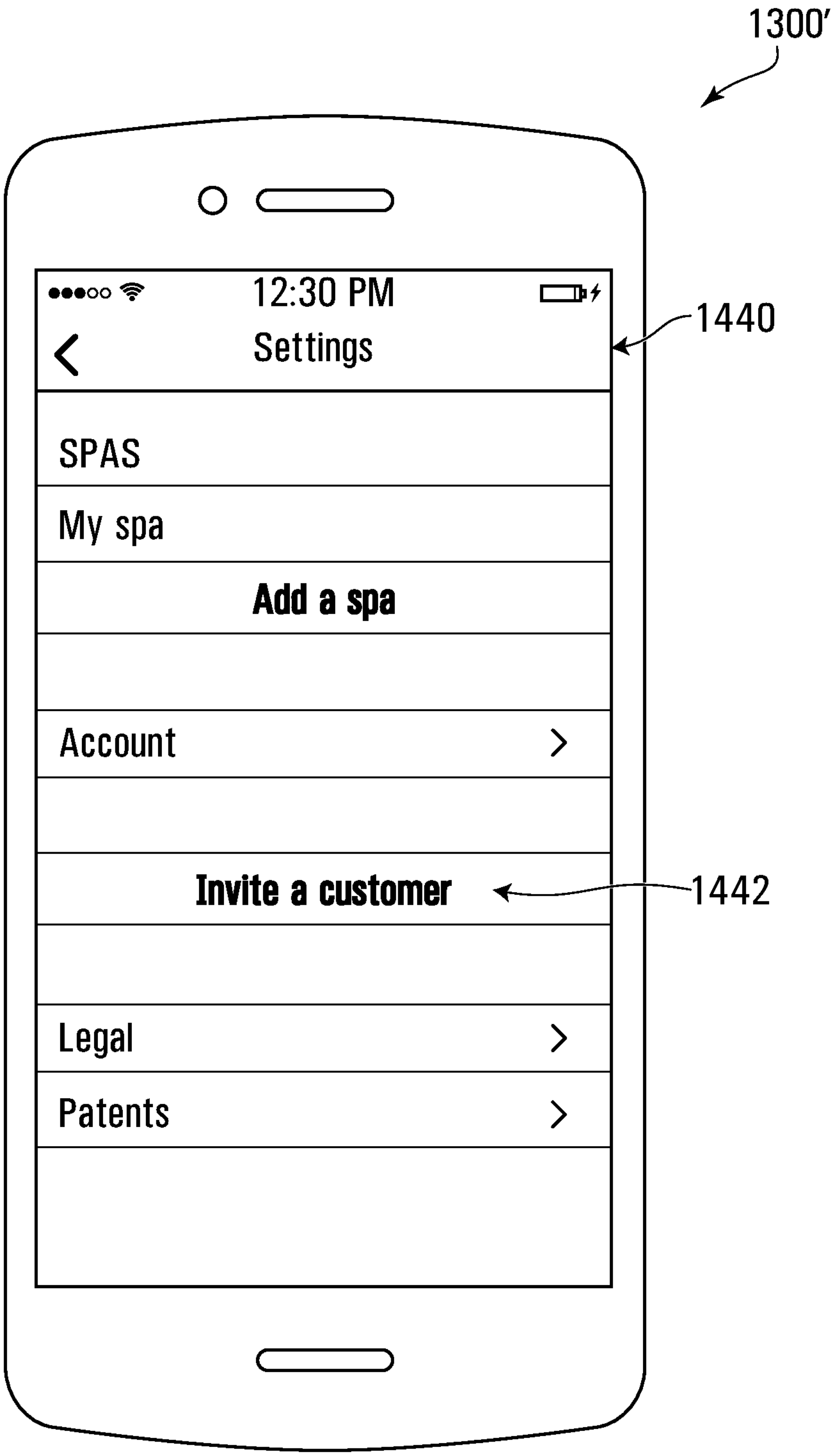
FIG. 15 shows a non-limiting example of a settings interface for the dashboard depicted in FIG. 8 in accordance with the present invention.
Figure 16:
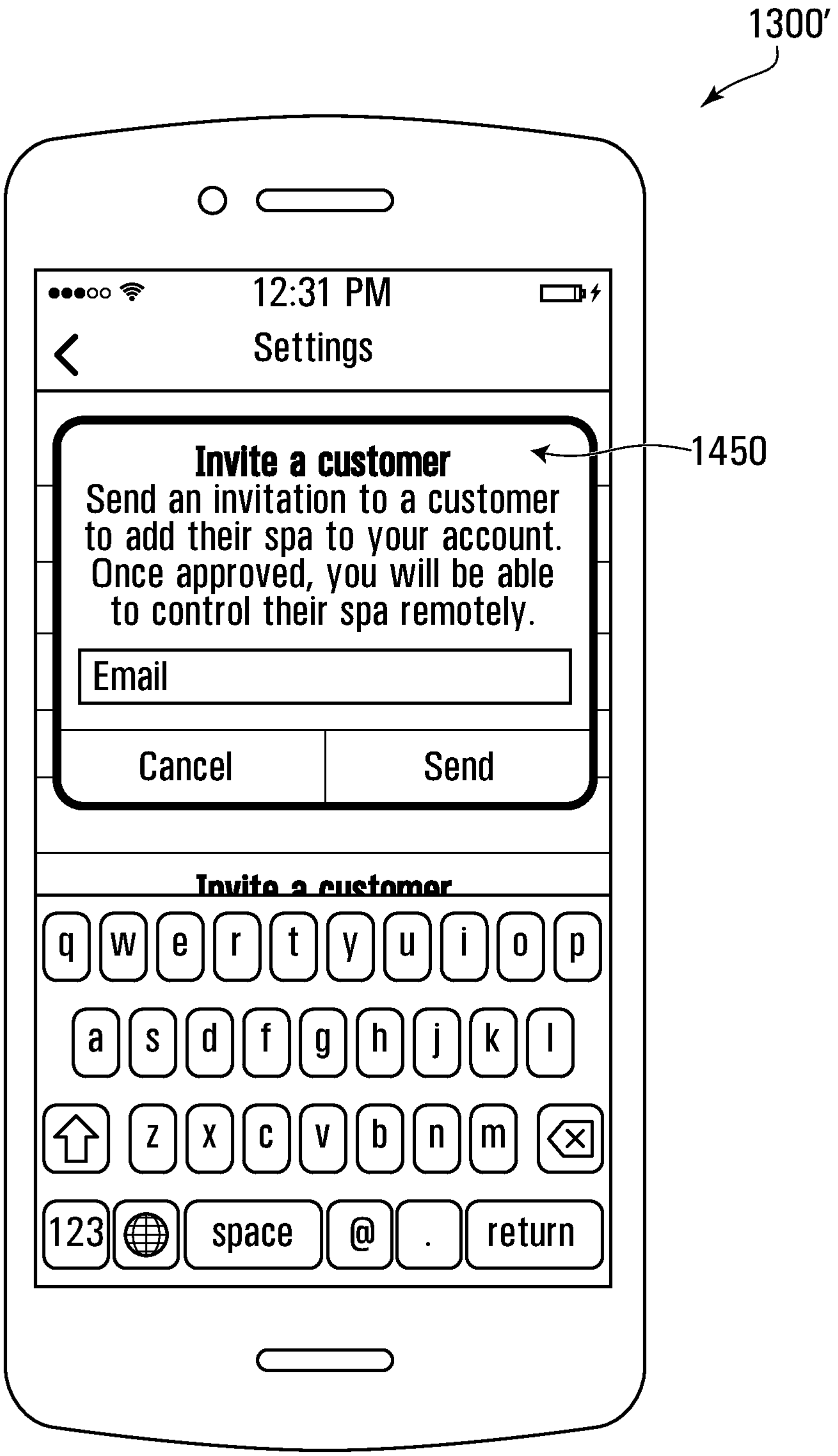
FIG. 16 shows a non-limiting example of a customer invitation interface for the dashboard depicted in FIG. 8 in accordance with the present invention.

FIG. 15 shows a non-limiting example of a settings interface 1440 for the dashboard depicted in FIG. 8 that may be displayed in response to receiving user selection of the user operable settings control 1430 in accordance with invention non-limiting implementation. Amongst other user-operable input objects, the settings interface 1440 as shown includes a user-operable invitation control 1442 configured to receive a user input identifying a specific customer to generate an invitation message to request permission to remotely control and monitor a bathing unit system associated with that specific customer. In use, this functionality allows the user to identify a specific (new) customer that is distinct from the customers that own and operate the bathing unit systems that are already in the listing 1402 of bathing unit systems. For example, shown in FIG. 16 is a non-limiting example of a user-operable input object 1450 that may be displayed by personal computing device 1300' in response to user selection of the user-operable invitation control 1442 (shown in FIG. 15). In this specific example, the user-operable input object 1450 is configured to accept a user input in the form of alpha-numeric characters identifying a specific customer to generate an invitation message to request permission to remotely control and monitor a bathing unit system associated with the specific customer. For example, the user input may convey an email address that the specific customer used when registering a personal computing device 1200 implementing a customer remote control client 250 with server 230 shown in FIG. 8.

In a specific example, responsive to receiving user input identifying a specific customer via the user-operable input object 1450 shown in FIG. 16, the technician remote control client implemented by the personal computing device 1300' is programmed to transmit an invitation message from the technician computing device over a communication network in order to request permission from the specific customer. For example, the invitation message may be transmitted from the personal computing device 1300.2 of the technician to the server 230 shown in FIG. 6, which may then cause a message to be transmitted to a device associated with the customer, in order to notify the specific customer of the technician's invitation. The device associated with the customer may be any suitable device, including without being limited to, a customer personal computing device implementing a customer remote control client associated with the specific customer, such as for example customer personal computing device #1 1200.1 shown in FIG. 6, and/or to a topside control panel of the bathing unit system owned and operated by the specific customer.

Figure 17:
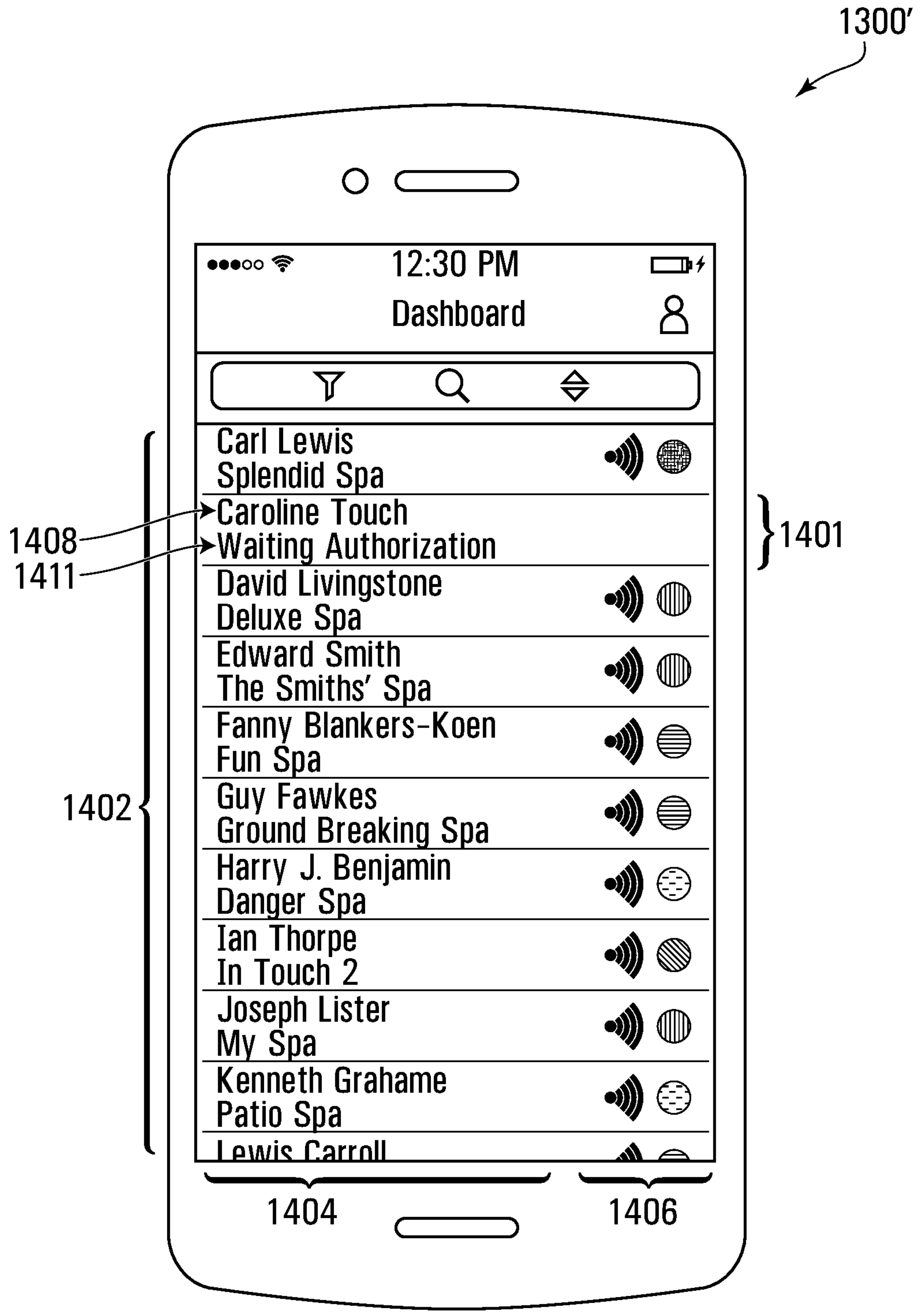
FIG. 17 shows the dashboard interface depicted in FIG. 8 updated in response to a user initiated transmittal of a customer invitation to include a display of an entry for a newly invited customer spa for which a request remote control and monitoring is awaiting authorization in accordance with a non-limiting example of the present invention.

In some implementations, once the personal computing device 1300' has transmitted the invitation message, the dashboard interface of the GUI displayed on the display screen 1400 of the personal computing device 1300' of the technician may be dynamically modified to display a new entry in the listing 1402 for the newly invited bathing unit system. For example, shown in FIG. 17 is a non-limiting example of the dashboard interface depicted in FIG. 8 updated to include a new entry 1401 for a newly invited customer bathing unit system owned and operated by a customer identified as "Caroline Touch" according to the customer identification information 1408 provided as part of the new entry 1401. In this specific example, the newly invited customer is identified as having not yet authorized the technician associated with personal computing device 1300' to remotely control and monitor their bathing unit system. As such, as depicted, rather than displaying the bathing unit system identifier information, the newly created entry 1401 includes the invitation status notification message "Waiting Authorization" as indicated at 1411 in FIG. 17.

Customer Personal Computing Device 1200'

The following section will describe some functionality, GUI and processes that may be implemented at the customer computing device 1200' and in some cases the technician computing device 1300' described in the preceding section for facilitating centralized control and monitoring over a network of bathing unit system.

A non-limiting example of an invitation notification, review and authorization process viewed from the perspective of a customer personal computing device 1200' will now be described with reference to FIGS. 18 to 20.

In specific practical implementations, the customer personal computing device may be a personal computing device of a customer, such as a smartphone, tablet or personal computer, or the computing device may be installed as part of the network enabled controller of the customer's bathing unit system, such as for example a top-side control panel.

Figure 18:
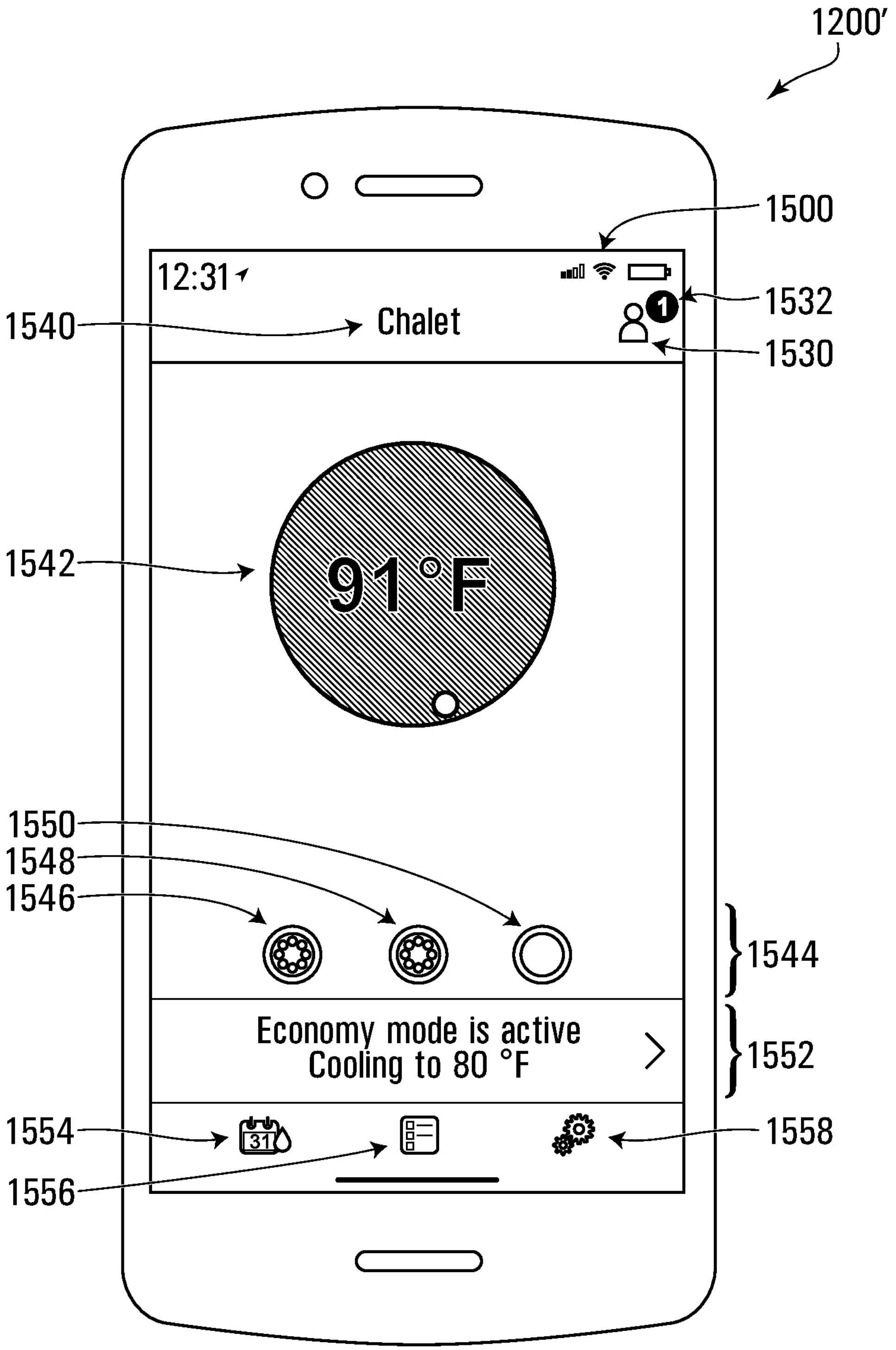
FIG. 18 shows a non-limiting example of a graphical user interface for a customer remote control client showing a customer home page interface for controlling and monitoring a bathing unit system owned and operated by a customer in accordance with a non-limiting example of the present invention.

FIG. 18 is a specific example of a customer personal computing device 1200' implementing a customer remote control client suitable for use in connection with the system shown in FIG. 6 in accordance with a specific practical implementation. The customer personal computing device 1200' may be any one of customer personal computing device #1 1200.1, customer personal computing device #2 1200.2 . . . customer personal computing device #X−1 1200.X−1 and customer personal computing device #X 1200.X. As depicted in FIGS. 18 to 20, the customer personal computing device 1200' is in the form of a smart phone having a display screen 1500. The personal computing device 1200' executes program instructions implementing a customer remote control client including a graphical user interface (GUI) which is displayed on the display screen 1500 to enable the customer to control and monitor their network-enabled bathing unit systems. In addition to allowing the customer to control and monitor their network-enabled bathing unit systems, the program instructions implementing the GUI are configured to allow the customer to receive, review and respond to invitations for remote control and monitoring originating from bathing unit system service technicians or service technician teams.

In the non-limiting example depicted, the program instructions implementing the customer remote control client may be part of a software application that can be downloaded to the personal computing device 1200' from an Internet accessible server according to any suitable known method, for example through an "app store" (or app marketplace) other similar type of digital distribution platform for computer software. In the specific example depicted in FIG. 18, the GUI is configured to present a customer home page interface for controlling and monitoring a bathing unit system owned and operated by the customer. The GUI includes bathing unit system identifier information 1540 that identifies this display as being the home page interface for the bathing unit system the customer has identified as "Chalet". The GUI also includes an operational status indicator 1542 that in this specific example includes a color-coded operational status indicator icon within which a current water temperature of the bathing unit system is displayed. The GUI also includes user-operable controls 1544 for controlling settings of various bathing unit system accessories.

In the example depicted in the Figures, the user-operable controls 1544 include a first user-operable control 1546 for a first pump, a second user-operable control 1548 for a second pump, and a third user-operable control 1550 for a lighting module. It is to be appreciated that additional (or fewer) user-operable controls may be provided in alternate implementations.

The GUI may also include a message center 1552 that may convey information pertaining to a current status of the bathing unit system, such as "currently heating", filtration cycle "on", error etc., corresponding to the color of the operational status indicator 1542. In some specific examples such as the one depicted, the message center 1552 may be configured to include a user operable input object, which when selected, may cause the GUI to be dynamically modified to display a spa state interface that may provide additional information regarding the state of the bathing unit system and/or its components. The GUI may also include one or more user-selectable menus 1553, which in this specific example include a water care menu 1554, a reminders menu 1556 and a settings menu 1558, each of which may also be independently selectable/operable by the user to present the user with different types of information.

In the specific example depicted, the GUI also includes a user-operable account settings control 1530 configured for causing the GUI to be adaptively modified to display an account settings interface on the personal computing device 1200'. In the specific embodiment shown in FIG. 18, in response to receiving an invitation message from a technician personal computer unit 1300', the customer remote control client implemented by the customer personal computing device 1200' causes the GUI to display a notification icon 1532 next to the account settings control 1530 to notify the customer that a new message related to the customer's account has been received. Selecting the user-operable account settings control 1530 through the GUI (for example through the use of a touch-sensitive screen) is configured for displaying additional information allowing the customer to review the newly received message via the account settings interface.

Figure 19:
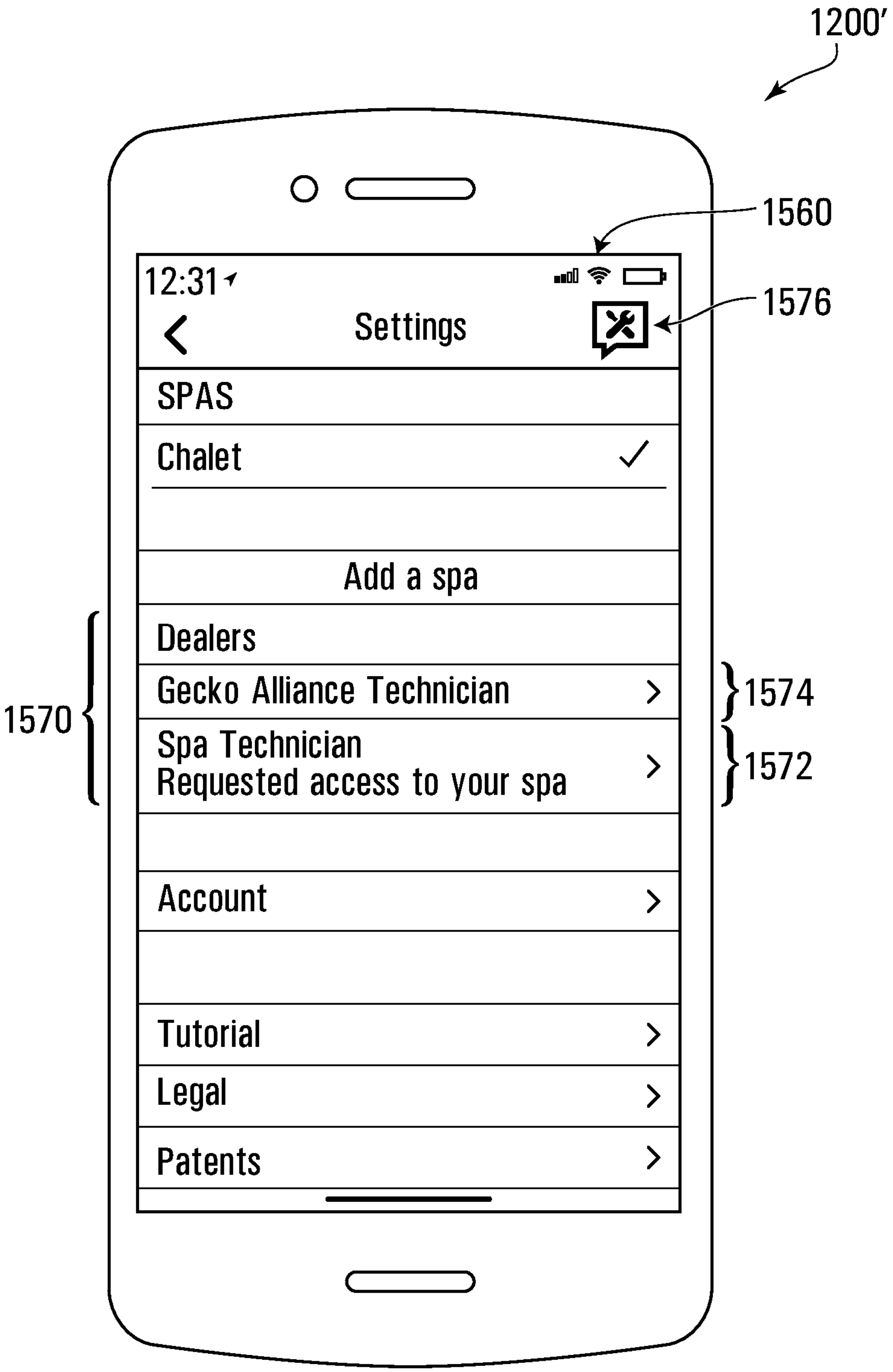
FIG. 19 shows a non-limiting example of a settings interface for the customer home page interface depicted in FIG. 18 in accordance with the present invention.

FIG. 19 shows a non-limiting example of a customer account settings interface 1560 that may be displayed in response to receiving user selection of the user operable settings control 1530 in accordance with invention specific practical implementation. Amongst other user-operable or selectable objects, the settings interface 1560 may display a list 1570 including one or more dealers or technicians the customer has authorized to remotely control and monitor the customer's bathing unit system or that have invited the customer to permit them to do so. In this specific example, the list 1570 includes a new entry 1572 corresponding to the invitation message that caused the notification icon 1532 to be displayed on the home page interface shown in FIG. 18. The new entry 1572 notifies the customer that a technician identified as "Spa Technician" has requested permission to remotely control and monitor the customer's bathing unit system. It is noted that in the specific example shown in FIG. 19, another technician "Gecko Alliance Technician" already has permission to remotely control and monitor the customer's bathing unit system, as indicated by the first entry 1574 in the list 1570. In this specific example, the entries in the list 1570 are independently selectable by the user through the user interface to allow the customer to authorize or rescind permission for remote control and monitoring for a given dealer/technician, as well as to review information associated with the particular dealer/technician, such as contact information and terms of a service arrangement the customer may have with the particular dealer/technician.

In some embodiments, the customer's account settings interface 1560 may also optionally include a user-operable control 1576 for receiving service request commands for requesting that a specific bathing unit system service technician or a service technician team contact the customer associated with the selected bathing unit system. The specific bathing unit system service technician or service technician team may be selected from the list 1570 of dealers or technicians the customer has authorized to remotely control and monitor the customer's bathing unit system or, alternatively, a default dealer or technician may be contacted. Alternatively still, in order to identify the specific bathing unit system service technician or service technician team, the user may be prompted through the interface 1560 to provide identification information. In such embodiments, in response to receipt of a service request command via the user operable control 1576, the customer remote control client executing on the customer personal computing device 1200' may cause a service request notification message to be transmitted to the specific service technician or service technician team to indicate that the customer associated with the bathing unit system has requested to be contacted. For example, the service request notification message may be transmitted via a server, such as the server 230 shown in FIGS. 2 and 6.

Figure 20:
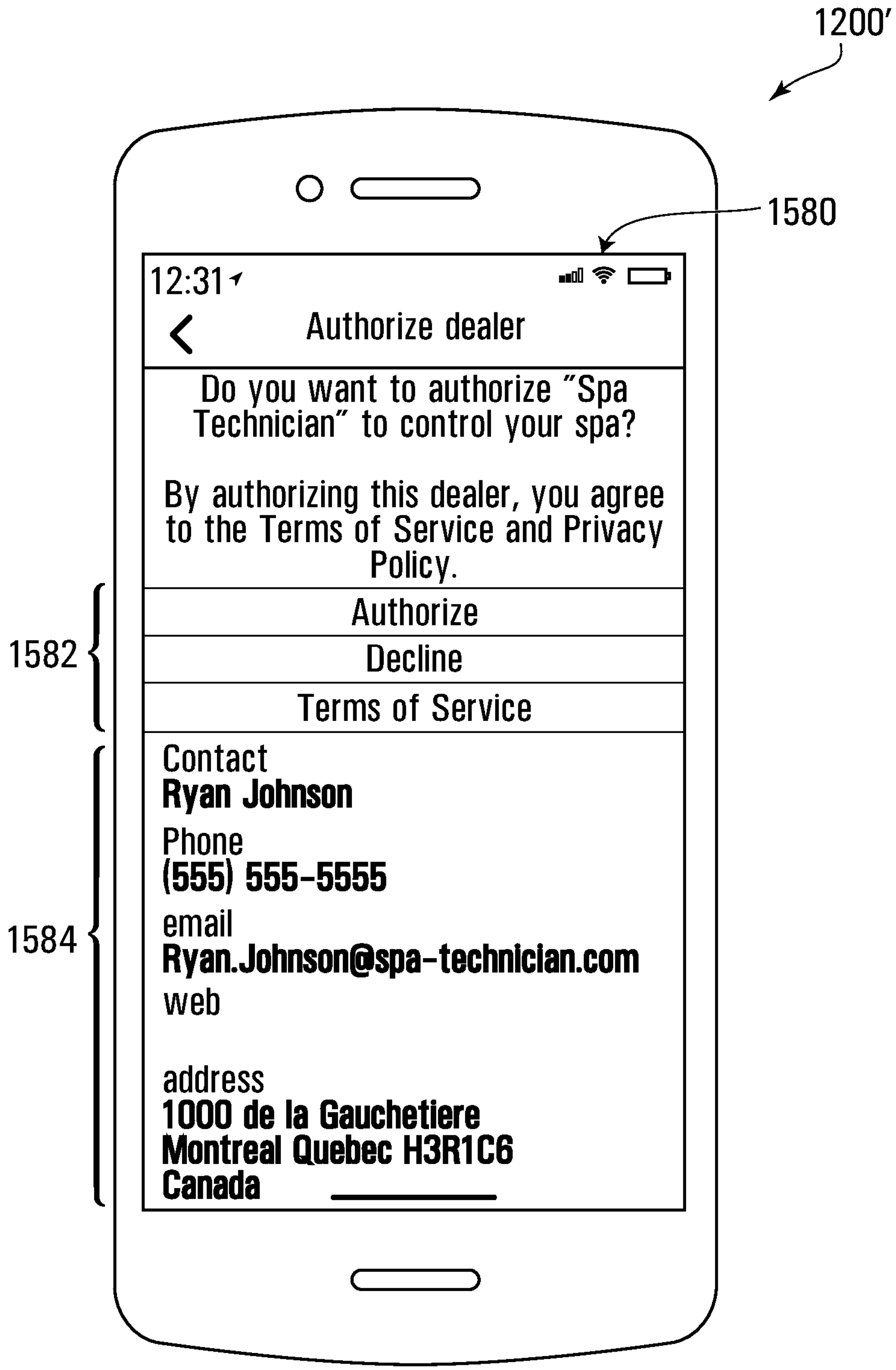
FIG. 20 shows a non-limiting example of a customer invitation response interface for the customer home page interface depicted in FIG. 18 in accordance with the present invention.

Shown in FIG. 20 is a non-limiting example of a dealer authorization interface 1580 that may be displayed in response to receiving user selection of the entry 1572 in the list 1570 shown in FIG. 19. The dealer authorization interface 1580 includes user-operable controls 1582 configured to enable a user to authorize, decline or review the terms of service associated with the dealer's/technician's invitation, and dealer/technician contact information 1584.

In the specific example depicted in FIG. 20, responsive to receiving user selection of the user operable input object indicating that the user has authorized the invitation, the customer remote control client implemented by the personal computing device 1200' may transmit an authorization message over a communication network to the personal computing device 1300' of the technician in order to indicate that the customer has accepted the invitation to permit remote control and monitoring. Similarly, responsive to receiving a user selection of the user operable input object indicating that the user has declined the invitation, the customer remote control client implemented by the personal computing device 1200' may transmit a decline message over a communication network to the personal computing device 1300' of the technician in order to indicate that the customer has declined the invitation. For example, the authorization or decline messages may be transmitted from the personal computing device 1200' to the server 230 shown in FIG. 6, which may then cause a message to be transmitted to the technician personal computing device 1300' implementing the technician remote control client in order to notify the technician of the customer's decision.

Figure 21:
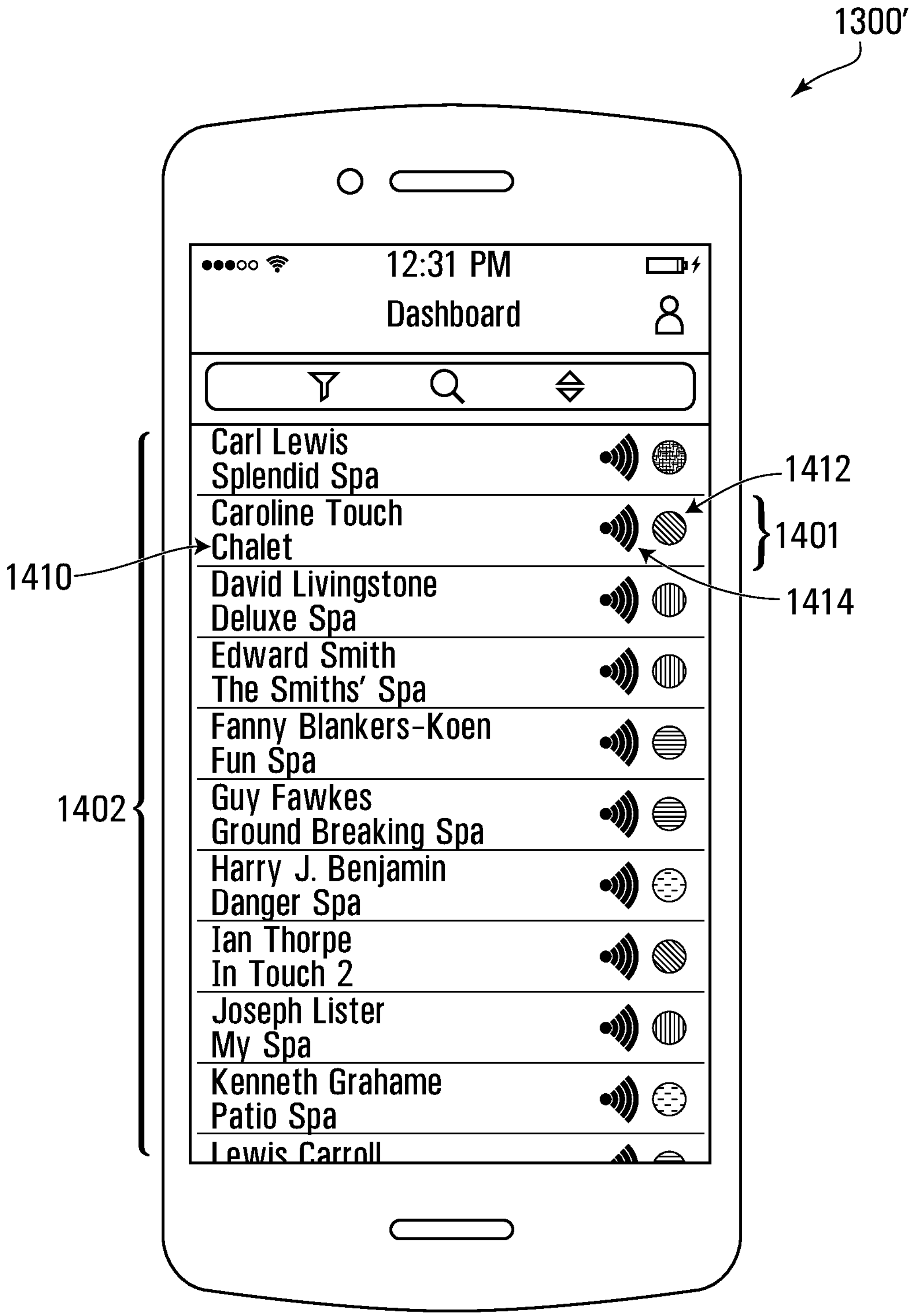
FIG. 21 shows the dashboard interface depicted in FIG. 17 updated to include operational status indicators for the newly invited customer spa subsequent to receipt of a customer authorization for remote control and monitoring in accordance with a non-limiting example of the present invention.

Shown in FIG. 21 is a non-limiting example of the dashboard interface of the technician personal computing device 1300' depicted in FIG. 17 updated to display operational status indicators for the newly invited customer bathing unit system ("Caroline Touch"). In this Example, the GUI depicted in FIG. 21 was adapted in response to receiving a confirmation message from the customer indicating that the specific customer has granted permission to remotely control and monitor the bathing unit system associated with the specific customer. More specifically, the GUI displayed on the technician personal computing device 1300' has been dynamically adapted to modify the listing 1402 so that the entry 1401 displays the operational status indicators 1412 and 1414, and the invitation status notification message "Waiting Authorization" indicated at 1411 in FIG. 17 has been replaced with the bathing unit system identifier information "Chalet", as indicated at 1410 in FIG. 21.

Figure 22:
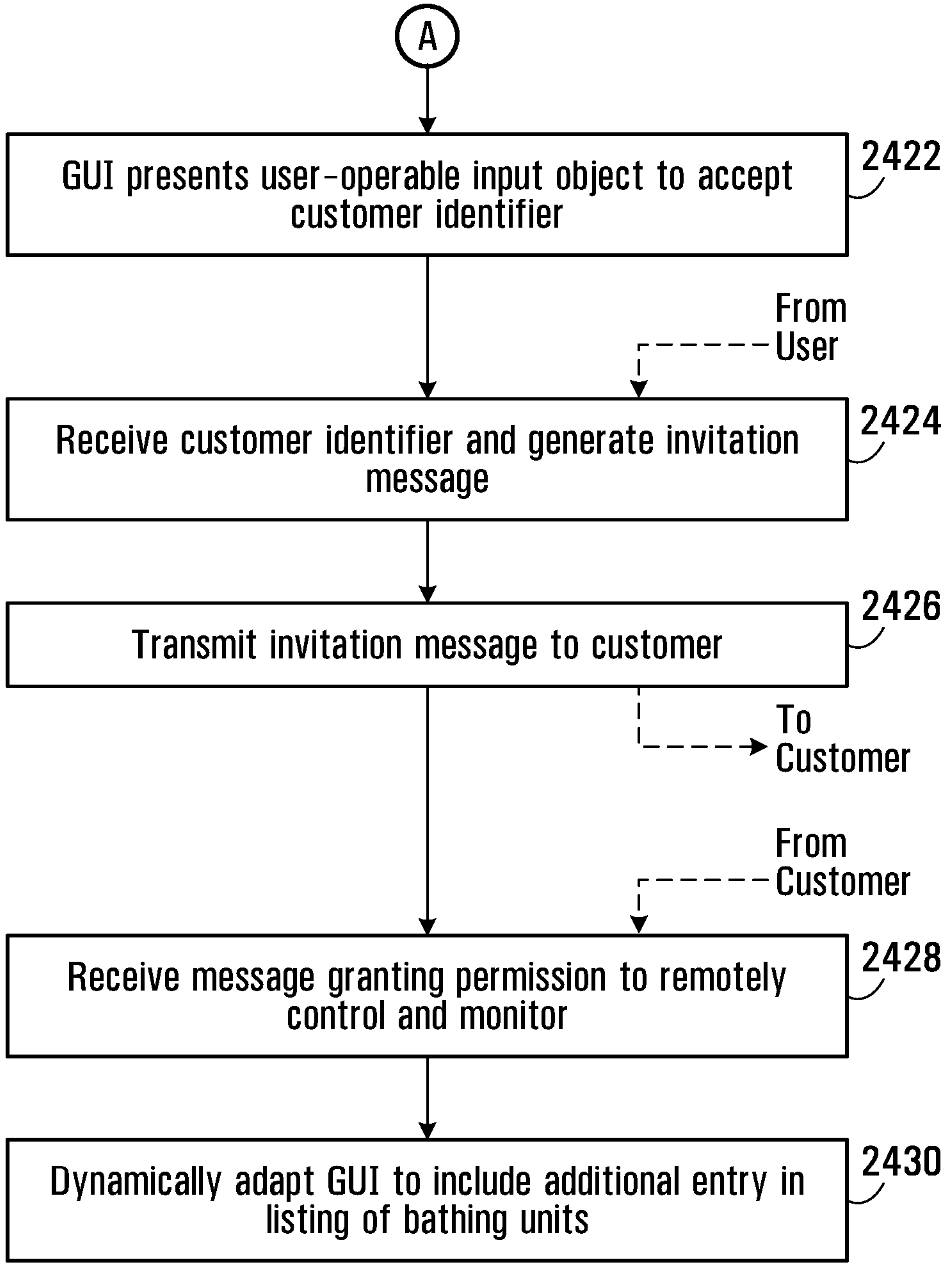
FIG. 22 shows a flow diagram of a method, implemented by a technician personal computing device, for adding a new customer to a listing of bathing unit systems owned and operated by different customers, according to a non-limiting example of the present invention.

FIG. 22 shows a flow diagram of a method, at a personal computing device, of adding a new customer to a listing of bathing unit systems owned and operated by different customers, according to a non-limiting implementation. For example, the computing device may be executing program instructions implementing a technician remote control client including a GUI which is displayed on a display screen of the computing device. In some embodiments, the operations depicted in FIG. 22 may follow the operations depicted in the non-limiting example shown in FIG. 10, as indicated by "A" at the end of FIG. 10 and the beginning of FIG. 22.

As shown at 2422 in FIG. 22, the technician computing device directs the GUI to present a user-operable input object to accept a customer identifier identifying a new customer to be added to the listing of bathing unit systems. The display of user-operable input object 1450 in the GUI shown in FIG. 16 is a non-limiting example of how this step may be implemented. At step 2424, the computing device receives customer identifier provided by the use through an input at the computing device and generates an invitation message. At step 2426, the computing device transmits the invitation message to a computing device associated to the customer via a network connection. At step 2428, the technician computing device receives a message originating from the customer computing device granting permission to remotely control and monitor the customer's network-enabled bathing unit system. At step 2430, the technician computing device dynamically adapts the GUI to include an additional entry associated with the new customer in the listing of bathing units. The display of the listing 1402 updated to include the new entry 1401 in the GUI shown in FIG. 21 is an example of this operation.

The example operations of the method depicted in FIG. 22 are illustrative of a specific example embodiment. Various ways to perform the illustrated operations, as well as examples of other operations that may be performed, are described herein. Further variations may be or become apparent to the person skilled in the art in view of the present description.

Figure 23:
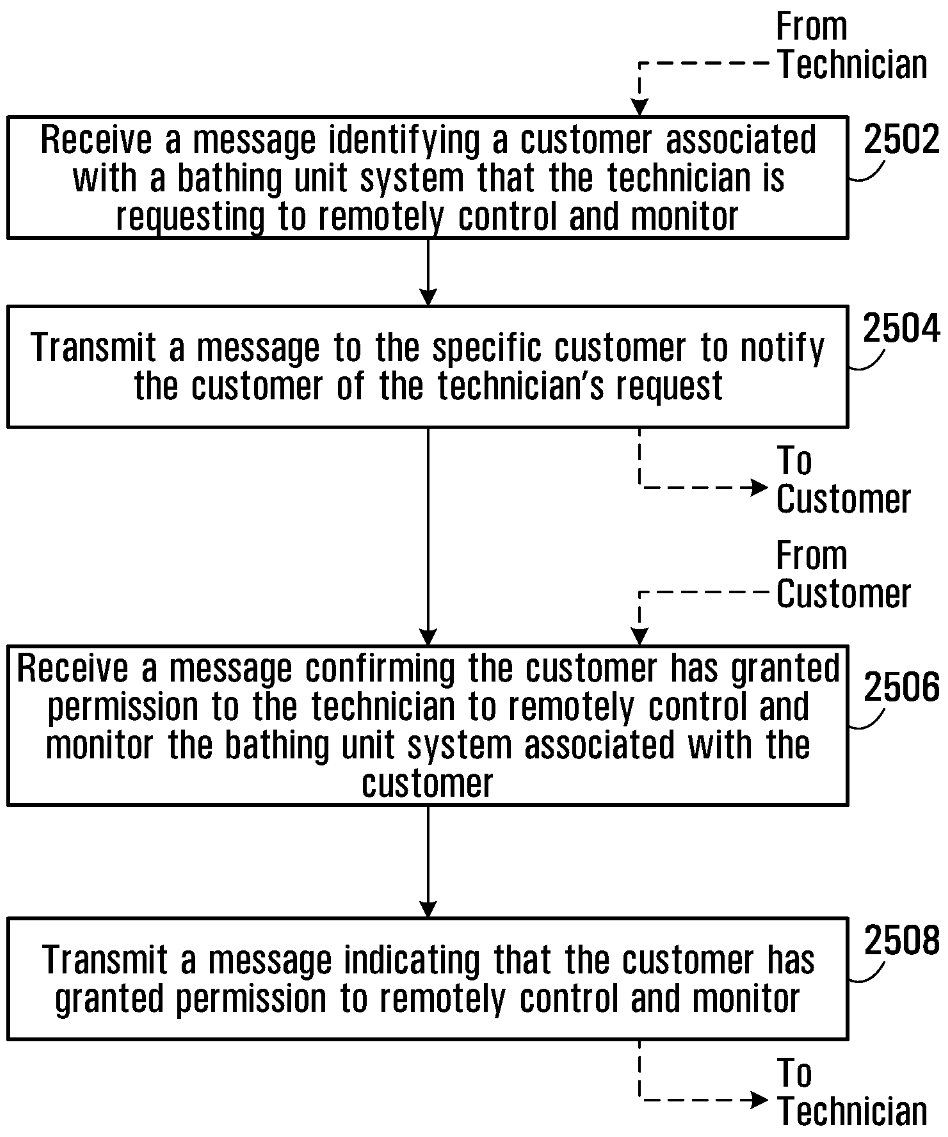
FIG. 23 shows a flow diagram of a method, implemented at a network server, for adding a new customer to a listing of bathing unit systems owned and operated by different customers, according to a non-limiting example of the present invention.

FIG. 23 shows a flow diagram of a method, implemented at a network server, for adding a new customer to a listing of bathing unit systems owned and operated by different customers that may be monitored and controlled by a technician (or technician team), according to a non-limiting example of implementation. The server 230 depicted in FIGS. 2 and 6 is a non-limiting example of a server that may implement such a method.

At step 2502, the server receives a message over a computer network from a computing device identifying a customer associated with a bathing unit system that a technician is requesting to remotely control and monitor. For example, the message may be received from a personal computing device executing program instructions implementing a technician remote control client as described herein. At step 2504, the server transmits a message over a network to the specific customer to notify the customer of the technician's request. For example, in some embodiments the message may be transmitted to a personal computing device executing program instructions implementing a customer remote control client as described herein. In other embodiments, the message may be additionally or alternatively transmitted to a network-enabled controller that is installed as part of the customer's bathing unit system to cause a notification message to be displayed on the screen of a topside control panel of the customer's bathing unit system.

At step 2506, the server receives a message confirming that the customer has granted (or declined) a permission to the technician to remotely control and monitor the bathing unit system associated with the customer. For example, the message may be received from the customer's personal computing device implementing a customer remote control client or from the network-enabled controller installed as part of the customer's bathing unit system.

At step 2508, the server transmits a message to the technician indicating that the customer has granted (or decline) a permission to remotely control and monitor the customer's bathing unit system.

The example operations of the method depicted in FIG. 23 are illustrative of a specific example embodiment. Various ways to perform the illustrated operations, as well as examples of other operations that may be performed, are described herein. Further variations may be or become apparent to the person skilled in the art in view of the present description.

Figure 24:
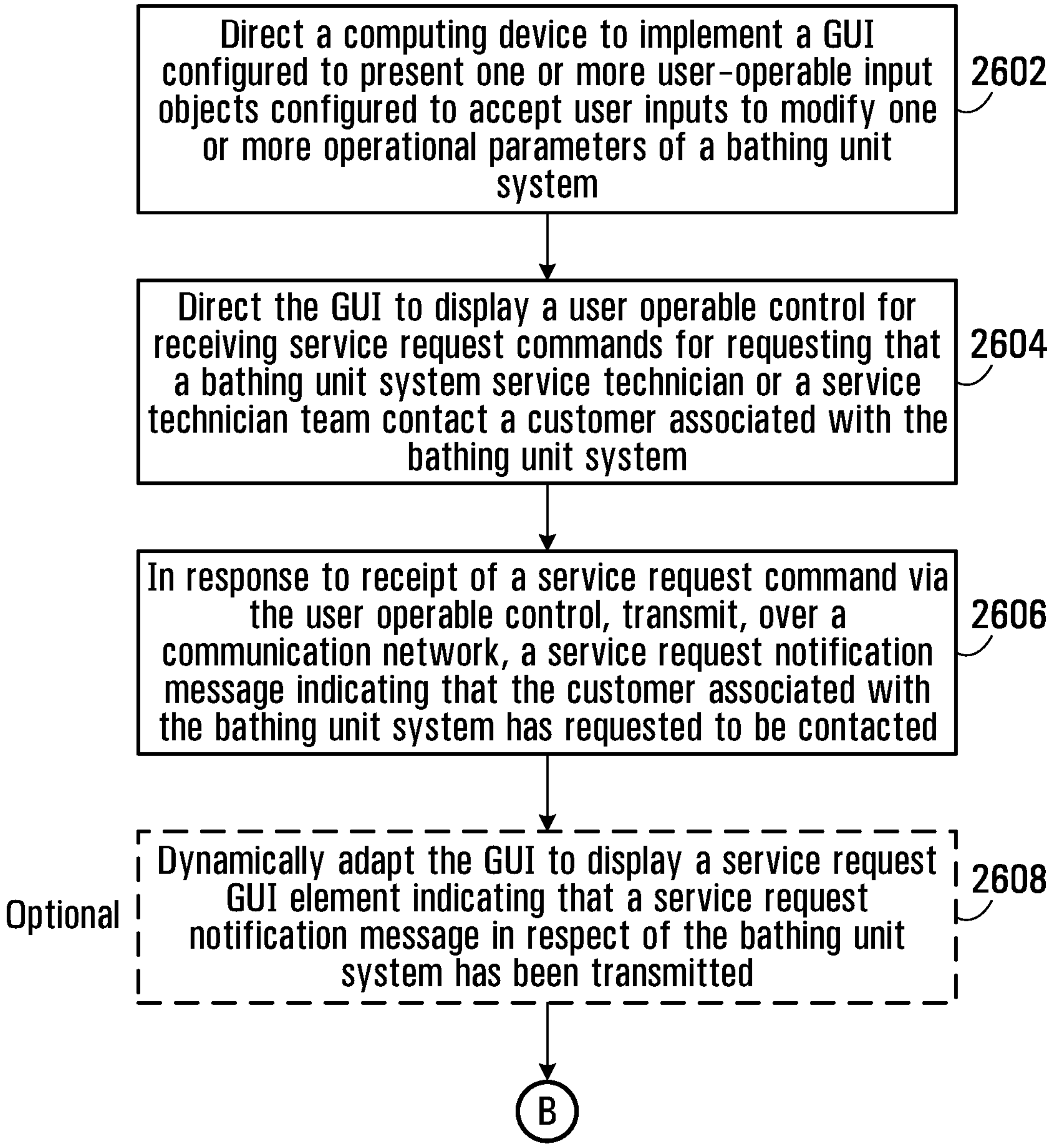
FIG. 24 shows a flow diagram of a method, implemented by a customer computing device, for facilitating monitoring and/or maintenance of a network-enabled bathing unit system owned and operated by a customer, according to a non-limiting example of the present invention.

FIG. 24 shows a flow diagram of a method for facilitating maintenance of a network-enabled bathing unit system owned and operated by a customer by providing a user operable control for receiving service request commands for requesting that a bathing unit system service technician or a service technician team contact a customer, according to a non-limiting example of the present invention. In this specific example, the method is implemented on a customer computing device implementing a GUI. For example, the computing device may be a personal computing device of a customer, such as a smartphone, tablet or personal computer, or the computing device may be installed as part of the network enabled controller of the customer's bathing unit system, such as for example a top-side control panel.

As shown at step 2602, the customer computing device is directed to implement a GUI configured to present one or more user-operable input objects configured to accept user inputs to modify one or more operational parameters of a bathing unit system. FIG. 18 shows a non-limiting embodiment of such a GUI. For example, the GUI may be displayed on a display screen of the customer's personal computing device or on a screen of a top-side control panel installed as part of the customer's bathing unit system.

At step 2604, the customer computing device directs the GUI to display a user operable control for receiving service request commands for requesting that a bathing unit system service technician or a service technician team contact a customer associated with the bathing unit system. In some implementations, the user operable control for receiving service request commands is displayed on the GUI in conjunction with an error indicator indicating that an operational error has been detected in the bathing unit system. The error indicator may be a general error indicator (such as for example "error detected—servicing required" or, alternatively, may be a component-specific error indicator conveying that an error condition has been detected in connection with a specific bathing unit component. In such implementations, the GUI displayed on the customer computing device may optionally be adapted to selectively display the user operable control for receiving service request commands when operational error has been detected in the bathing unit system and to omit that the user operable control in the absence of such as error.

At step 2606, in response to receipt of a service request command at the customer computing device via the user operable control, the computing device transmits, over a communication network, a service request notification message indicating that the customer associated with the bathing unit system has requested to be contacted.

Optionally, at step 2608, the customer computing device dynamically adapts the GUI to display a service request GUI element indicating that a service request notification message in respect of the bathing unit system has been transmitted.

The example operations of the method depicted in FIG. 24 are illustrative of a specific example embodiment. Various ways to perform the illustrated operations, as well as examples of other operations that may be performed, are described herein. Further variations may be or will become apparent to the person skilled in the art in view of the present document. For example, further operations that may be included in some embodiments are described later with reference to the flow diagram shown in FIG. 27, and which will be described later on in the present document.

Figure 25:
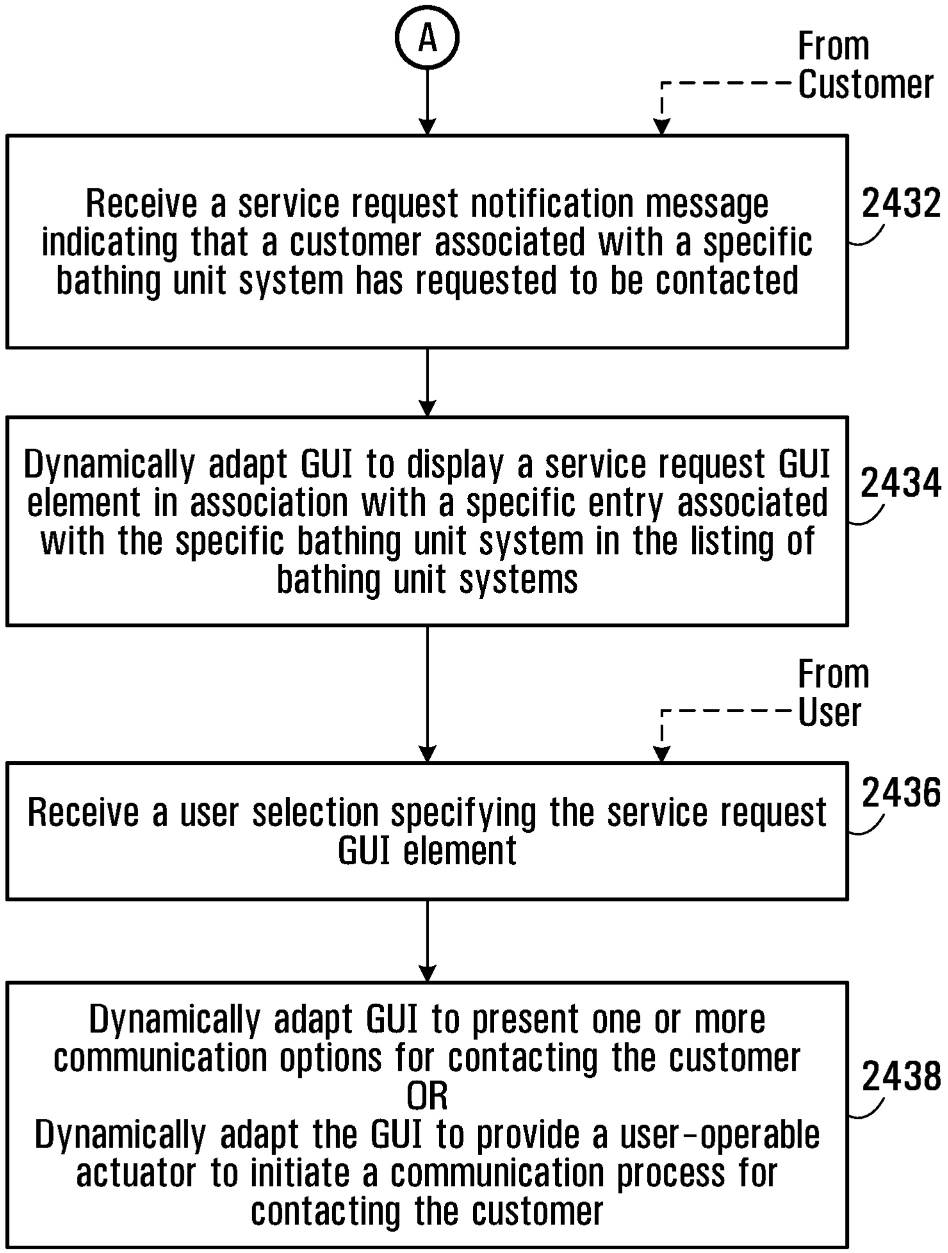
FIG. 25 shows a flow diagram of a method implemented by a technician computing device for receiving and managing a customer request for service according to a non-limiting example of the present invention.

FIG. 25 shows a flow diagram of a method for receiving and managing a customer request for service originating from a customer computing device, according to a non-limiting example of the present invention. In this specific example, the method is implemented on a technician computing device. For example, the computing device may be executing program instructions implementing a technician remote control client including a GUI which is displayed on a display screen of the computing device. In some embodiments, the operations depicted in FIG. 25 may follow the operations depicted in the non-limiting example shown in FIG. 10, as indicated by "A" at the end of FIG. 10 and the beginning of FIG. 25.

As shown at step 2432 in FIG. 25, the technician computing device receives a service request notification message indicating that a customer associated with a specific bathing unit system has requested to be contacted. At step 2434, the technician computing device dynamically adapts the GUI to display a service request GUI element in association with a specific entry corresponding to the specific bathing unit system in the listing of bathing unit systems for which the service request notification message was issued.

At step 2436, the technician computing device receives a user selection specifying the service request GUI element. At step 2438, responsive to receiving the user selection, the technician computing device dynamically adapts the GUI to present one or more communication options for contacting the customer or, in some embodiments the GUI may provide a user-operable actuator to initiate a communication process for contacting the customer. For example, the GUI may display an email address for the customer and/or an email icon that is/are user selectable to initiate an email communication to the customer. Alternatively, the GUI may display a telephone number for the customer and/or a telephone icon that is/are user selectable to initiate a telephone communication with the customer.

The example operations of the method depicted in FIG. 25 are illustrative of a specific example embodiment. Various ways to perform the illustrated operations, as well as examples of other operations that may be performed, are described herein. Further variations may be or become apparent to the person skilled in the art in view of the present description.

Figure 26:
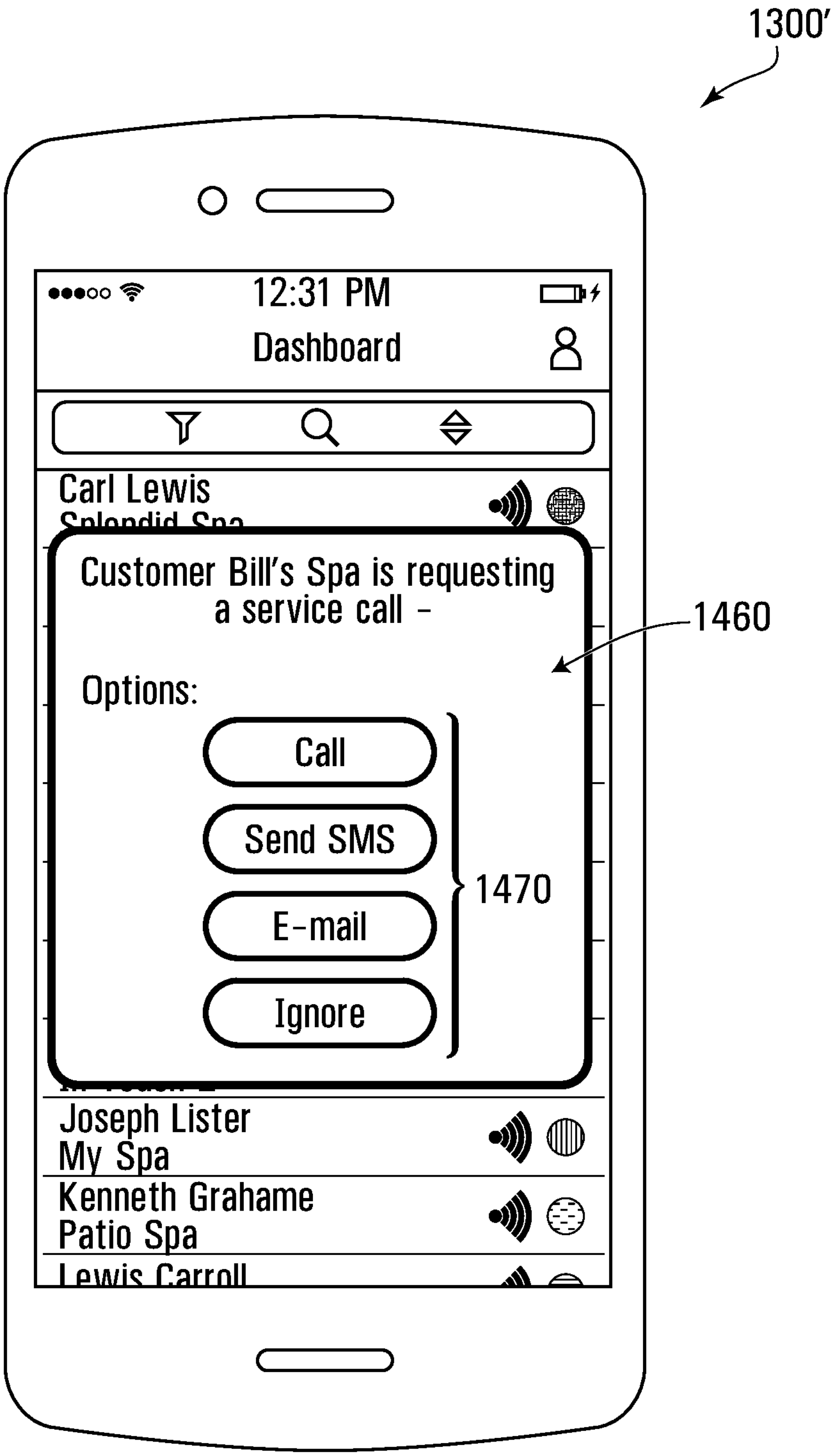
FIG. 26 shows a non-limiting example of the dashboard depicted in FIG. 21 adapted to present communication options for contacting a customer that has issued a service request.

FIG. 26 shows a non-limiting example of the dashboard displayed on the display 1400 of the technician personal computing device 1300' depicted in FIG. 21 adapted to present a GUI element 1460 that includes communication options 1470 for contacting a customer "Bill's Spa" that has issued a service request. As shown in FIG. 26, the communication options 1470 include options to initiate a telephone call to the customer, initiate an SMS message to the customer, or initiate an e-mail to the customer, as well as an option to ignore the customer's service request. In this specific implementation, the communication options 1470 are displayed as user-operable actuators that are individually selectable to initiate the corresponding communication process for contacting the customer or ignoring the customer's service request.

Figure 27:
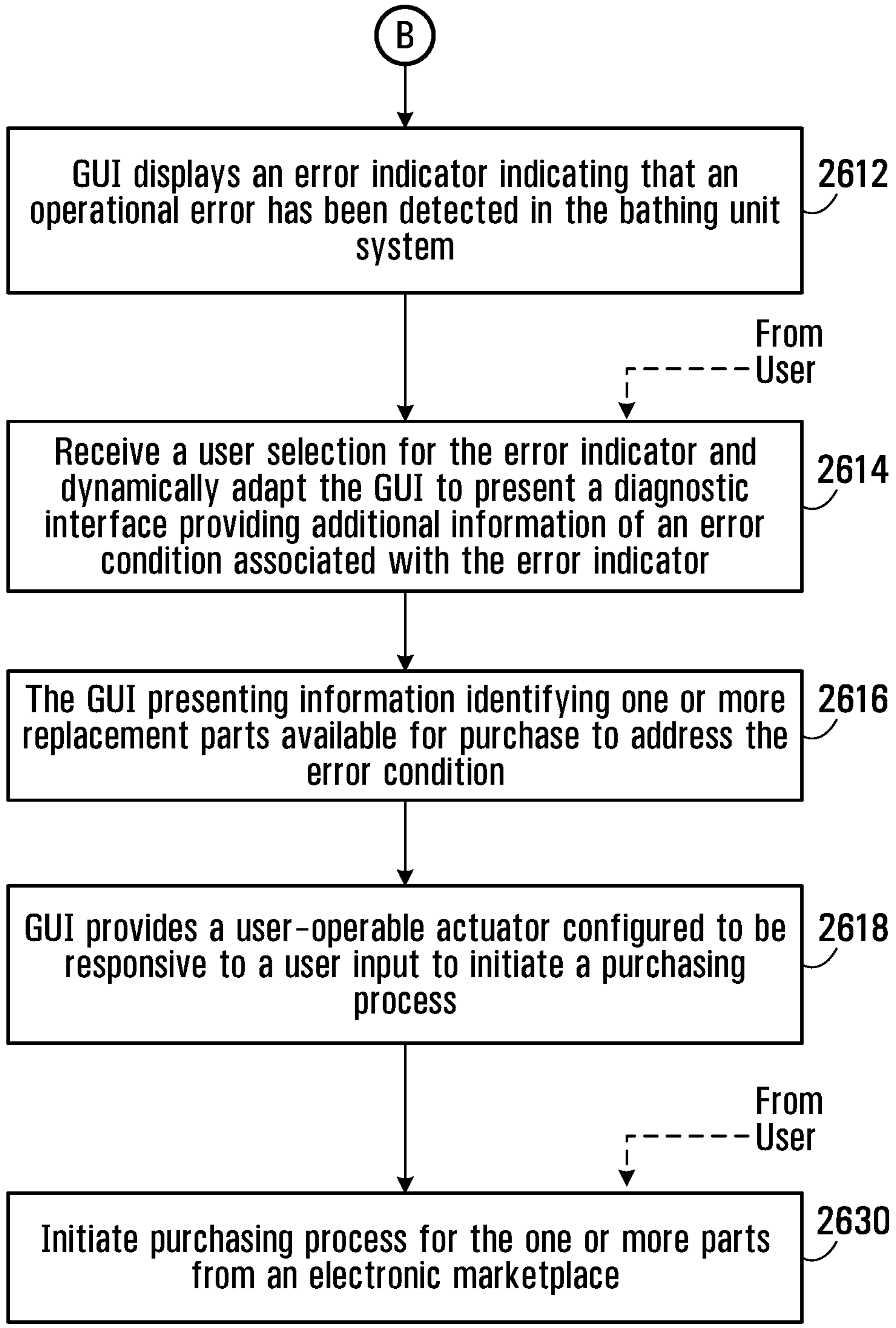
FIG. 27 shows a flow diagram of a method for presenting status information and options for purchase at a customer personal computing device, according to a non-limiting example of the present invention.

FIG. 27 shows a flow diagram of a method for presenting status information and options for purchase at a customer computing device according to a non-limiting example of the present invention. In this specific example, the method may be implemented on a customer computing device implementing a GUI. For example, the customer computing device may be a personal computing device of a customer, such as a smartphone, tablet or personal computer, or the customer computing device may be installed as part of the network enabled controller of the customer's bathing unit system. In some embodiments, the operations depicted in FIG. 27 may follow the operations depicted in the non-limiting example shown in FIG. 24, as indicated by "B" at the end of FIG. 24 and the beginning of FIG. 27.

As shown at step 2612 in FIG. 27, the customer computing device directs the GUI to display an error indicator indicating that an operational error has been detected in the bathing unit system. For example, the error may have been detected based on processing of operational status information at the customer computing device and/or at one or more remote servers, such as the server 230 shown in FIGS. 2 and 6. At 2614, the customer computing device receives a user selection for the error indicator and may dynamically adapt the GUI to present a diagnostic interface providing additional information of an error condition associated with the error indicator. Instead of, or in addition to, providing additional information of an error condition associated with the error indicator, the GUI may be dynamically adapted to present the user with a reminder associated with the error indicator, such as for example "change your filter", "request your annual service maintenance", "replace the UV lamps" or "replace the ozone generator".

At 2616, the customer computing device may direct the GUI to present information identifying one or more replacement parts available for purchase to address the error condition. For example, this information may be displayed as part of the diagnostic interface or may be displayed responsive to receiving user selection of a user-selectable GUI element within the diagnostic interface. The information identifying one or more replacement parts may include a user-operable actuator configured to be responsive to a user input to initiate a purchasing process, as shown at 2618. At step 2630, responsive to receiving user input selecting the user-operable actuator, the computing device initiates a purchasing process for the one or more parts from an electronic marketplace, such as the electronic marketplace 240 shown in FIG. 6.

The example operations of the method depicted in FIG. 27 are illustrative of a specific example embodiment. Various ways to perform the illustrated operations, as well as examples of other operations that may be performed, are described herein. Further variations may be or become apparent.

Figure 28:
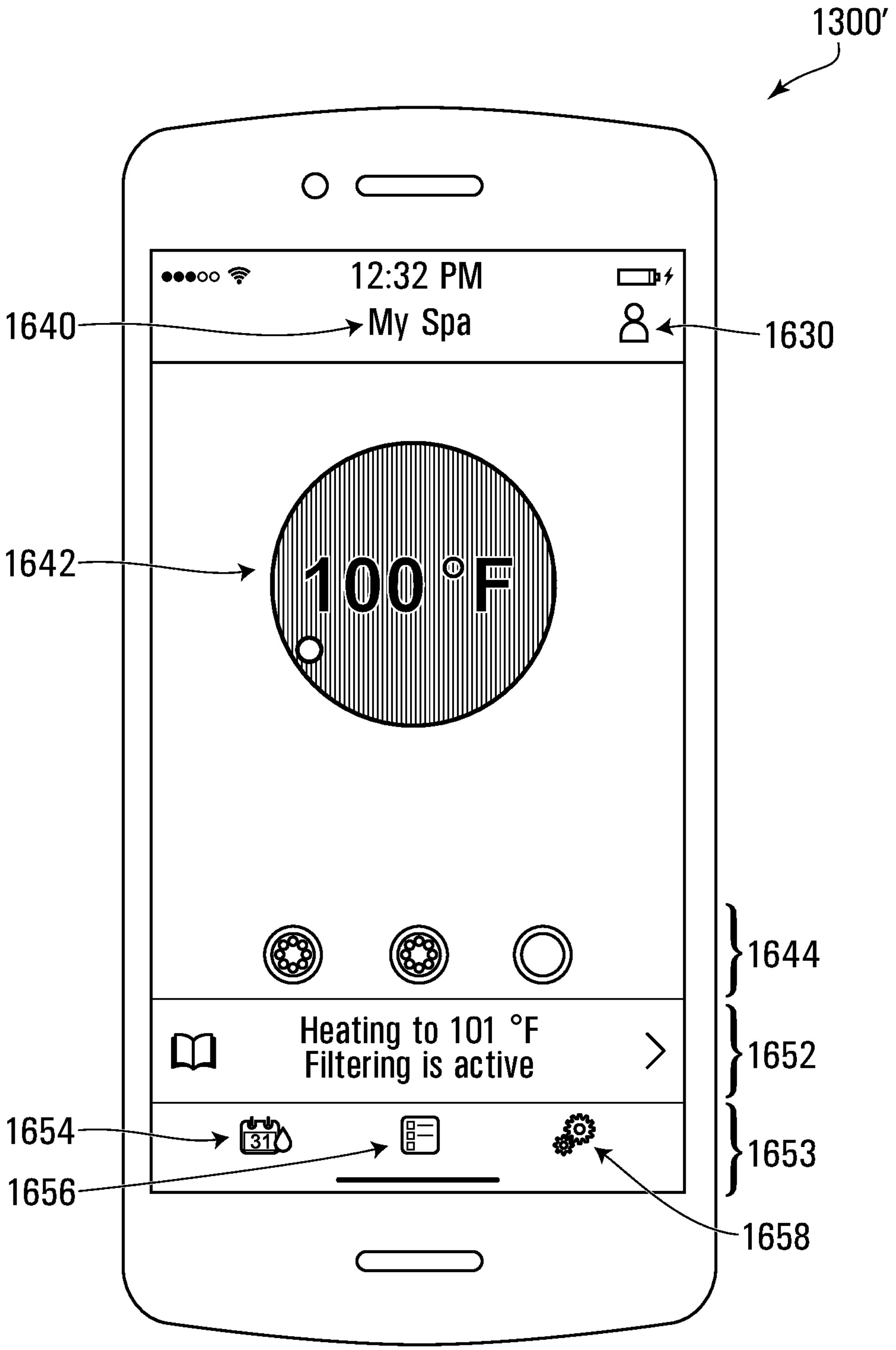
FIG. 28 shows a non-limiting example of a graphical user interface for a technician remote control client showing a customer home page interface for controlling and monitoring a bathing unit system owned and operated by a customer that has authorized the technician to remotely control and monitor the bathing unit system in accordance with the present invention.

Referring again to FIG. 21, in this specific example, the entries in the list 1402 of bathing unit systems are individually user-selectable in order to allow the technician to access the home page interface for each of the listed bathing unit systems that have authorized the technician to remotely control and monitor their bathing unit systems. FIG. 28 shows a customer home page interface that may be displayed on the display 1400 of the technician personal computing device 1300' responsive to receiving a user selection of the entry corresponding to customer "Joseph Lister" in the list 1402 shown in FIGS. 8, 17 and 21. Similar to the customer home page interface displayed by the customer personal computing device 1200' shown in FIG. 18, the customer home page interface displayed by the technician personal computing device 1300' shown in FIG. 28 includes bathing unit system identifier information 1640 that identifies this as being the home page interface for the bathing unit system the customer has identified as "My Spa". The GUI also includes an operational status indicator 1642, user-operable controls 1644 for various bathing unit system accessories, a message center 1652 that indicates a current status of the bathing unit system, and multiple user-selectable menus 1653, and a user-operable account settings control 1530 operable for causing the GUI to be adaptively modified to display an account settings interface.

Similar to the message center 1552 of the customer home page interface displayed by the customer personal computing device 1200' shown in FIG. 18, the message center 1652 displayed by the technician personal computing device 1300' shown in FIG. 28 is user-selectable to cause the GUI displayed by the personal computing device 1300' to be dynamically modified to display a spa state interface that may provide additional information regarding the state of the bathing unit system and/or its components.

Figure 29:
FIG. 29 shows a non-limiting example of a graphical user interface for a technician remote control client showing a customer bathing unit system state interface for monitoring one or more operational states of a customer's bathing unit system in accordance with the present invention.

FIG. 29 shows a non-limiting example of a customer bathing unit system state interface 1710 that may be displayed in response to receiving user selection of the user selectable message center 1652 shown in FIG. 28. The customer bathing unit system state interface 1710 provides for monitoring one or more operational states of a customer's bathing unit system. For example, in the specific example shown in FIG. 29, the customer bathing unit system state interface 1710 may include operational status indicators 1712 conveying operational status information of the respective specific bathing unit system. It is noted that the operational status indicator 1412 displayed for a given bathing unit system as part of its entry in the list 1402 of the GUI shown in FIGS. 8, 17 and 21, or as the operational status indicators 1542 and 1642 displayed on the customer home page interfaces shown in FIGS. 18 and 27 depict the color-coded operational status indicator corresponding to the operational status indicator that is considered to be the most important according to a hierarchy of operational status identifiers. However, a given bathing unit system may have multiple active operational status indicators at any given time. For example, as shown in FIG. 29, the bathing unit system "My Spa" has two active operational status indicators: "Heating to 101° F." and "Filtering is active". In some embodiments, the spa state interface for the technician remote control client may provide additional information that is not provided as part of the spa state interface for the customer remote control client. For example, the spa state interface for the technician remote control client may present a diagnostic interface providing additional information of an error condition for the specific bathing unit system associated to a selected specific general error indicator that may be displayed as part of the spa state information.

Referring again to FIG. 28, it is noted that in this specific example the operational status indicator 1642 and the user-operable controls 1644 for various bathing unit system accessories are user-operable to accept user inputs to modify one or more operational parameters of the bathing unit system. For example, responsive to user selection of the operational status indicator 1642, the GUI may be dynamically modified to include a user-operable input object configured to accept user input to modify the current water temperature setting of the bathing unit system.

Figure 30:
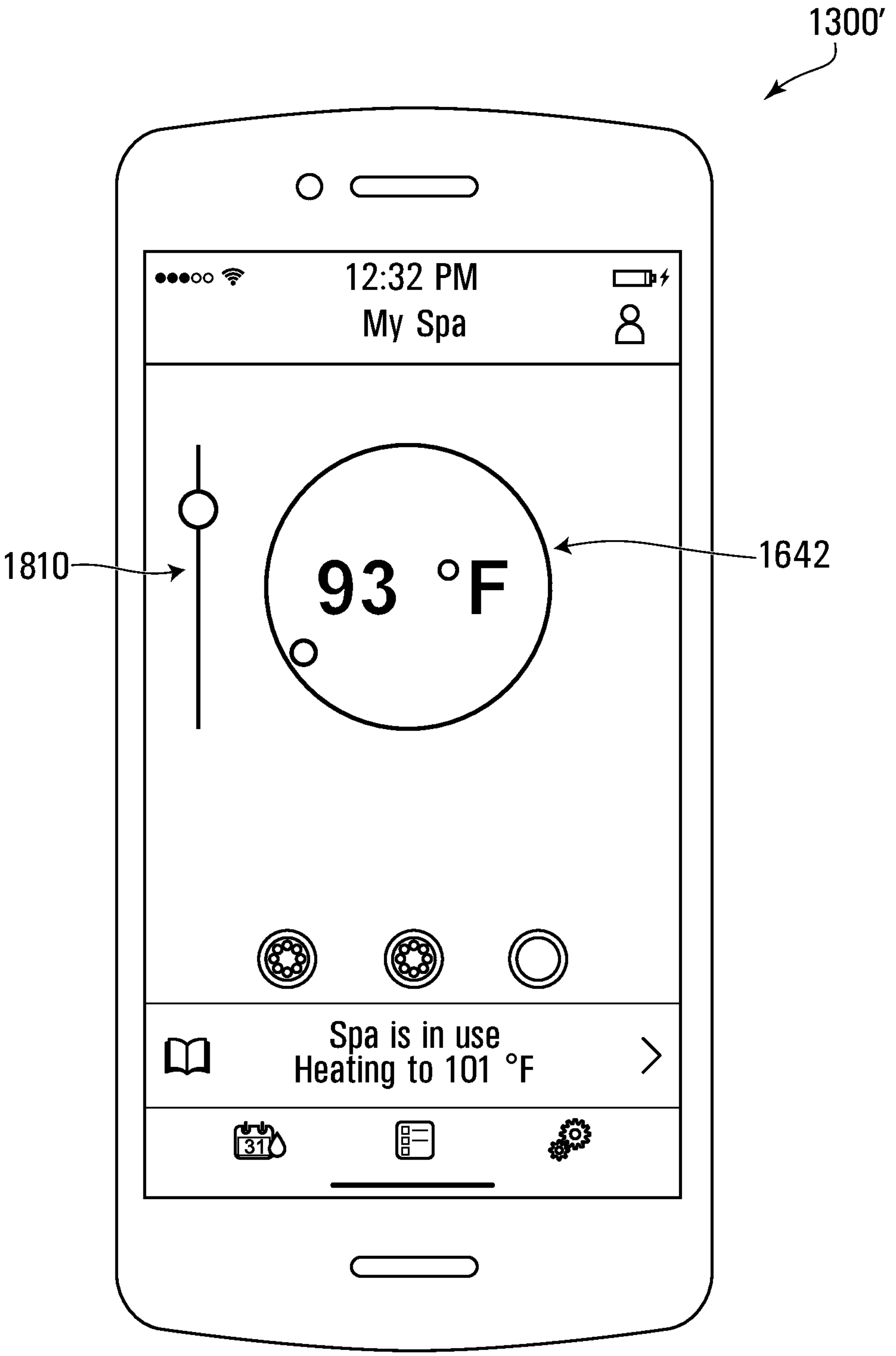
FIG. 30 shows a non-limiting example of a graphical user interface for a technician remote control client showing a customer bathing unit system control interface for controlling operational settings of one or more components of a customer's bathing unit system in accordance with the present invention.

FIG. 30 shows a non-limiting example of the GUI shown in FIG. 28 modified to include a user-operable input object 1810 configured to accept user input to modify the current water temperature setting of the bathing unit system. In this specific example, the user-operable input object 1810 is in the form of a slide bar. Similarly, user-selection of user-operable controls 1644 allow the technician to turn on/off or adjust one or more other operating parameters of the bathing unit system. In response to receipt of a specific user input to modify one or more operational parameters of the bathing unit system, the technician remote control client implemented by the technician personal computing device causes a command signal to be transmitted to the bathing unit system over a computer network to cause a change in one or more operational parameters.

Figure 31:
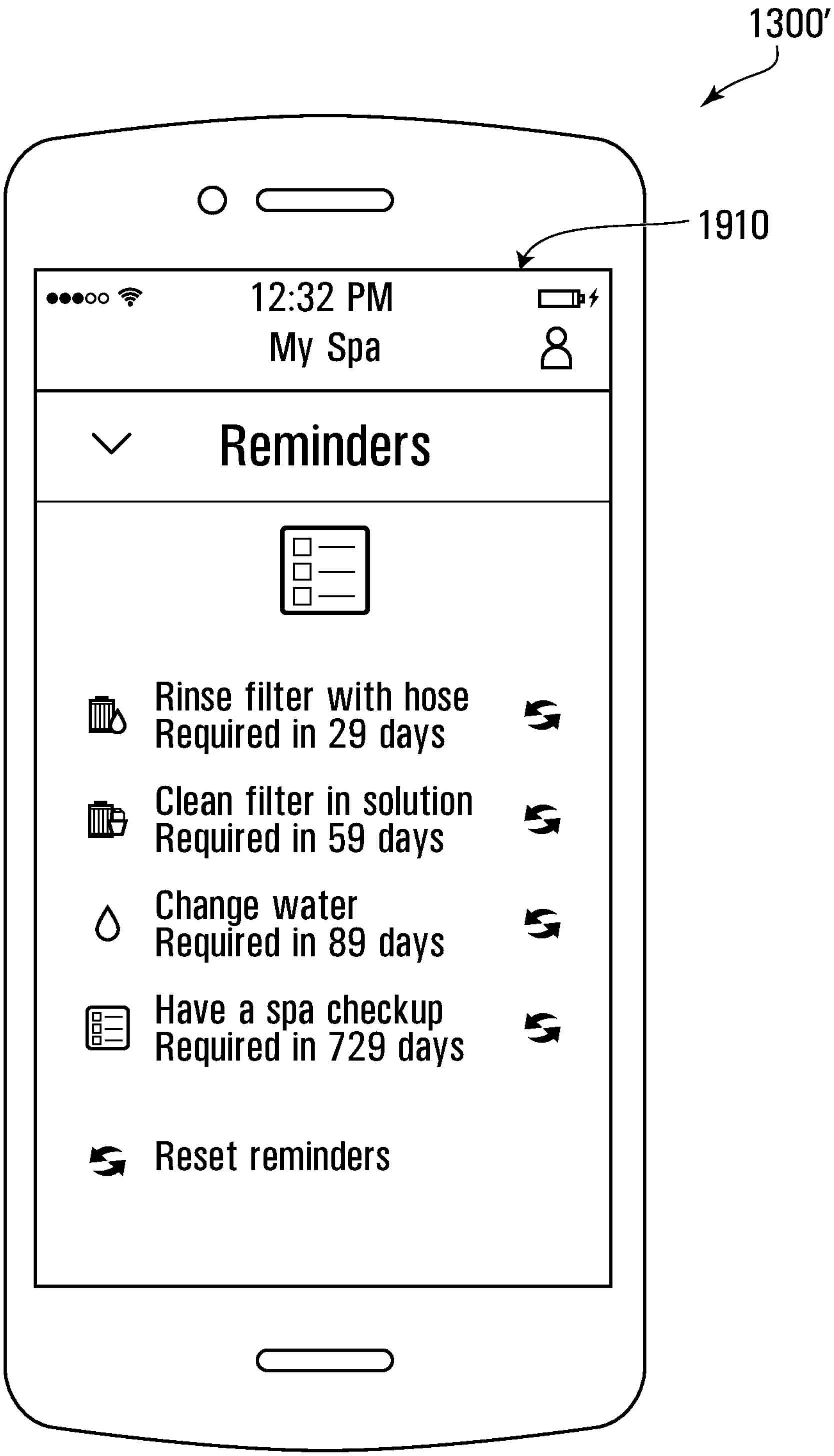
FIG. 31 shows a non-limiting example of a graphical user interface for a technician remote control client showing a customer bathing unit system reminder interface conveying one or more maintenance reminders for a customer's bathing unit system in accordance with the present invention.

Referring again to FIG. 28, it is noted that the multiple user-selectable menus 1653 include a water care menu 1654, a reminders menu 1656 and a settings menu 1658. Each of these user-selectable menus is reviewable and modifiable by the technician through the GUI. For example, the technician can modify or reset reminders for the bathing unit system by selecting the reminders menu 1656. Shown in FIG. 31 is a non-limiting example of a graphical user interface for a technician remote control client showing a customer bathing unit system reminder interface 1910 for monitoring and controlling one or more maintenance reminders for a customer's bathing unit system in accordance with the present invention.

Although the present invention has been described with reference to specific features and embodiments thereof, various modifications and combinations can be made thereto and will become apparent in view of the present description. The description and drawings are, accordingly, to be regarded simply as an illustration of some embodiments of the invention as defined by the appended claims. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized in alternative implementations if the invention.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

The foregoing is considered as illustrative only of the principles of the invention. Since numerous modifications and changes will become readily apparent to those skilled in the art in light of the present description, it is not desired to limit the invention to the exact examples and embodiments shown and described, and accordingly, suitable modifications and equivalents may be resorted to. It will be understood by those of skill in the art that throughout the present specification, the term "a" used before a term encompasses embodiments containing one or more to what the term refers. It will also be understood by those of skill in the art that throughout the present specification, the term "comprising", which is synonymous with "including," "containing," or "characterized by," is inclusive or open-ended and does not exclude additional, un-recited elements or method steps.

Unless otherwise defined, all technical and scientific terms used herein have the same meaning as commonly understood by one of ordinary skill in the art to which this invention pertains. In the case of conflict, the present document, including definitions will control.

Although the present invention has been described in considerable detail with reference to certain embodiments thereof, variations and refinements are possible and will become apparent to the person skilled in the art in view of the present description. The invention is defined more particularly by the attached claims.

What is claimed is:

1. A method to facilitate maintenance of a bathing unit system operated by a customer associated with the bathing unit system, wherein the bathing unit system is network-enabled, the method comprising:

directing a computing device to implement a Graphical User Interface (GUI), said GUI being configured to present to the customer one or more user-operable input objects configured to accept user inputs to modify one or more operational parameters of the bathing unit system;

the GUI being configured to display a user operable control for receiving from the customer service request commands for requesting that a bathing unit system service technician contact the customer associated with the bathing unit system, wherein the user operable control for receiving the service request commands is displayed on the GUI in conjunction with an error indicator conveying a specific operational error that has been detected in the bathing unit system;

in response to receipt of a specific service request command from the customer via the user operable control, transmitting a service request notification message over a communication network indicating that the customer associated with the bathing unit system has requested to be contacted;

receiving over the communication network, at the computing device, an invitation message responsive to the service request notification message, the invitation message including a request to permit remote control and monitoring of the bathing unit system associated with the customer by a specific remote service technician; and following receipt of the invitation message at the computing device, dynamically adapting the GUI to present user-selectable options to enable the customer to selectively accept the request to permit the remote control and monitoring of the bathing unit system by the specific remote service technician.

2. A method as defined in claim 1, wherein the error indicator is a component-specific error indicator identifying a specific bathing unit component in the bathing unit system with which the detected specific operational error is associated.

3. A method as defined in claim 1, wherein the error indicator is user-selectable through the GUI, wherein in response to receiving a user selection for the error indicator, the GUI being dynamically adapted to present a diagnostic interface providing additional information of an error condition associated with the error indicator.

4. A method as defined in claim 3, wherein dynamically adapting the GUI to present the diagnostic interface includes presenting information identifying one or more replacement parts available for purchase to address the error condition.

5. A method as defined in claim 4, wherein presenting the information identifying the one or more replacement parts available for purchase includes providing a user-operable actuator to initiate a purchasing process for the one or more replacement parts from an electronic marketplace.

6. A method as defined in claim 1, further comprising:

dynamically adapting the GUI to display a service request GUI element following receipt of the specific service request command via the user operable control, the service request GUI element indicating that the service request notification message in respect of the bathing unit system has been transmitted.

7. A method as defined in claim 1, wherein the computing device is a portable device associated with the customer.

8. An apparatus to facilitate maintenance of a bathing unit system operated by a customer associated with the bathing unit system, wherein the bathing unit system is network-enabled, the apparatus comprising:

a network interface;

a display screen;

a non-transitory computer readable storage medium storing computer readable instructions; and a processor in communication with the display screen, the network interface and the non-transitory computer readable storage medium, said computer readable instructions when executed by the processor configure the apparatus to:

a) direct the display screen to implement a Graphical User Interface (GUI), said GUI being configured to:

present one or more user-operable input objects configured to accept user inputs to modify one or more operational parameters of a bathing unit system; and display a user operable control for receiving from the customer service request commands for requesting that a bathing unit system service technician contact the customer associated with the bathing unit system, wherein the user operable control for receiving the service request commands is displayed on the GUI in conjunction with an error indicator conveying a specific operational error that has been detected in the bathing unit system;

b) in response to receipt of a specific service request command from the customer via the user operable control of GUI, transmit a service request notification message over a communication network via the network interface, the service request notification message indicating that the customer associated with the bathing unit system has requested to be contacted;

c) receive over the communication network, an invitation message responsive to the service request notification message, the invitation message including a request to permit remote control and monitoring of the bathing unit system associated with the customer by a specific remote service technician; and d) following receipt of the invitation message, dynamically adapt the GUI to present user-selectable options to enable the customer to selectively accept the request to permit the remote control and monitoring of the bathing unit system by the specific remote service technician.

9. An apparatus as defined in claim 8, wherein the error indicator is a component-specific error indicator identifying a specific bathing unit component in the bathing unit system with which the detected specific operational error is associated.

10. An apparatus as defined in claim 8, wherein said computer readable instructions when executed by the processor configure the apparatus to:

configure the GUI to display the error indicator as a user-selectable error indicator; and dynamically adapt the GUI, in response to receiving a user selection for the error indicator, to present a diagnostic interface providing additional information of an error condition associated with the error indicator.

11. An apparatus as defined in claim 10, wherein said computer readable instructions configure the apparatus to dynamically adapt the GUI to present information identifying one or more replacement parts available for purchase to address the error condition.

12. An apparatus as defined in claim 11, wherein said computer readable instructions that when executed by the processor configure the apparatus to provide a user-operable actuator to initiate a purchasing process for the one or more replacement parts from an electronic marketplace.

13. An apparatus as defined in claim 8, wherein the apparatus is implemented by a portable computing device associated with the customer.

14. An apparatus as defined in claim 8, wherein the apparatus is installed as part of the bathing unit system and includes a top-side control panel that includes the display screen.

15. A method to facilitate maintenance of a bathing unit system operated by a customer associated with the bathing unit system, wherein the bathing unit system is network-enabled, the method comprising:

directing a computing device to implement a Graphical User Interface (GUI), said GUI being configured to present to the customer one or more user-operable input objects configured to accept user inputs to modify one or more operational parameters of the bathing unit system;

the GUI being configured to enable operation of a user operable control in response to detection of one or more operational errors in the bathing unit system, the user operable control being configured for receiving from the customer service request commands for requesting that a bathing unit system service technician contact the customer associated with the bathing unit system, said GUI being configured to disable operation of the user operable control absent detection of operational errors in the bathing unit system; and in response to receipt of a specific service request command from the customer via the user operable control, transmitting a service request notification message over a communication network indicating that the customer associated with the bathing unit system has requested to be contacted.

16. The method defined in claim 15, wherein the GUI is configured to enable operation of the user operable control at least in part by displaying the user operable control on the GUI in conjunction with an error indicator conveying the detection of the one or more operational errors in the bathing unit system.

17. The method defined in claim 16, wherein the GUI is configured to omit displaying the user operable control absent detection of operational errors in the bathing unit system.

18. The method defined in claim 16, wherein the error indicator is a component-specific error indicator identifying a specific bathing unit component in the bathing unit system with which the one or more operational errors in the bathing unit system are associated.

19. The method defined in claim 16, wherein the error indicator is user-selectable through the GUI, wherein in response to receiving a user selection for the error indicator, the GUI being dynamically adapted to present a diagnostic interface providing additional information of an error condition associated with the error indicator.

20. The method defined in claim 19, wherein dynamically adapting the GUI to present the diagnostic interface includes presenting information identifying one or more replacement parts available for purchase to address the error condition.

21. The method defined in claim 20, wherein presenting the information identifying the one or more replacement parts available for purchase includes providing a user-operable actuator to initiate a purchasing process for the one or more parts from an electronic marketplace.

22. The method defined in claim 15, further comprising:

dynamically adapting the GUI to display a service request GUI element following receipt of the specific service request command via the user operable control, the service request GUI element indicating that the service request notification message in respect of the bathing unit system has been transmitted.

23. The method defined in claim 15, wherein the computing device is a portable device associated with the customer.

24. The method defined in claim 15, wherein the computing device is installed as part of the bathing unit system and includes a top-side control panel, wherein the GUI is displayed on a screen of the top-side control panel.

25. The method defined in claim 15, wherein the user operable control presents a list of entries corresponding to one or more bathing unit technicians, wherein entries in the list of entries are independently selectable by the customer.

26. The method defined in claim 25, wherein the list of entries includes at least one entry corresponding to a bathing unit technician that the customer has previously authorized to remotely control and monitor the bathing unit system associated with the customer.

27. An apparatus to facilitate maintenance of a bathing unit system operated by a customer associated with the bathing unit system, wherein the bathing unit system is network-enabled, the apparatus comprising:

a network interface;

a display screen;

a non-transitory computer readable storage medium storing computer readable instructions; and a processor in communication with the display screen, the network interface and the non-transitory computer readable storage medium, said computer readable instructions when executed by the processor configure the apparatus to:

a) direct the display screen to display a Graphical User Interface (GUI), said GUI being configured to:

present to the customer one or more user-operable input objects configured to accept user inputs to modify one or more operational parameters of the bathing unit system;

enable operation of a user operable control in response to detection of one or more operational errors in the bathing unit system, the user operable control being configured for receiving from the customer service request commands for requesting that a bathing unit system service technician contact the customer associated with the bathing unit system;

disable operation of the user operable control absent detection of operational errors in the bathing unit system; and b) in response to receipt of a specific service request command from the customer via the user operable control, transmitting a service request notification message over a communication network indicating that the customer associated with the bathing unit system has requested to be contacted.

28. The apparatus defined in claim 27, wherein the GUI is configured to enable operation of the user operable control at least in part by displaying the user operable control on the GUI in conjunction with an error indicator conveying the detection of the one or more operational errors in the bathing unit system.

29. The apparatus defined in claim 28, wherein the GUI is configured to omit displaying the user operable control absent detection of operational errors in the bathing unit system.

30. The method defined in claim 1, wherein the user operable control presents a list of entries corresponding to one or more bathing unit technicians, wherein entries in the list of entries are independently selectable by the customer to allow the customer to select the specific remote service technician from the list of entries, the list of entries including at least on entry corresponding to the specific remote service technician.

31. The method defined in claim 30, wherein the specific remote service technician corresponds to a bathing unit technician that the customer has previously authorized to remotely control and monitor the bathing unit system associated with the customer.

* * * * *